US 9,429,238 B2

(12) United States Patent
Richie et al.

(10) Patent No.: US 9,429,238 B2
(45) Date of Patent: Aug. 30, 2016

(54) DYNAMIC BACKUP RING ASSEMBLY

(71) Applicant: Kalsi Engineering, Inc., Sugar Land, TX (US)

(72) Inventors: Aaron Paul Richie, Houston, TX (US); Lannie Laroy Dietle, Houston, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 0 days.

(21) Appl. No.: 14/052,553

(22) Filed: Oct. 11, 2013

(65) Prior Publication Data
US 2014/0035238 A1   Feb. 6, 2014

Related U.S. Application Data

(63) Continuation-in-part of application No. 12/957,160, filed on Nov. 30, 2010, now Pat. No. 9,316,319, and a continuation-in-part of application No. 13/026,045, filed on Feb. 11, 2011, now Pat. No. 9,109,703.
(Continued)

(51) Int. Cl.
| | |
|---|---|
| *F16J 9/00* | (2006.01) |
| *F16J 15/44* | (2006.01) |
| *F16J 15/00* | (2006.01) |
| *F16J 15/16* | (2006.01) |

(52) U.S. Cl.
CPC ............ *F16J 15/441* (2013.01); *F16J 15/006* (2013.01); *F16J 15/166* (2013.01)

(58) Field of Classification Search
CPC .... F16J 15/3288; F16J 15/342; F16J 15/164; F16J 15/441–15/443; F16J 15/3404; F16J 15/3412; F16J 15/3292; F16J 15/3228; F16J 15/3224

USPC ....... 277/300, 336, 401, 422, 303, 306, 307, 277/579
See application file for complete search history.

(56) References Cited

U.S. PATENT DOCUMENTS

| | | | |
|---|---|---|---|
| 2,253,932 A | 8/1941 | Gilkerson | |
| 2,394,800 A | 2/1946 | Murphy | |

(Continued)

FOREIGN PATENT DOCUMENTS

| | | |
|---|---|---|
| JP | 1-152151 U | 10/1989 |
| JP | 06147327 A | 5/1994 |
| WO | 2008029786 A1 | 3/2008 |

OTHER PUBLICATIONS

International Search report of corresponding counterpart international application No. PCT/US2013/064700 dated Mar. 7, 2014 (3 pages).

(Continued)

*Primary Examiner* — Kristina Fulton
*Assistant Examiner* — Nathan Cumar
(74) *Attorney, Agent, or Firm* — Douglas W. Rommelmann; Andrews Kurth LLP

(57) ABSTRACT

A seal backup ring assembly is provided that eliminates fluid differential pressure acting radially on the backup ring, preventing collapse of the backup ring against a shaft. The backup ring is assembled so that the initial clearance (extrusion gap) between the backup ring and relatively rotating member is not affected by the differential pressure acting across the assembly. This allows for an initially small extrusion gap to be present throughout the differential pressure range.

195 Claims, 13 Drawing Sheets

Related U.S. Application Data

(60) Provisional application No. 61/284,179, filed on Dec. 14, 2009, provisional application No. 61/283,227, filed on Nov. 30, 2009, provisional application No. 61/337,667, filed on Feb. 11, 2010, provisional application No. 61/795,217, filed on Oct. 12, 2012, provisional application No. 61/797,747, filed on Dec. 14, 2012, provisional application No. 61/854,879, filed on May 3, 2013.

(56) References Cited

U.S. PATENT DOCUMENTS

| | | |
|---|---|---|
| 2,442,687 A | 6/1948 | Heathcott |
| 2,459,472 A | 1/1949 | Tremolada |
| 2,520,306 A | 8/1950 | Detweiler |
| 2,608,385 A | 8/1952 | Stahl |
| 2,706,655 A | 4/1955 | Showalter |
| 2,728,620 A | 12/1955 | Krueger |
| 2,934,368 A | 4/1960 | Adamson |
| 2,998,288 A | 4/1961 | Newhouse |
| 3,271,039 A | 9/1966 | Kohl |
| 3,305,241 A | 2/1967 | Hart |
| 3,497,225 A | 2/1970 | Workman |
| 3,544,118 A * | 12/1970 | Klein .............................. 277/579 |
| 3,575,424 A | 4/1971 | Taschenberg |
| 3,627,337 A | 12/1971 | Pippert |
| 3,730,284 A | 5/1973 | Striegler |
| 3,801,114 A | 4/1974 | Bentley |
| 3,848,880 A | 11/1974 | Tanner |
| 3,868,105 A | 2/1975 | Bentley |
| 3,887,198 A | 6/1975 | McClure et al. |
| 3,921,987 A | 11/1975 | Johnston et al. |
| 3,923,315 A | 12/1975 | Hadaway |
| 3,929,340 A | 12/1975 | Peisker |
| 3,970,321 A | 7/1976 | Dechavanne |
| 3,973,781 A | 8/1976 | Groich |
| 3,984,113 A | 10/1976 | Bentley |
| 4,084,826 A | 4/1978 | Vossieck et al. |
| 4,094,519 A | 6/1978 | Heyn et al. |
| 4,118,856 A | 10/1978 | Bainard et al. |
| 4,183,543 A | 1/1980 | Antonini |
| 4,240,676 A | 12/1980 | Anderson et al. |
| 4,288,083 A | 9/1981 | Braconier |
| 4,336,945 A | 6/1982 | Christiansen et al. |
| 4,387,902 A | 6/1983 | Conover |
| 4,421,425 A | 12/1983 | Foucher et al. |
| 4,440,405 A | 4/1984 | Schaus et al. |
| 4,441,722 A | 4/1984 | Pichler |
| 4,451,050 A | 5/1984 | Repella |
| 4,484,753 A | 11/1984 | Kalsi |
| 4,496,251 A | 1/1985 | Ide |
| 4,501,431 A | 2/1985 | Peisker et al. |
| 4,515,486 A | 5/1985 | Ide |
| 4,542,573 A | 9/1985 | Bainard |
| 4,602,806 A | 7/1986 | Saliger |
| 4,610,319 A | 9/1986 | Kalsi |
| 4,619,534 A | 10/1986 | Daly |
| 4,671,519 A | 6/1987 | Bras |
| 4,676,668 A | 6/1987 | Ide |
| 4,695,063 A | 9/1987 | Schmitt et al. |
| 4,705,277 A | 11/1987 | Repella |
| 4,717,160 A | 1/1988 | Zitting et al. |
| 4,726,695 A | 2/1988 | Showalter |
| 4,729,569 A | 3/1988 | Muller et al. |
| 4,739,998 A | 4/1988 | Steusloff et al. |
| 4,750,747 A | 6/1988 | Holzer |
| 4,770,548 A | 9/1988 | Otto |
| 4,783,086 A | 11/1988 | Bras et al. |
| 4,789,166 A | 12/1988 | Rericha et al. |
| 4,848,774 A * | 7/1989 | Nyilas et al. ................. 277/388 |
| 5,002,289 A | 3/1991 | Yasui et al. |
| 5,024,364 A | 6/1991 | Nash |
| 5,046,906 A * | 9/1991 | Bucknell ...................... 411/432 |
| 5,054,938 A | 10/1991 | Ide |
| 5,066,144 A | 11/1991 | Ide |
| 5,102,236 A | 4/1992 | Ide |
| 5,112,143 A | 5/1992 | Ide |
| 5,137,373 A | 8/1992 | Ide |
| 5,139,275 A | 8/1992 | Ehrmann et al. |
| 5,172,921 A | 12/1992 | Stenlund |
| 5,178,215 A | 1/1993 | Yenulis |
| 5,188,462 A | 2/1993 | Hooper et al. |
| 5,190,299 A | 3/1993 | Johnston |
| 5,195,754 A | 3/1993 | Dietle |
| 5,195,757 A | 3/1993 | Dahll |
| 5,199,514 A | 4/1993 | Titus |
| 5,222,815 A | 6/1993 | Ide |
| 5,224,557 A | 7/1993 | Yenulis et al. |
| 5,230,520 A | 7/1993 | Dietle et al. |
| 5,265,964 A | 11/1993 | Hooper |
| 5,279,365 A | 1/1994 | Yenulis et al. |
| 5,284,392 A | 2/1994 | Ide |
| 5,306,021 A | 4/1994 | Morvant |
| 5,372,431 A | 12/1994 | Ide |
| 5,427,387 A | 6/1995 | Johnston |
| 5,489,155 A | 2/1996 | Ide |
| 5,503,479 A | 4/1996 | Ide |
| 5,511,886 A | 4/1996 | Sink |
| 5,513,917 A | 5/1996 | Ide et al. |
| 5,527,045 A | 6/1996 | Pondelick |
| 5,558,444 A | 9/1996 | Ide |
| 5,588,491 A | 12/1996 | Brugman et al. |
| 5,593,231 A | 1/1997 | Ippolito |
| 5,647,444 A | 7/1997 | Williams |
| 5,662,171 A | 9/1997 | Brugman et al. |
| 5,662,181 A | 9/1997 | Williams |
| 5,662,335 A | 9/1997 | Larsen |
| 5,664,888 A | 9/1997 | Sabin |
| 5,678,829 A | 10/1997 | Kalsi et al. |
| 5,692,757 A | 12/1997 | Straub |
| 5,711,534 A | 1/1998 | Bengoa et al. |
| 5,738,358 A | 4/1998 | Kals et al. |
| 5,791,658 A | 8/1998 | Johnston |
| 5,823,541 A | 10/1998 | Dietle et al. |
| 5,829,338 A | 11/1998 | Chrestoff et al. |
| 5,873,576 A | 2/1999 | Dietle et al. |
| 5,915,696 A | 6/1999 | Onuma et al. |
| 5,921,555 A | 7/1999 | Johnston |
| 5,938,344 A | 8/1999 | Sabin |
| 6,007,105 A | 12/1999 | Dietle et al. |
| 6,016,880 A | 1/2000 | Hall et al. |
| 6,036,192 A | 3/2000 | Dietle et al. |
| 6,105,968 A | 8/2000 | Yeh et al. |
| 6,109,618 A | 8/2000 | Dietle |
| 6,120,036 A | 9/2000 | Kalsi et al. |
| 6,139,020 A | 10/2000 | Friend et al. |
| 6,189,896 B1 | 2/2001 | Dickey et al. |
| 6,227,547 B1 * | 5/2001 | Dietle et al. .................. 277/336 |
| 6,315,302 B1 | 11/2001 | Conroy et al. |
| 6,334,619 B1 | 1/2002 | Dietle et al. |
| 6,371,488 B1 | 4/2002 | Szymborski et al. |
| 6,382,634 B1 | 5/2002 | Dietle et al. |
| 6,416,225 B1 | 7/2002 | Cioceanu et al. |
| 6,460,635 B1 | 10/2002 | Kalsi et al. |
| 6,467,774 B1 * | 10/2002 | Amaral et al. ................. 277/579 |
| 6,481,720 B1 | 11/2002 | Yoshida et al. |
| 6,494,462 B2 | 12/2002 | Dietle |
| 6,554,016 B2 | 4/2003 | Kinder |
| 6,561,520 B2 | 5/2003 | Kalsi et al. |
| 6,619,664 B1 | 9/2003 | Metz |
| 6,685,194 B2 | 2/2004 | Dietle et al. |
| 6,688,603 B2 | 2/2004 | vom Schemm |
| 6,749,172 B2 * | 6/2004 | Kinder ............................ 251/1.2 |
| 6,767,016 B2 | 7/2004 | Gobeli et al. |
| 7,004,444 B2 * | 2/2006 | Kinder ............................ 251/1.2 |
| 7,007,913 B2 * | 3/2006 | Kinder ............................ 251/1.2 |
| 7,052,020 B2 | 5/2006 | Gobeli et al. |
| 7,341,258 B2 | 3/2008 | Holt et al. |
| 7,562,878 B2 | 7/2009 | Dietle et al. |
| 7,770,898 B2 | 8/2010 | Dietle et al. |
| 7,798,496 B2 | 9/2010 | Dietle et al. |
| 7,934,545 B2 | 5/2011 | Bailey et al. |
| 8,083,235 B2 | 12/2011 | Azibert et al. |
| 8,282,107 B2 | 10/2012 | Horiba et al. |

(56) References Cited

U.S. PATENT DOCUMENTS

| | | |
|---|---|---|
| 2001/0024016 A1 | 9/2001 | Gobeli et al. |
| 2003/0205864 A1* | 11/2003 | Dietle et al. .................. 277/434 |
| 2005/0156386 A1 | 7/2005 | Ota et al. |
| 2006/0171616 A1 | 8/2006 | Richie et al. |
| 2006/0214379 A1 | 9/2006 | James et al. |
| 2007/0013143 A1 | 1/2007 | Schroeder et al. |
| 2007/0160314 A1 | 7/2007 | Richie et al. |
| 2009/0001671 A1* | 1/2009 | Dietle et al. .................. 277/559 |
| 2010/0259015 A1 | 10/2010 | Dietle |
| 2010/0264603 A1 | 10/2010 | Schroeder et al. |
| 2011/0127725 A1 | 6/2011 | Dietle et al. |

OTHER PUBLICATIONS

PCT Written Opinion and Search Report of international application No. PCT/US2010/58437 dated Feb. 8, 2011, a counterpart U.S. Appl. No. 12/957,160.

* cited by examiner

DYNAMIC BACKUP RING ASSEMBLY

CROSS-REFERENCE TO RELATED APPLICATIONS

This application is a continuation-in-part application of U.S. application Ser. No. 12/957,160, filed Nov. 30, 2010, entitled "Pressure-Balanced Floating Seal Housing Assembly and Method" which claims the benefit of U.S. Provisional Application Ser. No. 61/283,227 filed Nov. 30, 2009, entitled "Seal Carrier," and claims the benefit of U.S. Provisional Application Ser. No. 61/284,179 filed Dec. 14, 2009, entitled "Pressure-Balanced Floating Seal Carrier," and is a continuation-in-part application of U.S. application Ser. No. 13/026,045, filed Feb. 11, 2011, entitled "Hydrodynamic Backup Ring" which claims the benefit of U.S. Provisional Application Ser. No. 61/337,667 filed Feb. 11, 2010 and entitled "High Pressure Rotary Seal." This application claims the benefit of U.S. Provisional Application Ser. No. 61/795,217 filed Oct. 12, 2012, entitled "Force Balanced Backup Ring for Sealing Assembly," and claims the benefit of U.S. Provisional Application Ser. No. 61/797,747 filed Dec. 14, 2012, entitled "Floating, Axially and Radially Force Balanced Seal Carrier," and claims the benefit of U.S. Provisional Application Ser. No. 61/854,879 filed May 3, 2013, entitled "Modular Swivel Assembly." U.S. application Ser. Nos. 12/957,160 and 13/026,045 and Provisional Application Ser. Nos. 61/795,217, 61/797,747, and 61/854,879 are incorporated by reference herein for all purposes.

BACKGROUND OF THE INVENTION

1. Field of the Invention

The present invention is related to machinery having a relatively movable shaft, where a dynamic seal establishes sealing contact with the relatively movable shaft to retain a pressurized fluid. Examples of relatively movable shafts include shafts that have relative rotation with respect to the dynamic seal, shafts that have relative reciprocation with respect to the dynamic seal, and shafts that have both rotation and reciprocation relative to the dynamic seal. More particularly, the present invention is related to a backup ring that increases the ability of a dynamic seal to withstand high differential pressure while still allowing freedom of relative shaft movement.

2. Description of the Prior Art

Dynamic seals for high differential pressure service are often mounted in a housing, slide relative to a shaft, and provide a sealing function between the housing and the shaft. A high pressure dynamic seal requires a small shaft-to-housing extrusion gap clearance to avoid extrusion damage, yet the clearance must be large enough to avoid heavily loaded shaft-to-housing contact at the bore of the housing that defines the extrusion gap clearance. If heavily loaded shaft-to-housing contact occurs at the extrusion gap of a dynamic seal during relative rotation, the housing assumes the lateral load intended for the bearings. The resulting friction and heat can destroy the dynamic seal, and may damage the housing and the shaft sealing surface in ways that are highly detrimental to the effective life of the dynamic seal. Heavily loaded shaft-to-housing contact can also occur with reciprocating shafts due to misalignment related binding, and can lead to scoring and galling of the shaft sealing surface.

Some of the optimum conditions for high pressure extrusion resistance are:
  Small extrusion gap clearance.
  Avoidance of heavily loaded contact between the seal housing and shaft, particularly at the region of intended extrusion gap clearance.
  Minimal relative radial motion between the housing and the shaft to minimize dynamic changes to the size of the extrusion gap clearance.
  Minimal pressure induced deformation ("pressure breathing") of the extrusion gap clearance.
  An undamaged corner between the seal groove and the housing bore that defines the extrusion gap.
The implications of excessive shaft-to-housing extrusion gap clearance are:
  1.) Pressure causes seal material to protrude into extrusion gap clearance.
  2.) Runout and pressure breathing flex the protruding seal material.
  3.) Cyclic strain destroys the protruding seal material.
  4.) Pressure causes more protrusion.
  5.) The damage cycle continues until sealing function is lost.

A number of factors prohibit a small extrusion gap clearance and precise shaft guidance in large machinery. Manufacturing tolerances are large, which directly affects the size of the shaft-to-housing clearance, and also increases bearing mounting and internal clearances, which all permit shaft run-out and misalignment. Large components are often subject to significant elastic deformation when exposed to high pressure and large mechanical loads.

Surface speeds can be significant in large diameter rotary equipment, which adds to seal-generated heat. This softens the seal material, and reduces seal extrusion resistance.

The present invention is directed at applications with relative rotation, relative reciprocation, or both. For the purpose of understanding prior art problems, one can study the annular rotary control devices (also known as rotary blowout preventers) shown by U.S. Pat. Nos. 5,588,491 and 5,662,171. These patents are titled "Rotating Blowout Preventer and Method." The devices represented by these patents expose a dynamic seal to relative rotation, relative reciprocation, and high differential pressure. Because these units have non-floating seal housings, stack alignment must be essentially perfect. However, there is much potential for misalignment between the lower shaft and the seal housing. The shaft for the lower dynamic seal is an extension of a large reciprocating piston that actuates the packer element. This large piston is necessarily mounted with enough clearance for sliding, which adds to its potential for misalignment. The piston is a two-piece assembly, which also adds to the potential for misalignment of the sealing surface. The piston is hydraulically thrust against the packer element to actuate the packer element. The packer element deforms in uneven fashion against a drillstring. The drillstring is in all likelihood misaligned with the rotating control device, and not running true. This imposes severe cocking loads on the reciprocating piston, causing misalignment and run-out that can cause heavily loaded contact at the extrusion gap that is likely to damage the dynamic seal, the shaft, and the seal housing.

As a general conclusion concerning large equipment such as rotary control devices, if clearance is in a useful range for extrusion resistance, it is virtually impossible to guide the shaft so precisely that it will not rub on the bore of a conventional non-floating seal housing. This rubbing creates seal-damaging heat, and may also damage the seal housing and shaft in ways that significantly accelerate rotary seal extrusion damage.

Internal fluid within a rotating control device is often pressurized for various reasons. One reason for internal fluid pressure is to actuate the packer element. Another reason for fluid pressure is to orient the dynamic seal that partitions the internal fluid from the drilling fluid.

The use of dynamic seals for establishing sealing between relatively movable machine components for fluid retention is known. The differential pressure that such dynamic seals can retain is limited by the extrusion resistance of the material used in the construction of the seal, and is also limited by the size of the extrusion gap clearance that exists between the seal housing and the mating relatively movable surface. In the case of dynamic seals designed to provide hydrodynamic interfacial lubrication in response to relative motion, the size of the extrusion gap clearance also influences interfacial lubrication. The backup rings used with static and reciprocating seals are unsuitable for rotary seals exposed to high differential pressure due to liabilities such as high friction, high wear, material flow, and damaging frictional heat.

U.S. Pat. No. 5,195,754, entitled "Laterally Translating Seal Carrier for a Drilling Mud Motor Sealed Bearing Assembly," and U.S. Pat. No. 6,227,547, entitled "High Pressure Rotary Shaft Sealing Mechanism" disclose axially force balanced seal carriers that follow the often unavoidable lateral motion of rotary shafts while maintaining a relatively small extrusion gap clearance between the seal carrier and the rotary shafts. The seal carriers of these patents require a step change in shaft diameter, and therefore cannot accommodate the significant shaft reciprocation found in some types of rotary equipment, such as the rotating control devices shown in U.S. Pat. Nos. 5,588,491 and 5,662,171. Another problem with the seal carriers of U.S. Pat. Nos. 5,195,754 and 6,227,547 is that seals and seal carriers of different diameters are typically required for pressure staging.

The seal carriers of U.S. Pat. Nos. 5,195,754 and 6,227,547 are subject to the coning problem that is shown in FIG. 3 of Chapter D16 Rev. 0 (Apr. 23, 2012) of the Kalsi Seals Handbook, Rev. 6. Chapter D16 is titled "Axially force balanced, laterally translating arrangements," and describes the problem as follows: "The portion of a laterally translating high pressure seal carrier that is located between the Kalsi Seal and the face seal experiences a radial pressure imbalance that causes an inward deflection of the seal carrier. This deflection has to be taken into account when designing the journal bearing fit, the extrusion gap fit, and the axial fit of the seal carrier with the surrounding support structure." The problem with merely taking the deflection into account when designing the extrusion gap fit is that the extrusion gap closes as differential pressure builds, trapping extruded sealing material.

U.S. Pat. No. 6,007,105, entitled "Swivel Seal Assembly" provides pressure staging across a plurality of rotary seals engaging a relatively rotatable washpipe, and provides for simultaneous articulation of the washpipe and a surrounding seal housing to accommodate shaft run-out and misalignment. This simultaneous articulation is made possible by axial pressure balancing of both the washpipe and the seal housing. Because the seal housing expands due to internal pressure, the extrusion gap clearance changes as the sealed fluid pressure increases. Higher differential pressures could be withstood if the extrusion gap clearance could be held more constant.

SUMMARY OF THE INVENTION

The present invention relates generally to dynamic seals used for establishing sealing between relatively movable machine components for separation of first and second fluids, and for retention of the first fluid, even when the pressure of the first fluid is considerably greater than the pressure of the second fluid. More specifically, the preferred embodiment is a mechanical arrangement that applies the pressures of the first and second fluids to controlled locations on a backup ring in order to provide substantial pressure balance in the radial direction, and if desired, substantially balanced force in the axial direction. The radial pressure balance makes the backup ring relatively immune to pressure-induced dimensional changes. The axial force balance frees the backup ring to align itself on the shaft and to follow lateral deflection and runout of the shaft. These benefits allow the backup ring to define a small initial extrusion gap for the dynamic seal, minimizing pressure-induced extrusion damage to the dynamic seal.

The invention is suitable for applications where in addition to lateral relative movement, axial and or rotational relative movement may be encountered. Oilfield rotating control devices, which are sometimes referred to as rotary blowout preventers, are an example of a dynamic sealing application where lateral relative motion is combined with rotary and axial relative motion. Oilfield washpipe assemblies are an example of a sealing application where lateral relative motion is combined with rotary relative motion.

The backup ring of a preferred embodiment is provided and configured so that neither differential pressure acting across the dynamic seal, nor ambient fluid pressure, causes the backup ring to significantly change diameter. This is achieved by having substantially the same pressure acting on both the outer and inner surfaces of the backup ring. The backup ring is preferably located between a shoulder of a retainer and an internal locating shoulder of a housing. This housing is sometimes referred to as a bulkhead housing. A spacer section is provided that has an axial length that is slightly longer than the captured axial length of the backup ring. For example, the spacer section could be a few thousandths of an inch longer than the backup ring. This spacer section spaces and separates the retainer shoulder from the housing locating shoulder so that the backup ring cannot be pinched between the retainer shoulder and the housing shoulder. By preventing pinching, the backup ring is free to move laterally in concert with any lateral motion of the shaft. The spacer section can be defined by the housing, or by the retainer, or can be defined by a separate ring-like component. The retainer is preferably retained in sealing engagement with the housing.

The pressure of the first fluid acts over a first hydraulic area between first inner and first outer sealing locations, and imparts a first axially-acting hydraulic thrust on the backup ring acting in a first hydraulic force direction. In a preferred embodiment, the first inner sealing site is established by the sealing engagement of the sealing material of the dynamic seal with respect to the relatively movable surface of the shaft (i.e., the sealing surface) in the vicinity of the radial clearance between the backup ring and the shaft. The first outer sealing site is established at the axial clearance between the retainer and the backup ring by sealing material. This sealing material may be provided either by the dynamic seal or by a separate face seal that is axially compressed between the retainer and the backup ring. This face seal preferably comprises resilient polymeric construction, so that pressure can transmit through the material as if the material were a fluid.

The pressure of the first fluid also acts over a second hydraulic area that is established by second inner and outer sealing sites, and imparts a second axially-acting hydraulic thrust on the backup ring in a second hydraulic force direction that is opposite to the first hydraulic force direction of the first axially-acting hydraulic thrust.

The pressure of the first fluid can be transmitted to the first hydraulic area by any suitable means, such as through both the first fluid and the sealing material of the dynamic seal. If desired, this method of pressure transmission can be supplemented by the pressure of the first fluid acting through sealing material of the optional face seal. If the optional face seal is employed, it is preferred that a region of annular clearance exist between the outer periphery of the dynamic seal and the inner periphery of the optional face seal.

The pressure of the first fluid can be transmitted to the second hydraulic area by any suitable pressure passage means, such as cross-drilled holes, which may, if desired, be combined with annular clearance or one or more axial slots, or such as external piping, or such as the above described annular clearance between the dynamic seal and the optional face seal, combined with one or more pressure communication holes that pass through the length of the backup ring.

Where possible, distribution clearances of a generally circular nature should be provided within the second hydraulic area to provide a generally circular distribution channel to facilitate the rapid application of the pressure of the first fluid to the second hydraulic area of the backup ring. These distribution clearances can be built into the backup ring, the mating housing structure, or both.

The areas of the first and second hydraulic areas are preferably substantially equal, so that the first and second axially-acting hydraulic thrust forces are substantially equal, substantially freeing the backup ring from axially-acting hydraulic force imbalance that would create friction that would inhibit lateral motion of the backup ring.

The pressure of the second fluid preferably acts on all of the inner, outer, and end surface areas of the backup ring that are not acted on by the pressure of the first fluid.

The pressure of the second fluid is preferably communicated to the outer periphery of the backup ring so that the pressure of the second fluid acts on both the inner and outer peripheries of the backup ring. The pressure of the second fluid can be communicated to the outer periphery of the backup ring by any suitable means, such as one or more holes/pressure ports penetrating from the inner periphery of the backup ring to the outer periphery of the backup ring, or such as one or more holes/pressure ports passing through the housing structure that locates the backup ring. Both of these described pressure communication methods can be incorporated at the same time, if desired. If desired, the inner periphery of the backup ring can incorporate a circular groove for rapid circumferential distribution of the pressure of the second fluid into the clearance between the backup ring and the shaft, and can include an axial slot for rapid communication of the pressure of the second fluid to the circular groove.

The axial positions of the sealing sites are at the axial location of the corresponding end surface of the backup ring at the extrusion gap corresponding to the sealing site. What this means is that any axial extrusion gap clearance at the first outer sealing site or the second outer sealing site does not count when determining the axial spacing between first and second sealing sites. What this also means is that any axial extrusion gap clearance at the second inner sealing site does not count when determining the axial spacing between the first and second inner sealing sites. What this also means is that the axial location of the first inner sealing site is at the axial location of the innermost portion of the corresponding end of the backup ring.

In the simplest embodiment, and typically the preferred embodiment, the axial spacing between the first and second inner sealing sites is substantially equal to the axial spacing between the first and second outer sealing sites. This arrangement allows the backup ring to be substantially pressure balanced in the radial direction, which may be all that is needed for many applications. In such cases, the ends of the backup ring are simply planar (flat), and the length between the first and second sealing sites is simply the length of the backup ring.

In a backup ring with planar ends, the surface area of the outer periphery of the backup ring is greater than the surface area of the inner periphery of the backup ring. If the pressure of the second fluid is high and acts on both the inner and outer peripheries, the result can be inward deformation of the backup ring due to force imbalance. Force is equal to pressure times area. The second pressure acting on the outer periphery creates more inward force, compared to the outward force created by the second pressure acting on the inner periphery. This force imbalance usually doesn't matter on smaller diameter backup rings because of the proportions of the ring. It can matter, however, in larger diameter backup rings.

If desired, the higher pressure of the first fluid can be used to create a radially outwardly acting hydraulic force to counteract the radial force imbalance resulting from the greater area of the outer periphery as compared to the inner periphery of the backup ring. For example, the axial spacing between the first and second outer sealing sites can be made a little greater than the axial spacing between the first and second inner sealing sites and the difference in axial spacing can be acted upon by the first fluid pressure. This allows the first fluid pressure to create a radially outwardly acting hydraulic force to compensate for radial force imbalance resulting from the greater area of the outer periphery as compared to the inner periphery of the backup ring.

The first and second fluids may be provided through ports if desired. Such ports can be located in the housing. If desired, when used with an outboard seal that partitions the second fluid from a third fluid, the pressure of the second fluid can be less than the pressure of the first fluid, yet greater than the pressure of the third fluid for pressure staging purposes, so that the dynamic seal and the outboard seal are exposed to differential pressures that are less than the pressure of the first fluid. If desired, the outboard seal can also use the laterally translatable backup ring of the present invention.

To facilitate lateral movement of the backup ring in response to the lateral motion of the relatively movable member, the first and second hydraulic forces should typically be substantially equal. In some cases the axial forces acting on the backup ring may include other forces in addition to the aforementioned hydraulic forces. For example, in a vertical shaft application, the weight of the backup ring acts in an axial direction. For another example, the compressive force of the sliding face seals acts in the axial direction. Such forces are relatively negligible, and only the hydraulic forces typically need to be taken into account. Whether one is only balancing the axial hydraulic forces, or also balancing other axial forces such as, but not limited to, backup ring weight and seal compressive force, such balancing can be accomplished in the present invention by proper sizing of the first and second hydraulic areas. In some cases, it may be desirable to design in a slight hydraulic imbalance to close the extrusion gap clearance at the second inner and outer sealing sites, or at the first outer sealing site. All of these slight hydraulic imbalances are intended to fall within the scope of what is meant by a condition of substantial axial force balance, or substantial axial pressure balance.

The invention is typically used in equipment where a relatively movable member (such as a shaft) is separated from a machine housing by an annular gap, and a resilient dynamic seal is in sealing engagement with the relatively movable member, in order to retain a first fluid. The backup ring is located between the rotary seal and the annular gap.

The backup ring has a bearing relationship with the relatively movable member, and is typically located radially (i.e., laterally) by this bearing relationship, and thus can follow lateral motion of the relatively movable member. Such lateral motion can result from factors such as runout, vibration, and load related deflection. In the simplest and preferred bearing implementation, the inner periphery of the backup ring has at least one dynamic surface that faces the relatively movable member and serves as a journal bearing to locate the backup ring laterally with respect to the relatively movable member. If desired, the bearing relationship between the backup ring and the relatively movable member can be established by any suitable bearing means, such as rolling element bearings. If desired, the bearing of the backup ring can be exposed to a lubricant for lubricating purposes. If desired, this lubricant can be retained by an outboard seal of any suitable configuration. In such cases, an outboard seal can, if desired, separate the lubricating second fluid from a third fluid, such as the atmosphere. In cases where the dynamic seal is a hydrodynamic seal, and the second fluid is atmosphere, the hydrodynamic pumping-related leakage of the dynamic seal (which occurs as a result of relative motion between the relatively movable member and the dynamic seal) can enter into the second fluid and provide lubrication to the bearing of the backup ring.

The backup ring is typically located at least in part by a structural surface of the machine component, and in some cases may be supported by the structural surface. The outer periphery of the backup ring is preferably isolated from the pressure of the retained first fluid by the use of sealing material at the first and second outer sealing sites. These first and second sites are on opposite sides of the backup ring, The backup ring preferably has a modulus of elasticity at the annular gap that is greater than the modulus of elasticity of the resilient sealing material of the dynamic seal. The backup ring faces and bridges the annular gap between the housing and the relatively movable member, and defines and minimizes the effective extrusion gap clearance that the dynamic seal is exposed to, which increases the differential pressure capability of the dynamic seal. Metals and some plastics are examples of backup ring materials that have a modulus of elasticity that is greater than the modulus of elasticity of resilient seal materials. The preferred material for construction of the majority of the backup ring is metal, and preferably is a high modulus metal such as steel.

Preferably the backup ring is secured by a retainer that defines the extrusion gap clearance of the previously described first outer sealing site. Preferably, the size of the extrusion gap clearance of the first outer sealing site and the second inner and outer sealing sites is controlled by the axial length of the spacer section relative the captured axial length of the backup ring.

The dynamic seal and face seals that are used with the backup ring of the present invention may, if desired, incorporate one or more seal materials without departing from the spirit or scope of the invention, and may be composed of any suitable sealing material or materials, including elastomeric or rubber-like materials which may, if desired, be combined with various, plastic materials such as reinforced polytetrafluoroethylene ("PTFE") based plastic. If desired, the seals may be of monolithic integral, one piece construction or may also incorporate different materials bonded, co-vulcanized, or otherwise joined together to form a composite structure. Different materials may also be simply layered together radially or axially to create an effective seal. For example, prior art T-seals are composed of a ring of elastomer that is compressed against the surface to be sealed, and one or more mating rings of plastic to provide reinforcement at the extrusion gap. For another example, cap seals include an O-ring that compresses a plastic ring against the surface to be sealed, thereby presenting the plastic to the extrusion gap.

The invention is suitable for use with both compression-type (i.e., interference-type) and flexing, lip-type dynamic seals. The compression-type dynamic seal is maintained in direct compression against the relatively movable member in order to establish sealing contact force with the relatively movable member. The flexing lip-type seals include a flexible dynamic lip that contacts the relatively rotatable member. Sealing contact force is established by flexure of the dynamic lip, which can be assisted by energizing elements such as a spring or a compressed rubber element.

The invention can be configured for radial sealing applications where the dynamic seal and the backup ring slide dynamically with respect to a relatively movable surface of generally cylindrical form, such as the outwardly-facing surface of a shaft or sleeve, or the inwardly-facing surface of a bore.

The backup ring can, if desired, include at least one anti-rotation feature configured to engage an anti-rotation feature of another component, in order to prevent rotation of the backup ring in the event that relative rotation is present between the relatively movable member and one or more of the components that locate the backup ring axially. For example, the backup ring can incorporate an axially- or radially-oriented anti-rotation projection that engages a recess in the housing or the retainer. As another example, the anti-rotation projection can project from the retainer or the housing, and can engage a recess in the backup ring. The anti-rotation projection can be an integral part of the backup ring, retainer, or housing that it projects from. Alternately, the anti-rotation projection can be a separate piece secured to, or partly recessed in, the backup ring, retainer, or housing that it projects from.

The assembly of the present invention may be installed within a pressure housing of a machine, or a component of the present invention may serve as the pressure housing of a machine. The pressure housing may have a flange for threaded fasteners if desired. A static seal may be used to provide sealing between the pressure housing and some other machine element or elements. Oppositely facing pressure housing ends may provide surfaces for engaging and sealing with respect to other connecting equipment. Each of those ends may incorporate a groove for a ring gasket or other type of static seal. Each end surface may also include fastening means, such as threads, or a circle of tapped holes, for connecting with other equipment.

It is understood that the pressure housing can be integral to another machine component, and either end, or both, can be attached to other machine components, if desired. For example, a housing containing bearings or bearing surfaces that guide, or are guided by, the relatively movable member could be included at either end of the pressure housing, or on both ends of pressure housing, The pressure housing could optionally mount the bearings that guide, or are guided by, the relatively movable member, if desired. The pressure housing and the relatively movable member may have relative rotation with respect to one another. This is usually accomplished by configuring the relatively rotating member to be a shaft, and rotating the relatively movable member within the pressure housing. The relatively movable member is preferably supported for rotation by bearings. The bearings can be in the first fluid, the second fluid, and/or even in a third fluid such as the atmosphere.

The dynamic seal is preferably a hydrodynamic seal that exploits relative motion to lubricate the interface between the dynamic seal and the relatively movable surface. This hydrodynamic action is accomplished by having the seal provide at least one surface that converges gently with the relatively rotatable surface, so that the gentle convergence forms a hydrodynamic inlet for wedging the first fluid into the interface as a result of at least one direction of relative axial or rotational motion. In seals adapted for hydrodynamic lubrication in response to both relative rotation and one direction of relative axial motion, the gentle convergence may occur at a wavy flank of the seal that faces the first lubricant. As a result of the wavy flank, the interface between the dynamic seal and the relatively movable surface, which is sometimes called a "footprint," has a wavy edge facing the first fluid, which is preferably a lubricant.

The present invention is adaptable to many different types of equipment, such as, but not limited to, oilfield rotating control devices, pumps, oilfield rotary steerable tools, hydraulic swivels, machine tools, downhole drilling mud motors, rock drilling machines, piston amplifier-type lubricant reservoirs, side port oilfield drilling or cementing swivels, and coaxial swivels such as oilfield washpipe assemblies.

BRIEF DESCRIPTION OF THE DRAWINGS

So that the manner in which the above recited features, advantages and aspects of the embodiments of the present invention are attained and can be understood in detail, a more particular description of the invention, briefly summarized above, may be had by reference to the preferred embodiments thereof which are illustrated in the appended drawings, which drawings are incorporated as a part hereof.

It is to be noted however, that the appended drawings illustrate only typical embodiments of this invention and are therefore not to be considered limiting of its scope, for the invention may admit to other equally effective embodiments.

DESCRIPTION OF EMBODIMENTS OF THE INVENTION

Figure 1:
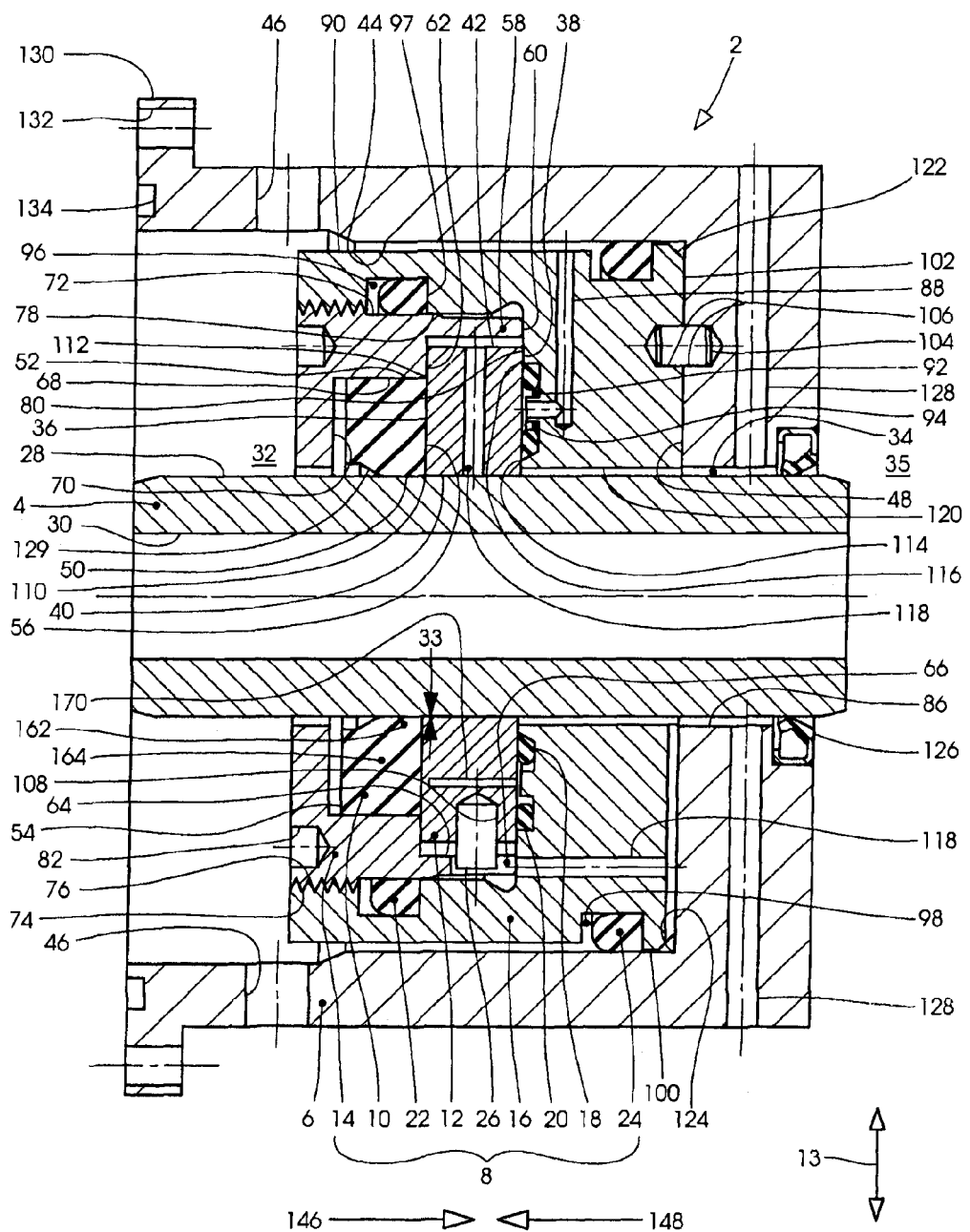
FIG. 1 is a fragmentary cross-sectional view of a portion of a sealed machine assembly according to a preferred embodiment of the present invention.

The aspects, features, and advantages of the embodiments of the invention mentioned above are described in more detail by reference to the drawings, wherein like reference numerals represent like elements.

FIG. 1 features throughout this specification that are represented by like numbers have the same basic function. Referring now to the drawings and first to FIG. 1, a longitudinal cross-sectional view of a sealed machine assembly is shown generally at 2, showing the parts located concentrically to one another.

The machine assembly 2 incorporates a shaft 4 that is relatively movable with respect to a machine housing 6, and is relatively movable with respect to a sealing assembly 8. The sealing assembly 8 is preferably comprised of a number of components including a dynamic seal 10, a backup ring 12, a retainer 14, a bulkhead housing 16, an inner balancing seal 18, an outer balancing seal 20, a retainer seal 22, a housing seal 24, and an anti-rotation tang 26.

By the term "longitudinal cross-sectional view," what is meant throughout this specification is the imaginary cutting plane of the cross-sectional view is aligned with and passes through the theoretical axis of the shaft 4. The term "axis" is well-understood in mechanical engineering, and in the field of drafting is sometimes illustrated using a centerline in longitudinal cross-sectional views, as has been done in FIG. 1.

The shaft 4 is located at least partially within the housing 6, dynamic seal 10, backup ring 12, retainer 14, bulkhead housing 16, inner balancing seal 18, outer balancing seal 20, and retainer seal 22. In other words, the housing 6, dynamic seal 10, backup ring 12, retainer 14, bulkhead housing 16, inner balancing seal 18, outer balancing seal 20, and retainer seal 22 surround at least part of the shaft 4. The retainer 14 preferably surrounds, and is preferably located radially outward of, at least a portion of the shaft 4 and is preferably located at least partially within the bulkhead housing 16 and is preferably retained to the bulkhead housing 16. Arrangements are possible, however, where the retainer 14 is not located within the bulkhead housing 16.

The machine housing 6 and sealing assembly 8 are preferably stationary with respect to one another in the axial and rotational directions, such that relative axial and/or rotary motion between the shaft 4 and sealing assembly 8 also results in relative axial and/or rotary motion between the shaft 4 and the machine housing 6. The shaft 4 and sealing assembly 8 have relative axial and/or rotary motion with respect to each other during at least some portion of the operation of the machine assembly 2. Whether or not relative reciprocation is occurring, the shaft 4 may rotate within the sealing assembly 8, the sealing assembly 8 may rotate around the shaft 4, or both the shaft 4 and sealing assembly 8 may rotate at different speeds and/or directions, resulting in relative rotation between the shaft 4 and the sealing assembly 8. Whether or not relative rotation is occurring, the shaft 4 may reciprocate within the sealing assembly 8, the sealing assembly 8 may reciprocate along the shaft 4, or both the shaft 4 and sealing assembly 8 may reciprocate at different speeds and/or directions, resulting in relative axial motion (relative reciprocation) between the shaft 4 and the sealing assembly 8. Factors such as, but not limited to, vibration and side loads can cause relative lateral motion between the shaft 4 and the machine housing 6 (and between the shaft and various components of the sealing assembly 8), especially during periods of relative rotation and/or relative reciprocation.

The shaft 4 includes an external sealing surface 28 of generally cylindrical form that is located at least partially within the dynamic seal 10, backup ring 12, retainer 14, and bulkhead housing 16. Since the sealing surface 28 is part of the shaft 4, it has relative motion with respect to the sealing assembly 8 whenever the shaft 4 does. If desired, the shaft 4 can take the form of a sleeve (often called a wear sleeve) that is mounted on, and therefore a component of, another shaft. At least part of the sealing surface 28 is preferably located at least partially within the bulkhead housing 16, and is preferably relatively movable with respect to the bulkhead housing 16.

If desired, the shaft 4 may also include an internal passage 30. Such an internal passage 30 can serve various purposes, as desired. For example, the internal passage may serve as a conduit for fluid, or may provide an opening for receiving some other machine component. For example, the passage within the shaft of an oilfield rotary steerable tool or of an oilfield washpipe assembly serves as a conduit for drilling fluid, and the passage within the shaft of an oilfield rotary control device provides an opening allowing the passage of a drill string. When the machine assembly 2 is used as part of a rotary control device, one or more passive stripper rubbers or active packing elements may be attached to the shaft 4 for sealing with respect to a drill string passing through the internal passage 30.

Although the subject matter is sometimes described herein in the context of a rotary control device for control of well pressure while drilling, or in the context of an oilfield washpipe assembly, it is to be understood that the invention is applicable to other types of machinery. In a rotating control device of the general type shown in U.S. Pat. Nos. 5,588,491 and 5,662,171, the shaft is capable of both rotational and reciprocating motion relative to the dynamic seal, which makes such a rotating control device an exceptionally appropriate example of where the present invention can be advantageously used.

In some equipment, the pressure of a first fluid 32 may also be used as a hydraulic control pressure. For example, in an active-type rotating control device, the pressure of the first fluid 32 is sometimes used to actuate the active packing element around a drill string. For example, in U.S. Pat. No. 5,279,365, hydraulic pressure causes an outer packer to urge an elastomeric inner packer radially inward against the drillstring, without requiring an axially moving piston.

If desired, the shaft 4 can be guided by bearings of any suitable type. If desired, such bearings can be located by and positioned by the machine housing 6 or the bulkhead housing 16, or located by and positioned by some other machine component not represented by FIG. 1, such as a machine component directly or indirectly connected to the machine housing 6 or the bulkhead housing 16.

The sealing assembly 8 partitions the first fluid 32 from a second fluid 34, and may also partition the second fluid 34 from a third fluid 35, if desired. The backup ring 12 is designed especially to improve performance of the dynamic seal 10 in situations where the first fluid 32 is at a significantly greater pressure than the second fluid 34. The difference in pressure between one fluid and another, such as the first fluid 32 and the second fluid 34, is referred to as differential pressure. For purposes of this specification, the term fluid has its broadest possible meaning and encompasses both liquids and gases. The machine housing 6 preferably serves as a container for at least a portion of the first fluid 32, and defines a shaft passageway 86 which is larger than the shaft 4. The shaft passageway 86 is typically large enough to accommodate anticipated levels of relative lateral motion between the machine housing 6 and the shaft 4 without heavily loaded contact between the shaft 4 and the shaft passageway 86. If desired, however, the shaft passageway 86 could be provided with suitable length, clearance, and composition to serve as a journal bearing for guiding the shaft 4. It should be understood that the machine housing 6, the dynamic seal 10, the backup ring 12, the retainer 14, the bulkhead housing 16, the inner balancing seal 18, the outer balancing seal 20, the retainer seal 22, and the housing seal 24 preferably have a portion thereof exposed to the first fluid 32, and the pressure of the first fluid 32.

It should be understood that the machine housing 6, the dynamic seal 10, the backup ring 12, the retainer 14, the bulkhead housing 16, the inner balancing seal 18, the outer balancing seal 20, the retainer seal 22, the anti-rotation tang 26, an anti-rotation dog 104, an outboard seal 126, and the housing seal 24 preferably have a portion thereof exposed to the second fluid 34, and the pressure of the second fluid 34.

If desired, the machine housing 6 may include a flange 130 with bolt holes 132, or other suitable connection means, for connection to some other machine component or assembly not represented by FIG. 1, and may also include a seal gland 134 of any suitable type for holding a seal for establishing a sealed relationship with such other machine component or assembly.

The pressure of the first fluid 32 and/or the second fluid 34 can be provided by any suitable pressure supply, such as, but not limited to, the types of pressure supplies described in conjunction with the prior art. One form of a suitable pressure supply would be one of the prior art computer-controlled pressure supplies, where a hydraulic fluid is circulated through an orifice. Either the orifice size or the flow rate is varied to appropriately vary the pressure. Another example of a suitable pressure supply would be the differential area piston arrangement described in conjunction with prior art pressure-staged washpipe assemblies. Various types of prior art pressure supplies are described in the "Kalsi Seals Handbook," which is a publication of Kalsi Engineering Inc. of Sugar Land, Tex.

The teachings of FIG. 1 are most applicable where the pressure of the first fluid 32 is typically greater than or equal to the pressure of the second fluid 34.

One purpose of the backup ring 12 is to support the dynamic seal 10 against differential pressure that may be acting across the dynamic seal 10 due to the pressure of the first fluid 32 being greater than the pressure of the second fluid 34. An aspect of the backup ring 12 is to prevent or minimize the extrusion damage of the dynamic seal 10. Another aspect of the backup ring 12 is to improve any intended hydrodynamic interfacial lubrication of the dynamic seal 10 by minimizing the differential pressure induced contact pressure between the dynamic seal 10 and the sealing surface 28 of the shaft 4 near the backup ring 12.

In its relaxed state, the diameter of the ring inner surface 40 of the backup ring 12 is preferred to be larger than the sealing surface 28 of the shaft 4 for ease of assembly. Preferably, the clearance between the ring inner surface 40 and the sealing surface 28 is made as small as practicable, considering factors such as tolerances, differential thermal expansion between the ring inner surface 40 of the backup ring 12 and the sealing surface 28 of the shaft 4 during operation, pressure-induced outward deformation (pressure breathing) of the shaft 4 and radial force imbalance that may act on the backup ring 12 to cause the diameter of the ring inner surface 40 to become smaller. This radial force imbalance can exist even though the pressure acting on the ring outer surface 42 and ring inner surface 40 is identical, because the area of the ring outer surface 42 is greater than the area of the ring inner surface 40.

The backup ring 12 is of generally circular ring-like configuration, and has a first ring end 36 and a second ring end 38, which face in opposite directions. The first ring end 36 faces in the general direction of the first fluid 32 and a retaining shoulder 62 of the retainer 14, and the second ring end 38 faces in the general direction of the second fluid 34 and a locating shoulder 80 of the bulkhead housing 16. The locating shoulder 80 is preferably a generally planar (flat) surface, and preferably faces in a generally axial direction. Typically the first ring end 36 and the second ring end 38 of the backup ring 12 are substantially planar (flat) surfaces that are parallel to one another, but as shown by and described in conjunction with FIG. 6, other arrangements are possible and may be employed in certain special cases where it is desired that radial force imbalance be addressed.

If desired, the first ring end 36 and second ring end 38 of the backup ring 12, the sealing surface 28 of the shaft 4, the retaining shoulder 62 of the retainer 14 and/or the locating shoulder 80 of the bulkhead housing 16 may be treated with a low friction and/or hard surfacing treatment, to enhance the wear resistance and/or the frictional properties thereof. Examples of such treatments include nickel- or cobalt-based tungsten carbide coatings, PTFE coating, diamond coating, boronizing, hard chrome coating, nitriding, colmonoy, stellite or other welded hardfacing, or other surface enhancement coatings or surface modification techniques, including ion beam deposition.

The backup ring 12 has a ring inner surface 40 and a ring outer surface 42. The ring inner surface 40 is preferably generally cylindrical, and encircles and faces the sealing surface 28 of the shaft 4, preferably serving as a journal bearing to locate the backup ring 12 laterally with respect to the sealing surface 28 of the shaft 4. For ease of manufacture, the ring outer surface 42 may be generally cylindrical, if desired.

Figure 1A:
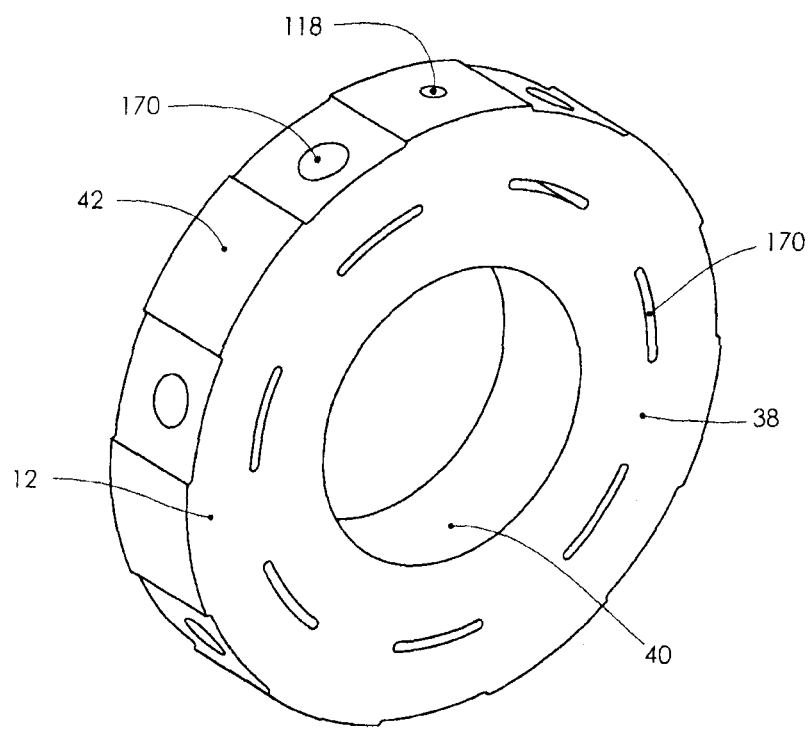
FIG. 1A is an axonometric view of an embodiment of the backup ring shown in FIG. 1
Figure 1B:
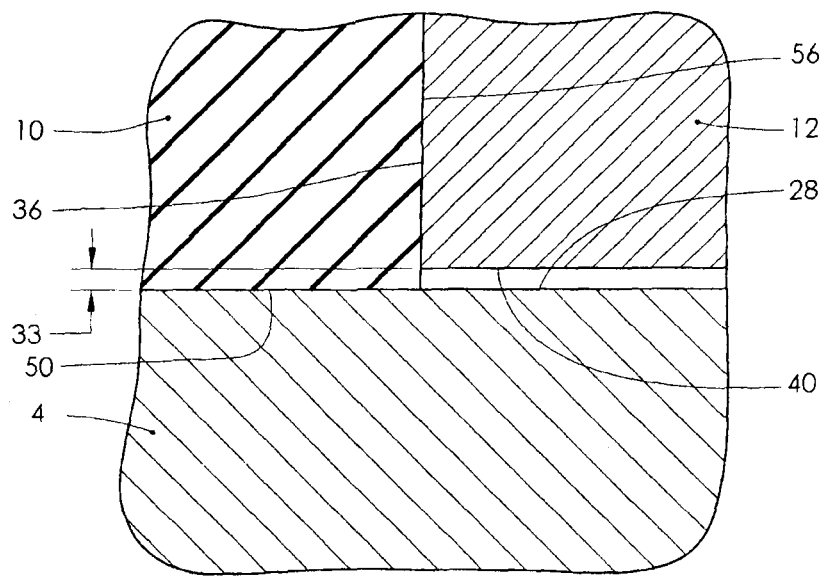
FIG. 1B is an enlarged view of a portion of the backup ring, dynamic seal, shaft and extrusion gap shown in FIG. 1.

As shown in the enlarged view of FIG. 1B, the clearance between the ring inner surface 40 and the sealing surface 28 defines the extrusion gap 33 that the dynamic seal 10 must bridge/seal in order to withstand the differential pressure between the first fluid 32 and the second fluid 34, and to prevent the pressure driven wholesale loss of the first fluid 32.

Throughout this specification, the portion of the backup ring 12 that establishes the ring inner surface 40 at the first inner sealing site 110 is preferably made from a material having a greater modulus of elasticity than the modulus of elasticity of the portion of the dynamic seal 10 which is in contact with the sealing surface 28 of the shaft 4 at the first inner sealing site 110. Indeed, it is preferred that all or substantially all of the backup ring 12 be made from a material having a greater modulus of elasticity than the modulus of elasticity of the portion of the rotary dynamic seal 10 which is in contact with the sealing surface 28 of the shaft 4 at the first inner sealing site 110. The backup ring is preferably comprised of metal and in many cases will be entirely composed of metal.

The machine housing 6 preferably comprises at least one housing bore 44, at least one fluid port 46, and a support shoulder 48 of generally planar configuration. The at least one housing bore 44 preferably surrounds the housing seal 24 and preferably surrounds at least part of the shaft 4.

If desired, the first fluid 32 can be circulated in through one fluid port 46 and out another fluid port 46, for cooling purposes. Obviously, the inlet or exit port can also be located in some other component connected directly or indirectly to the sealing assembly 8 if desired. If desired, the first fluid 32 and/or the second fluid 34 can be a lubricant or otherwise have lubricating properties. If desired, the second fluid 34 can be retained by an outboard seal 126. If desired, an outboard port 128 can be incorporated for introducing the second fluid 34 into the sealed region between the dynamic seal 10 and the outboard seal 126. If desired, more than one outboard port 128 can be incorporated for circulating the second fluid 34 for cooling or other purposes. If desired, the outboard seal 126 could be incorporated into a laterally translating seal carrier (not shown) of a type known in the prior art, such that the outboard seal 126 could translate laterally in concert with any lateral motion of the shaft 4. If desired, the outboard seal 126 could also be supported by a laterally translatable backup ring of the general type disclosed by this specification. As a simplification, if desired, the outboard seal 126 and outboard port 128 may be omitted.

Preferably, the dynamic seal 10 includes a seal body 164 of generally circular ring-like construction comprised of sealing material. The dynamic seal 10 encircles the sealing surface 28 of the shaft 4. The seal body 164 includes a dynamic lip 162 having a dynamic sealing surface 50 that may project radially inward, contacting and establishing a sealed relationship with the sealing surface 28 of the shaft 4, however arrangements are possible (such as with a cap seal) where the dynamic sealing surface 50 is not part of a projecting dynamic lip. The dynamic seal 10 also may have a static sealing surface 52, a first seal end 54, and a second seal end 56. The dynamic sealing surface 50 is held in sealing contact with the sealing surface 28 of the shaft 4. When the shaft 4 and dynamic seal 10 have relative axial and/or rotational movement with respect to one another, the sealing contact between the dynamic sealing surface 50 and the sealing surface 28 is a sliding sealing contact. When the shaft 4 and dynamic seal 10 do not have relative axial or rotational movement with respect to one another, the sealing contact between the dynamic sealing surface 50 and the sealing surface 28 is a static sealing contact. The first seal end 54 faces the first fluid 32, and the second seal end 56 faces the first ring end 36. Preferably, when the differential pressure acts on the dynamic seal 10, at least part of the second seal end 56 contacts, and is supported by, at least part of the first ring end 36, applying the pressure of the first fluid 32 to the first ring end 36.

It is to be understood that the term "dynamic seal" is provided as the name for a particular seal of the sealing assembly 8, the term "dynamic lip" is provided as the name of a particular feature on that seal, and the term "dynamic sealing surface" is provided as the name of a particular surface on that seal. The terms "ring-like" and "ring" are used with the understanding that the term "ring" is commonly understood to encompass shapes other than the perfectly circular. As an example, a decorative finger ring often has beaded edges or a sculpted shape, yet is still called a ring. As another example, the "ring" of Lewis F. Korns' U.S. Pat. No. 1,462,205 is not everywhere circular. There are numerous precedents for using the term "ring-like" in a patent, and many patents use the term in conjunction with a seal or a body of a seal. For example, see U.S. Pat. Nos. 612,890, 4,361,332, 4,494,759, 4,610,319, 4,660,839, 4,909, 520, 5,029,879, 5,230,520, 5,584,271, 5,678,829, 5,833,245, 5,873,576, 6,109,618, and 6,120,036. Note that in many of the examples, the item in question has features that result in the shape not being everywhere circular; for example, in some cases the dynamic lip of a ring-like seal has a wavy flank shape.

If desired, the dynamic seal 10 can be a hydrodynamic rotary seal with the dynamic lip 162 having a lubricant side flank 129 that is preferably wavy in the axial direction, exposed to the first fluid 32, and configured to provide a hydrodynamic inlet that hydrodynamically wedges a lubricating film of the first fluid 32 between the dynamic sealing surface 50 and the sealing surface 28 in response to relative rotation between the dynamic seal 10 and the sealing surface 28 of the shaft 4. The lubricant side flank 129 also provides a hydrodynamic inlet that wedges lubricant between the dynamic sealing surface 50 and the sealing surface 28 in response to one direction of relative axial motion. The lubricant side flank 129 is preferably sloped with respect to the sealing surface 28 of the shaft 4, and this slope provides gradual convergence with the sealing surface 28 of the shaft 4. This gradual convergence is one of the features that provides the hydrodynamic inlet aspect of the dynamic seal 10, introducing a film of the first fluid 32 between the dynamic sealing surface 50 and the sealing surface 28 in response to relative axial or rotational motion between the dynamic seal 10 and the sealing surface 28 of the shaft 4. If relative rotation is not anticipated, the wavy aspect of the lubricant side flank 129 is not strictly needed, but the sloping with respect to the sealing surface 28 may still be desirable to provide lubrication in response to relative axial motion. The slope of the lubricant side flank 129 in the axial direction also provides slope in the circumferential directions if the lubricant side flank 129 varies in position axially in a wavy pattern.

When relative rotation is anticipated, it is preferred that dynamic seal 10 in FIG. 1, and in other figures herein, be a hydrodynamic seal such as those sold by Kalsi Engineering, Inc. under the registered trademark KALSI SEALS®. The dynamic sealing surface 50 of such seals is lubricated in response to relative rotation, as the result of the special hydrodynamic lubrication features of KALSI SEALS® seals. These hydrodynamic features can be broadly characterized as establishing a sealing footprint against the relatively movable surface of the shaft 4, wherein the footprint has a wavy footprint edge that faces the first fluid 32.

Examples of such seals are provided in U.S. Pat. Nos. 4,610,319; 5,195,754; 5,230,520; 5,678,829; 5,738,358; 5,823,541; 5,873,576; 6,007,105; 6,036,192; 6,109,618; 6,120,036; 6,227,547; 6,315,302; 6,334,619; 6,382,634; 6,494,462; 6,561,520; 6,685,194; 6,767,016; 7,052,020; 7,562,878; and 8,056,904. Among these, the seals disclosed by U.S. Pat. Nos. 7,562,878 and 8,056,904, entitled "Low Torque Hydrodynamic Lip Geometry for Bi-Directional Rotation Seals," are preferred because of their low running torque and heat generation characteristics, and the ability to handle high differential pressure with thin, low viscosity lubricants.

The sealing material referenced herein can be any sealing material, including elastomeric or rubber-like materials such as an elastomer compound or a combination of one or more elastomer compounds, and including various plastic materials, and including different materials bonded together to form a composite structure or inter-fitted together, or stacked axially together radially or axially, and including a combination of a suitable plastic and an elastomer compound, and including fabric reinforced elastomer.

It is commonly understood by those having ordinary skill in the art that elastomers used in seal construction are compounds that include one or more base elastomers. Such base elastomers include, but are not limited to, HNBR (hydrogenated nitrile) which is also known as HSN (highly saturated nitrile), FKM (fluorocarbon rubber), FEPM (also known as TFE/P or tetrafluoroethylene and propylene copolymer), and EPDM. Such compounds may include other compounding agents including fillers, processing aids, anti-degradants, vulcanizing agents, accelerators and activators. The effects of the ingredients used are generally understood by those of ordinary skill in the art of compounding elastomers. Likewise, the ingredients used in manufacturing plastics that are used in sealing applications are generally understood by those of ordinary skill in the art of developing plastic materials.

The retainer 14 defines a spacer section 58 between a spacer nose 60 and the retaining shoulder 62. The axial length of the spacer section 58 is the axial distance between the spacer nose 60 and the retaining shoulder 62. For the purpose of discussing the fit of the backup ring 12 between the retaining shoulder 62 of the retainer 14 and the locating shoulder 80 of the bulkhead housing 16, the "captured axial length" of the backup ring 12 is the axial distance between the portions of the first ring end 36 and the second ring end 38 that fit directly between the retaining shoulder 62 and the locating shoulder 80. The axial length of the spacer section 58 is slightly greater than the captured axial length of the backup ring 12, to ensure that the backup ring 12 cannot be clamped between the retaining shoulder 62 and the bulkhead housing 16. This lack of clamping is one factor that ensures the ability of the backup ring 12 to move laterally in response to any lateral motion of the shaft 4. For example, if the axial length of the spacer section 58 was 0.003 inches longer than the captured axial length of the backup ring 12, the backup ring 12 would not be clamped between the retaining shoulder 62 of the retainer 14 and the locating shoulder 80 of the bulkhead housing 16, and the axial extrusion gap at a first outer sealing site 112 would be relatively small.

The spacer bore 64 of the spacer section 58 is larger than the ring outer surface 42 of the backup ring 12, so as to allow room for the backup ring 12 to move laterally in response to any lateral motion of the shaft 4. The shape of the spacer bore 64 is preferably circular, for ease of manufacture. The spacer section 58 preferably includes an anti-rotation pocket 66 to receive the anti-rotation tang 26, however the anti-rotation tang 26 and the anti-rotation pocket 66 can be eliminated if little or no relative rotation is anticipated between the shaft 4 and the retainer 14. In FIG. 1, the anti-rotation pocket 66 is illustrated as an axially oriented slot, but other suitable shapes are possible, such as radially-oriented drilled through holes, and radially-oriented internal blind holes, as shown in other figures.

If desired, the retainer 14 may form a gland bore 68 and a gland wall 70 for locating the dynamic seal 10. The gland bore 68 is located in spaced relation to the sealing surface 28 of the shaft 4. The retainer 14 preferably includes a retainer sealing surface 72 that is in sealing engagement with the retainer seal 22. The retainer 14 preferably includes external threads 74, and the bulkhead housing 16 preferably includes mating internal threads 76, allowing the retainer 14 to be threadedly retained to the bulkhead housing 16. Additional locking features can be added, if desired, to lock the threads from loosening. The external threads 74 and the internal threads 76 are preferably clocked in a direction that matches any predominant direction of relative rotation between the shaft 4 and the retainer 14. If desired, the retainer 14 may incorporate wrench engaging surfaces 82 to facilitate tightening of the external threads 74 of the retainer 14 to the internal threads 76 of the bulkhead housing 16. In FIG. 1, the wrench engaging surfaces 82 are illustrated as blind holes for engaging a spanner wrench, but may take other appropriate forms, such as a hexagonal form for engaging a hexagonally-shaped wrench. If desired, the bulkhead housing 16 may also incorporate wrenching surfaces of any appropriate form and location for engaging a wrench that is used when tightening the external threads 74 to the internal threads 76. In FIG. 1, the dog recess 106 of the bulkhead housing 16 can serve as such a wrenching surface.

The retainer 14 may be retained or attached to the bulkhead housing 16 by any suitable retaining or attachment means, including threaded means such as threads, bolts, screws and studs, retaining rings, hammer unions, etc., and including external clamping means, bayonet-type latches, deformable rims or tangs, retaining ring(s), welding, soldering, bonding, friction, interference fit, etc. without departing from the spirit or scope of the invention. The retainer 14 and bulkhead housing 16 may be made from any suitable material, such as metal, plastic or reinforced plastic, or a combination thereof.

The retainer 14 can be of any suitable configuration. For example, the spacer section 58 could be a separate component. Indeed, having the spacer section 58 as a separate component yields the advantage that the length of the spacer section 58 can be established by grinding, resulting in very precise control of the axial length of the spacer section 58. For another example, the threaded portion of the retainer 14 could be a separate threaded ring. For another example, the threads could be eliminated from the retainer 14 and the bulkhead housing 16, and the retainer 14 could be secured by a retaining ring engaging a retaining ring groove in the bulkhead housing 16.

The bulkhead housing 16 defines an internal cavity for receiving various components such as the backup ring 12 and the retainer 14, comprising a cavity bore 78 and the locating shoulder 80. The cavity bore 78 is an inwardly facing surface that is oriented toward the outwardly facing retainer sealing surface 72 and an outwardly facing surface of the spacer section 58. The spacer nose 60 is preferably in contact with the locating shoulder 80. The retainer 14 is preferably located at least partly within the cavity bore 78 and preferably surrounds at least part of the shaft 4. Preferably, the bulkhead housing 16 defines a pilot surface 100 that faces the machine housing bore 44, and serves to more or less center the bulkhead housing 16 with respect to the housing bore 44 of the machine housing 6. The diameter of an innermost surface 120 of the bulkhead housing 16 is preferably larger than the local size of the shaft 4, in order to provide room to accommodate any relative lateral movement between the shaft 4 and the machine housing 6. The cross-section of the bulkhead housing 16 is preferably generally L-shaped, as shown. Although the bulkhead housing 16 is illustrated as a single component, it could be formed of two or more components fastened together, if desired.

Figure 7:
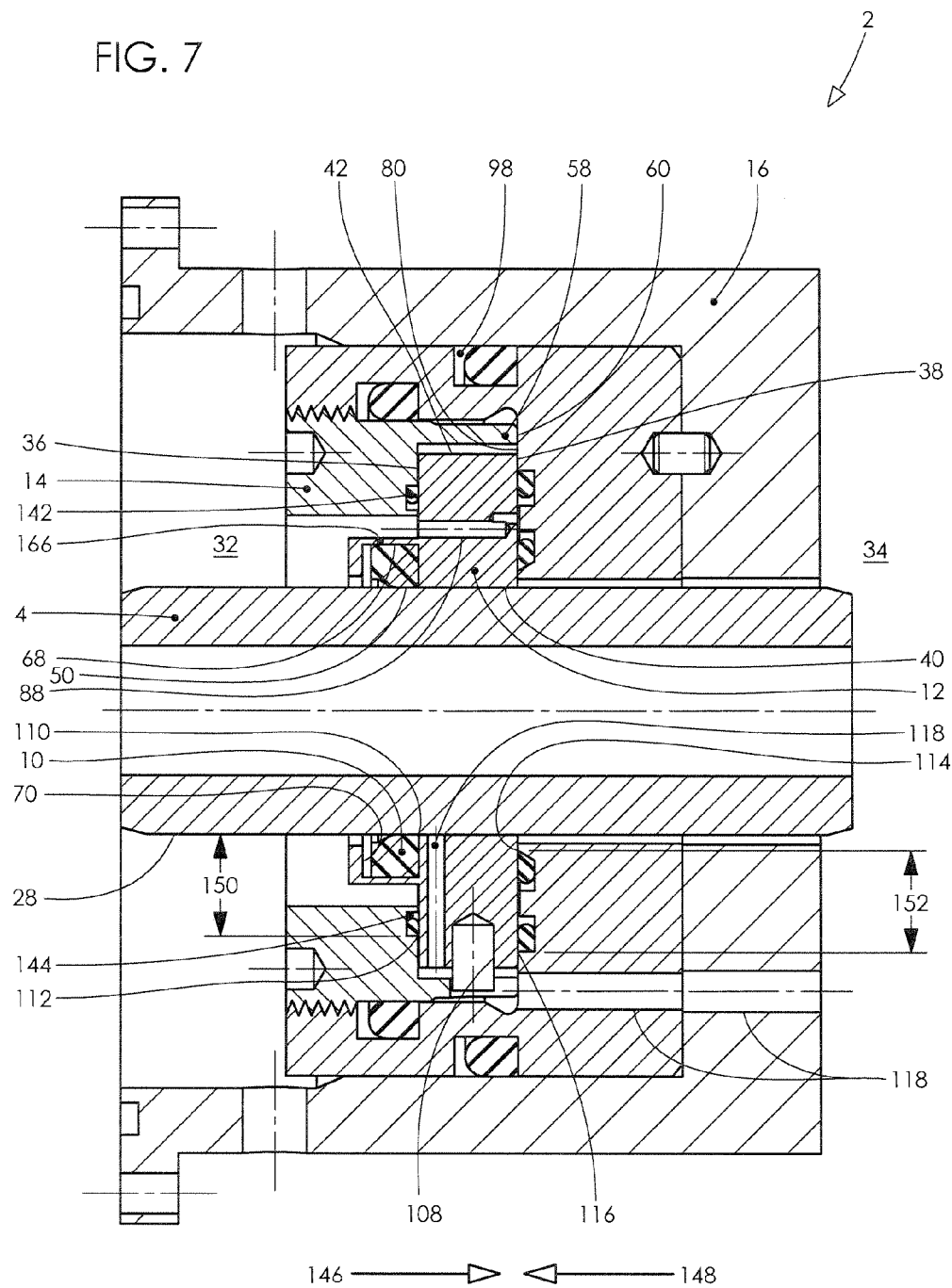

The sealing assembly 8 provides a pressure passageway for communication of the first fluid 32 to the region between the inner balancing seal 18 and the outer balancing seal 20. This communication can be provided by any appropriate means. In FIG. 1, this pressure passageway consists of the annular clearance between the housing bore 44 of the machine housing 6 and an exterior surface 90 of the bulkhead housing 16, combined with the pressure passage 88. Other appropriate means are possible. For example, an axial hole (not shown) through the bulkhead housing 16, connecting with the pressure passage 88, would serve the same pressure communication function as the annular clearance between the housing bore 44 of the machine housing 6 and the exterior surface 90 of the bulkhead housing 16. In FIG. 1 the pressure passage 88 is illustrated as a cross-drilled hole (i.e. a combination of intersecting holes) in the bulkhead housing 16, but other arrangements are possible where the pressure passage 88 passes through the backup ring 12, as shown in FIG. 7.

The inner balancing seal 18 is comprised of sealing material, can take any suitable form, and is deployed in face sealing fashion between the bulkhead housing 16 and the second ring end 38 of the backup ring 12, and establishes a sealed relationship between the bulkhead housing 16 and the backup ring 12. This sealed relationship prevents the escape of the first fluid 32 into the second fluid 34. The inner balancing seal 18 is illustrated as being mounted in an inner seal groove 94 that is cut into the locating shoulder 80 of the bulkhead housing 16, however as an alternative, the inner seal groove 94 could be cut into the second ring end 38 of the backup ring 12. The important thing is that the inner balancing seal 18 establish sealing between the bulkhead housing 16 and the second ring end 38 of the backup ring 12.

The outer balancing seal 20 is comprised of sealing material, can take any suitable form, and is deployed in face sealing fashion between the bulkhead housing 16 and the second ring end 38 of the backup ring 12, and establishes a sealed relationship between the bulkhead housing 16 and the backup ring 12. This sealed relationship prevents the escape of the first fluid 32 into the second fluid 34. The outer balancing seal 20 is illustrated as being mounted in an outer seal groove 92 that is cut into the locating shoulder 80 of the bulkhead housing 16, however as an alternative, the outer seal groove 92 could be cut into the second ring end 38 of the backup ring 12. The important thing is that the outer balancing seal 20 establish sealing between the bulkhead housing 16 and the second ring end 38 of the backup ring 12.

With reference to FIG. 1, it is to be understood that inner balancing seal 18 and outer balancing seal 20 have a sliding relationship with the backup ring 12 when the backup ring 12 is moving laterally with respect to the bulkhead housing 16 to follow any relative lateral motion between the bulkhead housing 16 and the shaft 4. The inner balancing seal 18 and outer balancing seal 20 are preferably selected from the group of seals which have low breakout friction and good extrusion resistance. If desired, the inner balancing seal 18 and outer balancing seal 20 can be treated or coated to achieve low breakout force characteristics.

The inner balancing seal 18 and outer balancing seal 20 can be compression-type elastomer seals if desired. With compression-type elastomer seals the pressure of the first fluid 32 acts throughout the elastomer as if the elastomer were a fluid. This means that the effective pressure boundary is established at the seal groove wall that is closest to the second fluid 34.

T-seals are a preferred type of seal for use as the inner balancing seal 18 and outer balancing seal 20. T-seals are a well-known type of prior art seal known for low friction and good extrusion resistance in high differential pressure conditions. With a T-seal, the effective pressure boundary is also established at the seal groove wall that is closest to the second fluid 34, even though the T-seal places a plastic backup ring against the seal groove wall that is closest to the second fluid 34. This is accomplished because the plastic backup ring of a T-seal is energized against the backup ring 12 by an overlapping section of elastomer, and the pressure of the first fluid 32 acts through the overlapping elastomer as if the elastomer were a fluid. With other types of seals, such as flexing lip-type seals, the effective pressure boundary can be determined, but is not necessarily located at a groove wall. Another preferred type of seal for use as the inner balancing seal 18 and outer balancing seal 20 is the prior art face sealing cap seal, where a ring of elastomer is axially compressed against a ring of plastic that bridges/seals the interface between the backup ring 12 and the bulkhead housing 16.

The retainer seal 22 is comprised of sealing material, can take any suitable form, and establishes a sealed relationship between the retainer 14 and the bulkhead housing 16 to prevent the escape of the first fluid 32 into the second fluid 34, and to isolate the ring outer surface 42 of the backup ring 12 from the pressure of the first fluid 32. The retainer seal 22 is preferably mounted in a retainer seal groove 96 that is cut/formed into the cavity bore 78 of the bulkhead housing 16, however arrangements are possible where the retainer seal groove 96 would be cut into the retainer 14. The retainer seal 22 establishes the outer boundary of a retainer sealed area called the "retainer hydraulic area" that is exposed to the differential pressure that results from the pressure of the first fluid 32 being greater than the pressure of the second fluid 34. The inner boundary of this retainer hydraulic area is established at the first outer sealing site 112 that is established between the retainer 14 and the backup ring 12. Differential pressure acting on the retainer hydraulic area creates an axial force on the retainer 14 that helps to hold the spacer nose 60 of the retainer 14 against the locating shoulder 80 of the bulkhead housing 16, and also helps to prevent the external threads 74 of the retainer 14 from unthreading from the internal threads 76 of the bulkhead housing 16. Notice that the axial placement of the retainer seal 22 causes the entire length of the retainer 14 to be radially pressure balanced. Everywhere the interior of the retainer 14 is exposed to the pressure of the first fluid 32, the exterior of the retainer 14 is also exposed to the pressure of the first fluid 32. Everywhere the interior of the retainer 14 is exposed to the pressure of the second fluid 34, the exterior of the retainer 14 is also exposed to the pressure of the second fluid 34.

The retainer seal 22 is preferably located at least partially within the retainer seal groove 96 which preferably holds the retainer seal 22 in radial compression against the retainer sealing surface 72. The retainer seal groove 96 preferably incorporates a groove wall, known herein as the supporting wall 97, which supports the retainer seal 22 against the differential pressure between the first fluid 32 and the second fluid 34. The supporting wall 97 is preferably substantially aligned with the first ring end 36 of the backup ring 12 in the axial direction, so that the retainer 14 is substantially pressure balanced in the radial direction along its entire length. For the purposes of this specification, the supporting wall 97 being substantially aligned with the first ring end 36 of the backup ring 12 can be achieved by having the supporting wall 97 in approximate alignment with the retaining shoulder 62 of the retainer 14, if desired, since the possible clearance between the retaining shoulder 62 of the retainer 14 and the first ring end 36 of the backup ring 12 is intentionally quite small.

Figure 2:
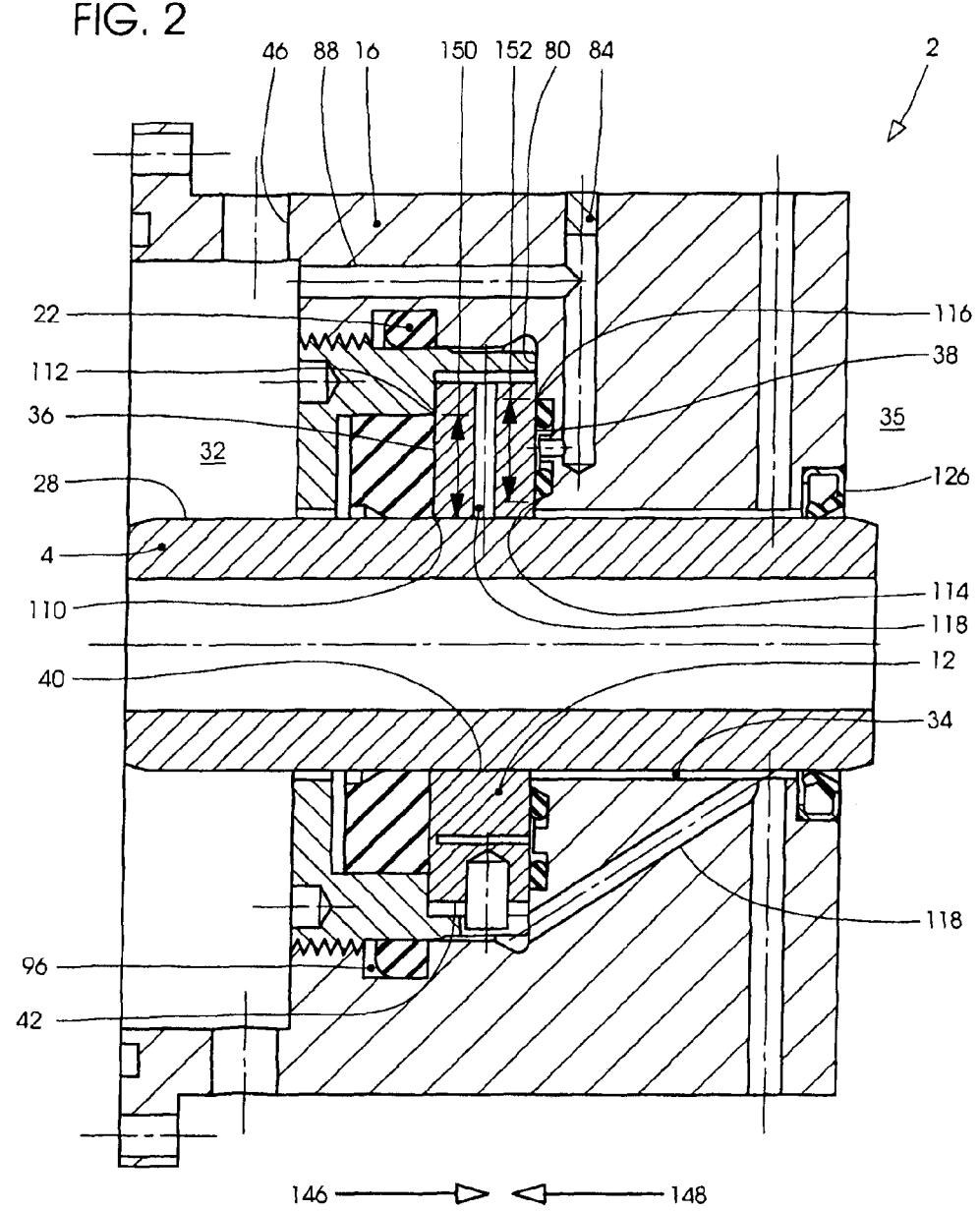
FIGS. 2-9, 12 and 13 are fragmentary cross-sectional views of a portion of a sealed machine assembly according to other embodiments of the present invention.

The housing seal 24 is comprised of sealing material, can take any suitable form, and establishes a sealed relationship between the bulkhead housing 16 and the housing bore 44 of the machine housing 6 to prevent the escape of the first fluid 32 into the second fluid 34. Simplifications are possible where the housing seal 24 and seal groove 98 are eliminated by merging the machine housing 6 and the bulkhead housing 16 into a single component, as shown by FIG. 2. As illustrated in FIG. 1, the sealed engagement between the housing seal 24 and the housing bore 44 of the machine housing 6 establishes the outer boundary of a bulkhead sealed area that is exposed to the differential pressure between the first fluid 32 and the second fluid 34. The inner boundary of the bulkhead sealed area is established by the sealing engagement between the dynamic sealing surface 50 of the dynamic seal 10 and the sealing surface 28 of the shaft 4.

The differential pressure between the first fluid 32 and the second fluid 34 acting on this bulkhead sealed area creates an axial force on the bulkhead housing 16 that helps to hold the bulkhead housing 16 squarely against the support shoulder 48 of the machine housing 6. This differential pressure driven axial force produces friction between the bulkhead housing 16 and the machine housing 6 which serves to prevent relative rotation between the bulkhead housing 16 and the machine housing 6 in the event that relative rotation between the shaft 4 and the bulkhead housing 16 occurs.

Although the housing seal 24 is preferably mounted in a seal groove 98 that is cut into the bulkhead housing 16, arrangements are possible where the seal groove 98 would be cut into the machine housing 6 and engage a mating surface of the bulkhead housing 16. Although the housing seal 24 is illustrated as a radial seal, arrangements are possible where the seal groove 98 is cut into the support shoulder 48 or the mating bulkhead end surface 102, such that the housing seal 24 is deployed in face sealing fashion between the bulkhead housing 16 and the machine housing 6. Alternatively, there could be two housing seals, one a radial seal as shown, and one a face seal as described. Alternatively, the housing seal 24 could be squeezed between the beveled end 122 of the bulkhead housing 16 and the internal corner 124 of the machine housing 6. Examples of seal options for retainer seal 22 and housing seal 24 include but are not limited to O-rings, square rings, O-ring energized lip seals, O-rings with backup rings, cap seals, and T seals.

The backup ring 12 is positioned in supporting engagement with the dynamic seal 10, and is interposed between the dynamic seal 10 and the locating shoulder 80 of the bulkhead housing 16. The backup ring 12 preferably does not rotate freely relative to the retainer 12 and the bulkhead housing 16.

The anti-rotation tang 26 is illustrated as a radially-oriented pin that engages a pin recess 108 of the backup ring 12 and engages the anti-rotation pocket 66 of the retainer 14. The anti-rotation tang 26 could be an integral part of the backup ring 12 that engages the anti-rotation pocket 66 of the retainer 14 in the same manner, and serves the same purpose of preventing the backup ring 12 from rotating as a result of any relative rotation between the backup ring 12 and the shaft 4. No anti-rotation tang 26 is required if little or no relative rotation occurs between the backup ring 12 and the shaft 4.

If desired, an anti-rotation dog 104 can provide anti-rotation engagement between the machine housing 6 and the bulkhead housing 16 to prevent relative rotation between the machine housing 6 and the bulkhead housing 16. The anti-rotation dog 104 is illustrated as an axially-oriented pin that engages dog recesses 106 in the machine housing 6 and the bulkhead housing 16. The anti-rotation dog 104 could be an integral projection from the bulkhead end surface 102 of the bulkhead housing 16 that engages a dog recess 106 in the support shoulder 48 of the machine housing 6. Alternatively, the anti-rotation dog 104 could be an integral projection from the support shoulder 48 of the machine housing 6 that engages a dog recess 106 in the bulkhead end surface 102 of the bulkhead housing 16. Alternatively, the anti-rotation dog 104 could be radially-oriented. The anti-rotation dog 104 is not needed if little or no relative rotation exists between the shaft 4 and the bulkhead housing 16, or if sufficient friction exists between the bulkhead housing 16 and the machine housing 6 to prevent relative rotation.

Sealing material bridges the radial clearance between the ring inner surface 40 of the backup ring 12 and the sealing surface 28 of the shaft 4 at the first inner sealing site 110, and sealing material also bridges the axial clearance between the retaining shoulder 62 of the retainer 14 and the first ring end 36 of the backup ring 12 at first outer sealing site 112. The radial location of the first inner sealing site 110 is at the sealing surface 28 of the shaft 4.

In FIG. 1, the sealing material at both the first inner sealing site 110 and the first outer sealing site 112 is provided by a single seal; the dynamic seal 10. Other arrangements are possible without departing from the spirit or scope of the invention. For example, the sealing material at the first inner sealing site 110 could be provided by the dynamic seal 10 and the sealing material at the first outer sealing site 112 could be provided by a separate face seal that could be implemented between the retaining shoulder 62 of the retainer 14 and the first ring end 36 of the backup ring 12, as shown by FIG. 7. This would allow the option of having the gland bore 68 be established by the backup ring 12 instead of by the retainer 14, which would allow the option for the pressure passage 88 to communicate in a generally axial direction through the backup ring 12, as shown by FIG. 7.

A second inner sealing site 114 is present at the interface between the second ring end 38 of the backup ring 12 and the locating shoulder 80 of the bulkhead housing 16. This second inner sealing site 114 is located at the inner wall of the inner seal groove 94.

A second outer sealing site 116 is present at the interface between the second ring end 38 of the backup ring 12 and the locating shoulder 80 of the bulkhead housing 16. This second outer sealing site 116 is located at the outer wall of the outer seal groove 92. Sealing material provided by the inner balancing seal 18 bridges/seals at the second inner sealing site 114, and sealing material provided by the outer balancing seal 20 bridges/seals at the second outer sealing site 116. The first inner sealing site 110, the first outer sealing site 112, the second inner sealing site 114, and the second outer sealing site 116 each seal/partition the pressure of the first fluid 32 from the pressure of the second fluid 34.

The slight difference between the axial length of the spacer section 58 and the captured axial length of the backup ring 12 controls the axial clearance between the first ring end 36 of the backup ring 12 and the retaining shoulder 62 of the retainer 14, and also controls the axial clearance between the second ring end 38 of the backup ring 12 and the locating shoulder 80 of the bulkhead housing 16, and preferably minimizes these axial clearances so that the extrusion gaps at the first outer sealing site 112, the second inner sealing site 114, and the second outer sealing site 116 are minimal. The axial length of the spacer section 58 relative to the captured axial length of the backup ring 12 is also one of the factors that controls the axial compression of the inner balancing seal 18 and the outer balancing seal 20, so that this compression can be minimized to minimize sliding friction at the locations where the inner balancing seal 18 and the outer balancing seal 20 are axially compressed against the backup ring 12.

For the purposes of this specification, the axial locations of the first inner sealing site 110 and the first outer sealing site 112 are at the first ring end 36 of the backup ring 12. For the purposes of this specification, the axial locations of the second inner sealing site 114 and the second outer sealing site 116 are at the second ring end 38 of the backup ring 12. For the purposes of this specification the radial location of the first inner sealing site 110 is at the sealing surface 28 of the shaft 4.

The pressure of the first fluid 32 acts over a first hydraulic area between the first inner sealing site 110 and the first outer sealing site 112, and imposes a first axially-acting hydraulic force on the first ring end 36 of the backup ring 12, acting in a first hydraulic force direction 146 that is oriented toward the locating shoulder 80 of the bulkhead housing 16.

The pressure of the first fluid 32 also acts over a second hydraulic area between the second inner sealing site 114 and the second outer sealing site 116, and imposes a second axially-acting hydraulic force on the second ring end 38 of the backup ring 12, acting in a second hydraulic force direction 148 oriented toward the retaining shoulder 62 of the retainer 14. The first hydraulic force direction 146 and the second hydraulic force direction 148 are oppositely oriented with respect to one another, and act in opposed generally axial directions.

It is preferred that the first and second hydraulic areas be substantially equal, so that the first and second axially acting hydraulic forces are substantially equal, and substantially cancel one another out, so that the net axially-acting hydraulic force acting on the backup ring 12 is negligible, leaving the backup ring 12 free to translate laterally with any relative lateral movement between the shaft 4 and the bulkhead housing 16. If desired, a slight axial force imbalance can intentionally be created to offset axial force factors such as the weight of the backup ring 12, or the axially-acting compressive force of the inner balancing seal 18 and outer balancing seal 20. If desired, a slight axial force imbalance can intentionally be created in the first hydraulic force direction 146 to ensure that no extrusion gap exists at the planar interface between the backup ring 12 and the bulkhead housing 16, to prevent differential pressure-related extrusion damage to the inner balancing seal 18 and outer balancing seal 20. Alternately, if desired, a slight axial force imbalance can intentionally be created in the second hydraulic force direction 148 to ensure that no extrusion gap exists at the planar interface between the backup ring 12 and the retainer 14, to prevent differential pressure related extrusion damage at the first outer sealing site 112. These slight but intentional axial force imbalances fall within the meaning of the description of the first and second axially-acting hydraulic forces being substantially equal. Additionally, the slight but unintentional axial force imbalances that may occur as the result of design tolerances fall within the meaning of the description of the first and second axially-acting hydraulic forces being substantially equal.

The retainer sealing surface 72 is larger than, and radially outward from, the first outer sealing site 112, producing a sealed area therebetween. For the purposes of this specification, the sealed area between the retainer sealing surface 72 and the first outer sealing site 112 is called the "retainer hydraulic area." The pressure of the first fluid 32 also acts over the retainer hydraulic area between the retainer sealing surface 72 and the first outer sealing site 112 to create a hydraulic force acting on the retainer 14 in the first hydraulic force direction 146. This hydraulic force helps to maintain the spacer nose 60 in contact with the locating shoulder 80, and helps to prevent the retainer 14 from unthreading from the bulkhead housing 16 during normal operating conditions when the pressure of the first fluid 32 is greater than the pressure of the second fluid 34.

At least one pressure port 118 is preferably included to communicate the pressure of the second fluid 34 to the ring outer surface 42 of the backup ring 12, so that the pressure of the second fluid 34 acts on the ring outer surface 42. Since the pressure of the second fluid 34 also acts on the ring inner surface 40 of the backup ring 12, the backup ring 12 is radially pressure balanced, and therefore relatively immune to deformation (i.e., pressure breathing) that would otherwise result from radial pressure imbalance. This allows the clearance between the ring inner surface 40 of the backup ring 12 and the sealing surface 28 of the shaft 4 to be maintained to a smaller dimension than otherwise would be possible.

Because the ring outer surface 42 has a larger surface area than the ring inner surface 40, the radial pressure balance provided by the pressure port 118 does not equate to perfect radial force balance. In most cases, the radial force imbalance results in very little inward deformation of the backup ring 12 because small diameter rings are relatively stiff, and with large diameter rings the area of the ring outer surface 42 is more nearly equal to the area of the ring inner surface 40. If, however, one wishes to offset the radially inwardly acting force imbalance, the assembly can be designed, for example, as shown and described below in conjunction with FIG. 6.

In some cases, the pressure of the second fluid 34 is merely atmospheric pressure, or some other negligible pressure. In such cases, if desired as a simplification, the pressure port 118 may be omitted because atmospheric pressure can simply be trapped in the region surrounding the ring outer surface 42 of the backup ring 12 at the time of assembly. In such cases, the pressure applied the ring inner surface 40 is substantially equal to the pressure applied to the ring outer surface 42, even though the pressure port 118 has been omitted.

At least part of the ring inner surface 40 of the backup ring 12 is preferred to serve as a journal bearing to locate the backup ring 12 laterally by riding on the sealing surface 28 of the shaft 4, and it is preferred that all of the length of the ring inner surface 40 serve as a journal bearing. The length of the journal bearing portion of the ring inner surface 40 is preferably sized adequately to handle the force required to overcome frictional forces that may exist between that backup ring 12 and mating components such as, but not limited to, the inner balancing seal 18 and the outer balancing seal 20. The contact between the backup ring 12 and sealing material at various locations causes friction that must be overcome before the backup ring 12 can translate laterally in concert with any relative lateral motion between the shaft 4 and the bulkhead housing 16.

The portion of the sealing surface 28 of the shaft 4 that is aligned with the ring inner surface 40 of the backup ring 12 is exposed to the second fluid 34. The second fluid 34 is preferably a lubricant or a fluid with lubricating qualities, and the portion of the sealing surface 28 of the shaft 4 that faces the ring inner surface 40 of the backup ring 12 is preferably wetted by the second fluid 34. It is understood that the second fluid 34 can also be a partial vacuum. When the second fluid 34 is not a lubricant or a fluid with lubricating qualities, and not a liquid, it is preferred that the first fluid 32 be a lubricant or a fluid with lubricating qualities and it is preferred that the dynamic seal 10 be a hydrodynamic seal which has a hydrodynamic pumping action which pumps a small amount of the first fluid 32 into the region between the backup ring 12 and the shaft 4 in response to relative movement between the dynamic seal 10 and the shaft 4, providing lubrication for any tangential contact between the backup ring 12 and the sealing surface 28.

The portion of the sealing surface 28 that is axially aligned with the ring inner surface 40 but not in tangential contact with the backup ring 12 is exposed to the second fluid 34. When the sealing surface 28 has relative rotation with respect to the ring inner surface 40 of the backup ring 12, the rotational velocity drags a film of the second fluid 34 past the gradual convergence occurring adjacent to a location of tangential contact between the backup ring 12 and the sealing surface 28. This provides a hydrodynamic wedging action which provides lubrication within the location of contact between the backup ring 12 and the sealing surface 28, minimizing friction between the backup ring 12 and the sealing surface 28, minimizing heat generation, and minimizing wear of the backup ring 12 and the sealing surface 28.

In service, the sealing surface 28 of the shaft 4 may have relative lateral motion with respect to the bulkhead housing 16 due to factors such as runout, deflection, and vibration, causing the sealing surface 28 to tangentially contact the ring inner surface 40 of the backup ring 12. The assembly is preferably configured such that this tangential contact causes the entire backup ring 12 to slide laterally in concert with the relative lateral motion between the sealing surface 28 of the shaft 4 and the bulkhead housing 16.

This tangential contact may cause the backup ring 12 to deform to a somewhat elliptical shape, but because of the tight initial fit between the ring inner surface 40 and the sealing surface 28, the extrusion gap 33 remains small at the location 180° opposite to the initial tangential contact.

Because of the tangential nature of any contact between the sealing surface 28 and the ring inner surface 40 of the backup ring 12, the circumferentially converging shapes of the backup ring 12 and the sealing surface 28 cause the location of contact between the backup ring 12 and the sealing surface 28 to be hydrodynamically lubricated by the second fluid 34 when any relative rotation exists between the sealing surface 28 of the shaft 4 and the ring inner surface 40 of the backup ring 12, in the same manner as a journal bearing receives hydrodynamic lubrication due to shapes that gradually converge to the location of tangency. In essence, the ring inner surface 40 of the backup ring 12 forms a journal bearing that locates the backup ring 12 relative to the sealing surface 28 of the shaft 4.

The circumferential convergence between the ring inner surface 40 of the backup ring 12 and the sealing surface 28 of the shaft 4 to the point of tangency, forms a hydrodynamic inlet that is responsive to any relative rotation if the sealing surface 28 is exposed to a fluid having lubricating properties. Upon relative rotation between the backup ring 12 and the sealing surface 28, the hydrodynamic inlet wedges the lubricant between the backup ring 12 and the sealing surface 28 for lubrication purposes. The gradually converging geometry promotes a strong hydrodynamic action in response to relative rotation that wedges a lubricant film of a predictable magnitude into the location of tangential contact between the ring inner surface 40 of the backup ring 12 and the sealing surface 28 of the shaft 4 in response to relative rotation. This lubricant film helps to reduce friction, wear, and motion-generated heat, while permitting operation at higher speeds than otherwise would be possible with a non-hydrodynamic backup ring. An example of a non-hydrodynamic backup ring would be one that contacts the relatively rotatable surface around its entire circumference, such as the backup ring on a GT seal, also known as a T-seal.

The ring inner surface 40 of the backup ring 12 is preferably substantially a circular cylinder, although it is understood that in large diameters, internal material stresses may cause the ring 12 to be slightly non-circular or an elliptic cylinder even though it was originally machined to be a circular cylinder. When such slightly elliptical rings 12 are assembled, they may have two locations of generally tangential contact with the sealing surface 28. Both locations of generally tangential contact are hydrodynamically lubricated with the second fluid 34 when relative rotation exists between the sealing surface 28 and the backup ring 12, owing to the circumferentially converging shapes of the backup ring 12 and the sealing surface 28.

If desired, the radial thickness between the ring inner surface 40 and the ring outer surface 42 can vary around the circumference of the backup ring 12, causing the local stiffness of the backup ring 12 to vary around its circumference, so that factors such as, but not limited to, the previously described radial force imbalance can cause the ring inner surface 40 to undulate in a manner conducive to relative rotation-driven hydrodynamic lubrication at the interface between the backup ring 12 and the shaft 4. This radial thickness variation is best accomplished by providing the ring outer surface 42 with a castellated shape. Optionally, but not shown here, one of the projections forming the castellated shape could serve as an integral anti-rotation tang for anti-rotation purposes if desired. Alternately, or in conjunction with the castellated shape, the radial stiffness can be varied by a pattern of radial or axial blind or through weakening holes 170 in the backup ring 12. If desired, one or more of these weakening holes 170 can serve as the pin recess 108 or the pressure port 118, since the pin recess 108 and the pressure port 118 serve as weakening holes, causing the backup ring 12 to have variable stiffness around its circumference. This variable stiffness arrangement is particularly useful where factors such as thermal growth of the shaft 4 or radial force imbalance may sometimes cause the in service diameters of the ring inner surface 40 of the backup ring 12 and the sealing surface 28 of the shaft 4 to more or less equal one another. For example, if thermal or pressure expansion of the sealing surface 28 of the shaft 4 causes the shaft 4 to stretch the backup ring 12, the variable stiffness arrangement will cause the ring inner surface 40 of the backup ring 12 to undulate in a manner conducive to relative rotation-driven hydrodynamic lubrication at the sliding rotational interface between the backup ring 12 and the shaft 4, creating a film of the second fluid 34 that separates the ring inner surface 40 of the backup ring 12 from the sealing surface 28 of the shaft 4. The variable stiffness arrangement is particularly useful when the diameters of the sealing surface 28 of the shaft 4 and the ring inner surface 40 of the backup ring 12 are large, making them more prone to differential thermal expansion-induced contact, and making the backup ring 12 more flexible in the event of any such contact.

FIG. 1A is an axonometric view of the same backup ring 12 that is shown in FIG. 1. Specifically, FIG. 1A is an axonometric view of the CAD solid model of the backup ring 12 that is included in the solid model assembly that is the basis for the cross-section of FIG. 1.

The radial thickness between the ring inner surface 40 and the ring outer surface 42 varies around the circumference of the backup ring 12. One way of accomplishing the variations in thickness is by providing the ring outer surface 42 with a castellated shape, as shown. The variations in radial thickness cause corresponding variations of stiffness around the circumference of the backup ring 12. Another way to cause variations in stiffness around the circumference of the backup ring 12 is with a pattern of axial and/or radial weakening holes 170. FIG. 1A shows both axial and radial varieties of weakening holes 170. In reality, the recesses that cause the radial thickness of the backup ring 12 to vary are another variation of weakening hole. If desired, one of the radial weakening holes 170 can serve as the pin recess for holding the anti-rotation tang, if desired. When the backup ring 12 is stressed by factors such as radial force imbalance or stretching due to thermal or pressure growth of the shaft, the ring inner surface 40 undulates in a manner conducive to relative rotation-driven hydrodynamic lubrication.

In FIG. 2, a longitudinal cross-sectional view of a sealed machine assembly is shown generally at 2. FIG. 2 illustrates a simplification of the FIG. 1 arrangement, where features of the machine housing 6 of FIG. 1 have been included in the bulkhead housing 16, such that the bulkhead housing 16 of FIG. 2 serves the functions of both of the FIG. 1 components. This simplification allows the housing seal 24 and anti-rotation dog 104 of FIG. 1 to be eliminated, along with various surfaces of the machine housing 6 and bulkhead housing 16 that are illustrated in FIG. 1.

A first hydraulic area 150 is established between the first inner sealing site 110 and the first outer sealing site 112, and a second hydraulic area 152 is established between the second inner sealing site 114 and the second outer sealing site 116. As with FIG. 1, in FIG. 2 the first inner sealing site 110 is separated from the second inner sealing site 114 by an axial distance; the first outer sealing site 112 is separated from said second outer sealing site 116 by an axial distance; and the axial distance separating the first inner sealing site 110 from the second inner sealing site 114 is illustrated as being substantially equal to the axial distance separating the first outer sealing site 112 is from the second outer sealing site 116. As described below in conjunction with FIG. 6, if desired in FIG. 2 the axial distance separating the first inner sealing site 110 from the second inner sealing site 114 could be less than the axial distance separating the first outer sealing site 112 from the second outer sealing site 116, if such a complexity were considered desirable to improve radial force balance.

The pressure passage 88 for communicating the pressure of the first fluid 32 to the second hydraulic area 152 is illustrated as a cross-drilled hole arrangement, but could take other suitable forms. For example, the pressure passage 88 could be an external hose connecting a fluid port 46 with an axially-oriented port leading to the second hydraulic area 152. A plug 84 is used to prevent leakage from the cross-drilled hole arrangement of the pressure passage 88. The plug 84 can be of any suitable type, such as a threaded plug, a weld plug, or a friction plug.

The pressure of the first fluid 32 acts over the first hydraulic area 150, and imposes a first axially-acting hydraulic force on the first ring end 36 of the backup ring 12, acting in a first hydraulic force direction 146. The pressure of the first fluid 32 also acts over the second hydraulic area 152, and imposes a second axially-acting hydraulic force on the second ring end 38 of the backup ring 12, acting in a second hydraulic force direction 148. The first hydraulic force direction 146 and the second hydraulic force direction 148 are oppositely oriented with respect to one another, and act in opposed generally axial directions.

It is preferred that the first hydraulic area 150 and the are second hydraulic area 152 be substantially equal, so that the first and second axially-acting hydraulic forces are substantially equal, and substantially cancel one another out, so that the net axially-acting hydraulic force acting on the backup ring 12 is negligible, leaving the backup ring 12 free to translate laterally with any relative lateral movement between the shaft 4 and the bulkhead housing 16.

One or more pressure ports 118 are preferably included to communicate the pressure of the second fluid 34 to the ring outer surface 42 of the backup ring 12, so that the pressure of the second fluid 34 acts on the ring outer surface 42. Since the pressure of the second fluid 34 also acts on the ring inner surface 40 of the backup ring 12, the backup ring 12 is radially pressure balanced, and therefore substantially immune to deformation (i.e., pressure breathing) that would otherwise result from radial pressure imbalance. This allows the clearance between the ring inner surface 40 of the backup ring 12 and the sealing surface 28 of the shaft 4 to be maintained to a smaller dimension than otherwise possible.

If desired, an outboard seal 126 can be used to separate the second fluid 34 from a third fluid 35. If desired, the pressure of the second fluid 34 can be less than the pressure of the first fluid 32 and greater than the pressure of the third fluid 35.

As with FIG. 1, in FIG. 2 the first ring end 36 and the second ring end 38 of the backup ring 12 are illustrated as substantially flat surfaces, and the first ring end 36 is illustrated as being substantially parallel to the second ring end 38.

As a simplification, the outboard seal 126 can be omitted, and the second fluid can simply be atmosphere. In such cases, a radial hole (not shown) through the wall of the bulkhead housing 16 in the region between the retainer seal 22 and the locating shoulder 80 could be used to bring the pressure of the second fluid to the ring outer surface 42.

As with FIG. 1, in FIG. 2 the backup ring 12 preferably has a bearing relationship with the shaft 4, and preferably the ring inner surface 40 of the backup ring 12 establishes a journal bearing-type relationship with the shaft 4, locating the backup ring 12 radially/laterally with respect to the shaft 4.

Figure 3:
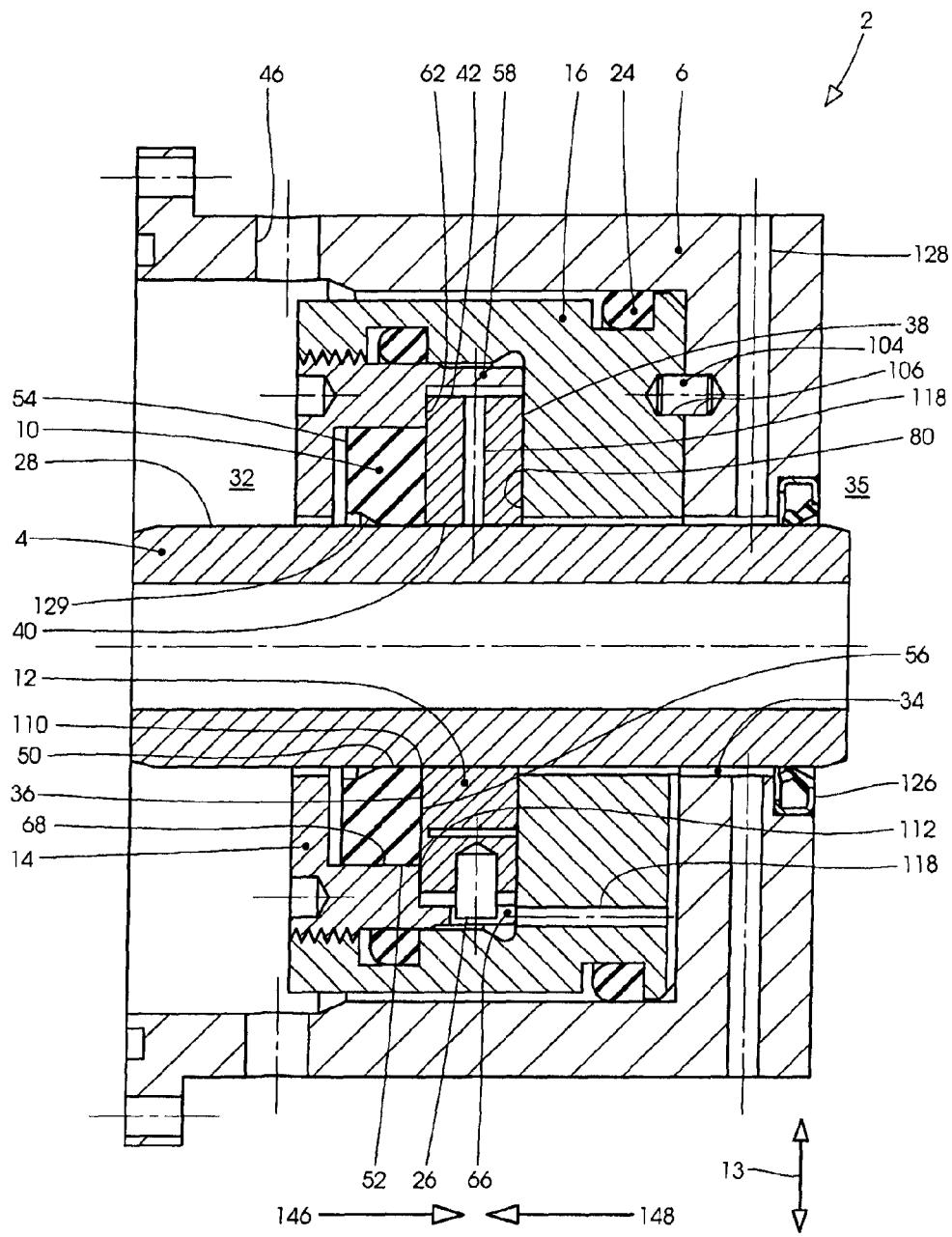

In FIG. 3, a longitudinal cross-sectional view of a sealed machine assembly is shown generally at 2. FIG. 3 illustrates a simplification of the FIG. 1 arrangement, where the inner balancing seal 18, outer balancing seal 20, inner seal groove 94, outer seal groove 92, and pressure passage 88 of FIG. 1 have been eliminated. This simplified embodiment gives up the axial force balancing of the backup ring 12 that is provided for in the FIG. 1 arrangement, but retains the radial pressure balancing of the backup ring 12 that is provided for in the FIG. 1 arrangement.

As with FIGS. 1 and 2, in FIG. 3 a backup ring 12 of generally circular form is located between a retaining shoulder 62 of a retainer 14 and a locating shoulder 80 of a bulkhead housing 16, and has a first ring end 36 with at least a portion thereof facing the retaining shoulder 62 and a second ring end 38 having at least a portion thereof facing the locating shoulder 80, the first ring end 36 and the second ring end 38 facing in generally opposite directions, the backup ring 12 having a ring inner surface 40 facing generally inward toward the sealing surface 28 of the shaft 4 and establishing an extrusion gap 33 clearance therewith, and having a ring outer surface 42 facing generally radially outward, the ring inner surface 40 and the ring outer surface 42 both being exposed to the pressure of the second fluid 34.

The FIG. 3 arrangement is advantageous where it is desired or acceptable for the backup ring 12 to be free to align itself on the sealing surface 28 of the shaft 4 in conditions of low differential pressure, and where it is desired or acceptable for the second ring end 38 of the backup ring 12 to have high, differential pressure-induced friction with the locating shoulder 80 of the bulkhead housing 16 in conditions of high differential pressure. For example, the shaft 4 could be a prior art axially force-balanced, floating washpipe of an oilfield washpipe assembly, such as that shown by washpipe 66 in FIG. 1 of commonly assigned U.S. Pat. No. 6,007,105, entitled "Swivel Seal Assembly." At the time of assembly, steps may be taken to align the shaft 4 coaxially with a separate rotatable power swivel or top drive shaft that shaft 4 would be attached to, and during this alignment step the backup ring 12 would be free to move laterally with the shaft 4. During high pressure rotary service, the differential pressure would be high, causing high friction between the second ring end 38 of the backup ring 12 and the locating shoulder 80 of the bulkhead housing 16. This arrangement allows the ring inner surface 40 of the backup ring 12 to serve as a radial bearing that provides radial guidance to the part of the shaft 4 encircled by the backup ring 12 during conditions of high differential pressure, while still retaining immunity from dimensional changes associated with radial pressure imbalance.

One or more pressure ports 118 are preferably included to communicate the pressure of the second fluid 34 to the ring outer surface 42 of the backup ring 12, so that the pressure of the second fluid 34 acts on the ring outer surface 42. Since the pressure of the second fluid 34 also acts on the ring inner surface 40 of the backup ring 12, the backup ring 12 is radially pressure balanced, and therefore substantially immune to deformation (i.e., pressure breathing) that would otherwise result from radial pressure imbalance. This allows the clearance between the ring inner surface 40 of the backup ring 12 and the sealing surface 28 of the shaft 4 to be maintained to a smaller, more stable dimension than otherwise possible, which helps to minimize the extrusion damage experienced by the dynamic seal 10.

As with FIG. 1, in FIG. 3 the spacer section 58 incorporates an anti-rotation pocket 66, and an anti-rotation tang 26 projecting from the backup ring 12 engages the anti-rotation pocket 66 to prevent relative rotation between the backup ring 12 and the retainer 14. It is to be understood that, throughout this specification, the lateral dimension of the anti-rotation pocket 66 is preferably larger than the mating lateral dimension of the radially-oriented anti-rotation tang 26, to allow the anti-rotation tang 26 to articulate within the anti-rotation pocket 66 as the backup ring 12 experiences the slight rotational oscillation that must necessarily occur as the backup ring 12 follows lateral shaft motion such as dynamic runout.

As in FIG. 1, in FIG. 3 the bulkhead housing 16 is located at least partially within a machine housing 6, and a housing seal 24 establishes sealing between the bulkhead housing 16 and the machine housing 6 and partitions the pressure of the first fluid 32 from the pressure of the second fluid 34.

If desired, an outboard seal 126 can be used to establish sealing between the machine housing 6 and the shaft 4, and can be used to separate/partition the second fluid 34 from a third fluid 35. As with FIG. 1, in FIG. 3 the pressure of the first fluid 32 may, if desired, be greater than the pressure of the second fluid 34, and the pressure of the second fluid 34 may, if desired, be greater than the pressure of the third fluid 35.

As with FIG. 1, in FIG. 3 an anti-rotation dog 104 may be employed to engage dog recesses 106 in the bulkhead housing 16 and the machine housing 6. As with FIG. 1, in FIG. 3 the machine housing 6 may have a fluid port 46, the pressure of the first fluid 32 may be supplied through the fluid port 46, and the first fluid 32 may be circulated through the fluid port 46. As with FIG. 1, in FIG. 3 the machine housing 6 may have one or more outboard ports 128, the pressure of the second fluid 34 may be supplied through such an outboard port 128, and the second fluid 34 may circulate through the outboard port 128.

As with FIG. 1, in FIG. 3 the shaft 4 and the backup ring 12 may have relative axial motion with respect to each other, may have relative rotation with respect to each other, and may have both relative rotation and relative axial motion with respect to each other. As with FIG. 1, in FIG. 3 the shaft 4 and the bulkhead housing 16 may have relative radial motion with respect to each other, and in such cases the backup ring 12 follows the relative radial motion and has relative radial motion with respect to the bulkhead housing 16 and the retainer 14. The orientation of the relative radial motion is indicated in FIGS. 1 and 3 by numeral 13. As with FIG. 1, in FIG. 3 the backup ring 12 preferably has a bearing relationship with the shaft 4, and preferably the ring inner surface 40 of the backup ring 12 establishes a journal bearing-type relationship with the shaft 4. As with FIG. 1, in FIG. 3 the backup ring 12 is preferably comprised of metal. As with FIG. 1, in FIG. 3 the retainer 14 is illustrated as being threadedly retained to the bulkhead housing 16. As with FIG. 1, in FIG. 3 the retainer 14 provides a gland bore 68 of generally cylindrical form, and a dynamic seal 10 is located at least partially within the gland bore 68. As with FIG. 1, in FIG. 3 the dynamic seal 10 has a static sealing surface 52 that is held in sealing contact with the gland bore 68, and has a dynamic sealing surface 50 in sealing contact with the sealing surface 28 of the shaft 4. As with FIG. 1, in FIG. 3 the dynamic seal 10 has a first seal end 54 exposed to the first fluid 32, and has a second seal end 56 facing and in contact with said first ring end 36 of said backup ring 12. As with FIG. 1, in FIG. 3 the dynamic seal 10 provides the sealing material establishing the first inner sealing site 110.

As with FIG. 1, in FIG. 3 the dynamic seal 10 includes a lubricant side flank 129 that is exposed to the first fluid 32, and is sloped relative to the sealing surface 28 of the shaft 4, providing gradual convergence with the sealing surface 28 of the shaft 4, thus forming a hydrodynamic inlet that introduces a lubricating film of the first fluid 32 between the dynamic sealing surface 50 and the sealing surface 28 in response to relative motion between the dynamic seal 10 and the sealing surface 28 of the shaft 4. As with FIG. 1, in FIG. 3 the dynamic seal 10 provides the sealing material establishing the first outer sealing site 112.

Figure 4:
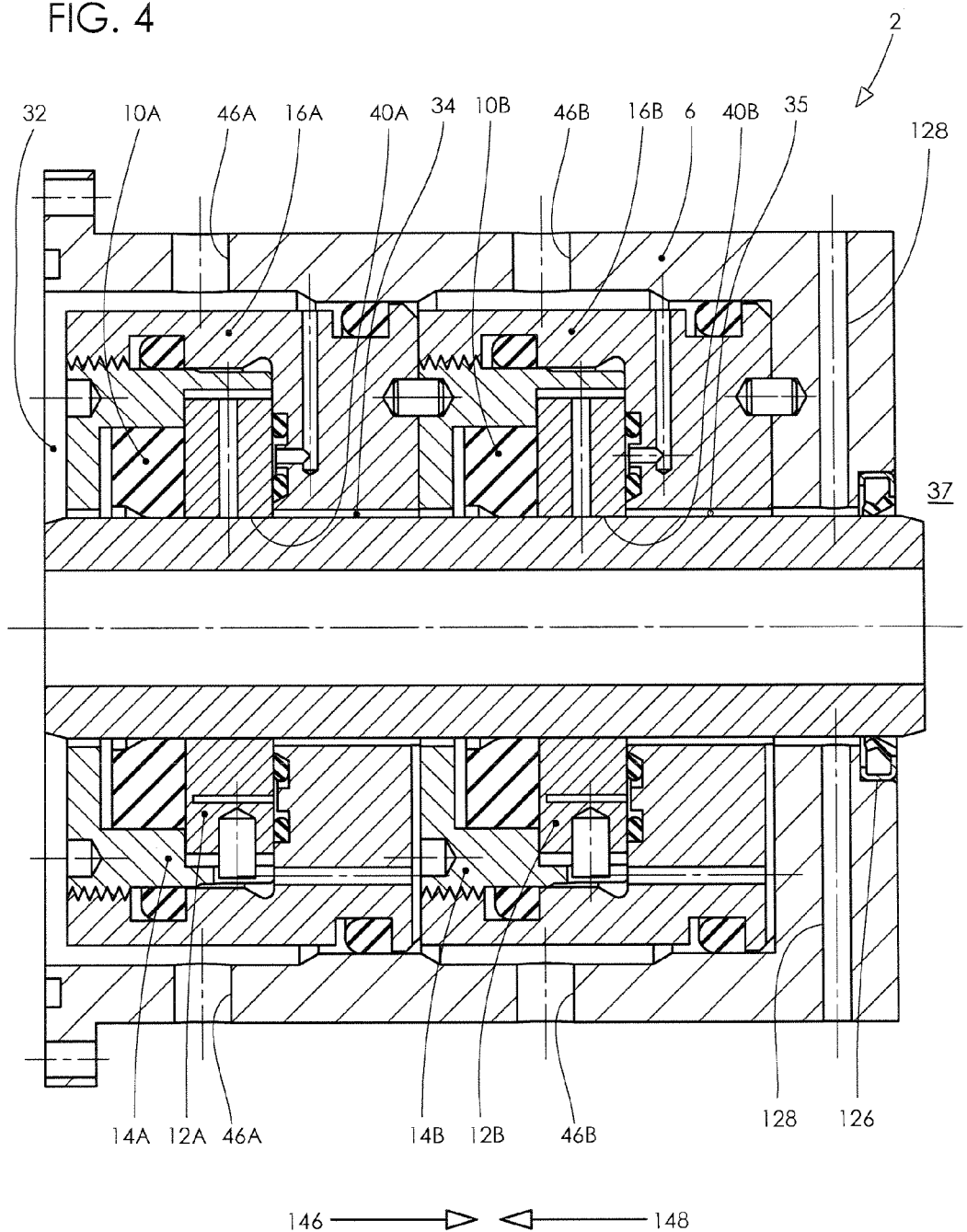

In FIG. 4, a longitudinal cross-sectional view of a sealed machine assembly is shown generally at 2. FIG. 4 illustrates how the sealing assembly 8 of FIG. 1 can be employed in tandem to accomplish pressure staging and/or redundancy. FIGS. 1 and 2 can be considered simplifications of FIG. 4, but were included ahead of FIG. 4 to more concisely convey basic geometry and operating principles. A first dynamic seal 10A separates a first fluid 32 from a second fluid 34. A second dynamic seal 10B separates the second fluid 34 from a third fluid 35. If desired, an outboard seal 126 can separate the third fluid 35 from a fourth fluid 37, such as the atmosphere.

A first backup ring 12A is captured within a first bulkhead housing 16A by a first retainer 14A. A second backup ring 12B is captured within a second bulkhead housing 16B by a second retainer 14B. The first backup ring 12A and the second backup ring 12B are radially pressure balanced and axially force balanced in the same manner described in conjunction with FIG. 1.

The first dynamic seal 10A and second dynamic seal 10B of FIG. 4 are identical to the dynamic seal 10 of FIG. 1. The first backup ring 12A and second backup ring 12B of FIG. 4 are identical to the backup ring 12 of FIG. 1. The first retainer 14A and second retainer 14B of FIG. 4 are identical to the retainer 14 of FIG. 1. The first bulkhead housing 16A and second bulkhead housing 16B of FIG. 4 are identical to the bulkhead housing 16 of FIG. 1.

If desired for pressure staging purposes, the pressure of the second fluid 34 can be less than the pressure of the first fluid 32, so that the differential pressure acting across the first dynamic seal 10A is less than the pressure of the first fluid 32. If desired for pressure staging purposes, the pressure of the third fluid 35 can be less than the pressure of the second fluid 34, so that the differential pressure acting across the second dynamic seal 10B is less than the pressure of the second fluid 34. If desired for pressure staging purposes, the pressure of the fourth fluid 37 can be less than the pressure of the third fluid 35, so that the differential pressure acting across the outboard seal 126 is less than the pressure of the third fluid 35.

If desired, the first fluid 32 may be supplied and/or pressurized via one or more fluid ports 46A of the machine housing 6, and if desired may be circulated in one fluid port 46A and out through another fluid port 46A. If desired, the second fluid 34 may be supplied and/or pressurized via one or more fluid ports 46B of the machine housing 6, and if desired may be circulated in one fluid port 46B and out through another fluid port 46B. If desired, the third fluid 35 may be supplied and/or pressurized via one or more outboard ports 128 of the machine housing 6, and if desired may be circulated in one outboard port 128 and out through another outboard port 128.

Figure 5:
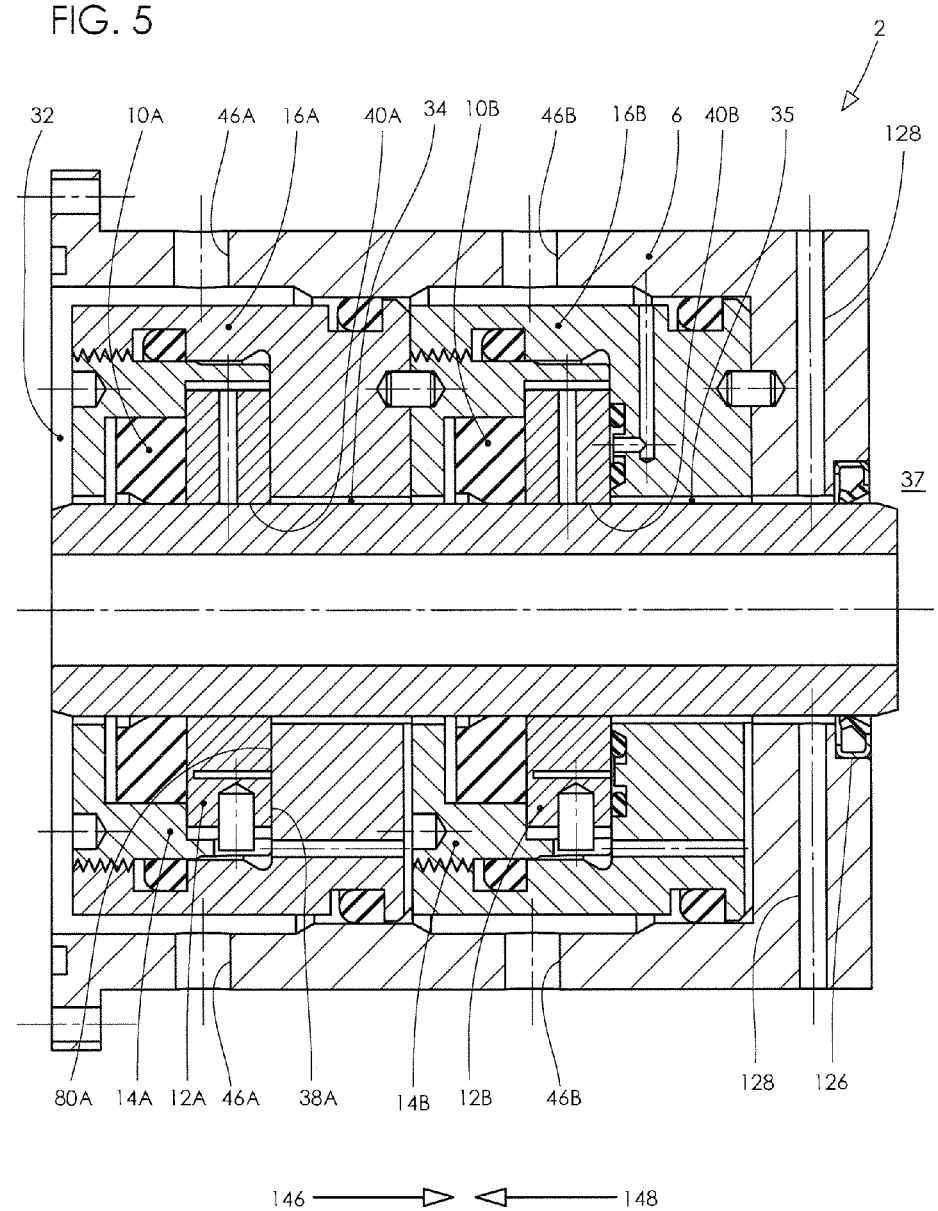

In FIG. 5, a longitudinal cross-sectional view of a sealed machine assembly is shown generally at 2. FIG. 5 illustrates how the sealing assembly 8 of FIG. 1 can be employed in conjunction with the sealing assembly of FIG. 3 to accomplish pressure staging and/or redundancy. FIG. 5 can be considered a simplification of FIG. 4. A first dynamic seal 10A separates a first fluid 32 from a second fluid 34. A second dynamic seal 10B separates the second fluid 34 from a third fluid 35. If desired, an outboard seal 126 can separate the third fluid 35 from a fourth fluid 37, such as the atmosphere.

A first backup ring 12A is captured within a first bulkhead housing 16A by a first retainer 14A. A second backup ring 12B is captured within a second bulkhead housing 16B by a second retainer 14B. The first backup ring 12A and the second backup ring 12B are radially pressure balanced in the same manner described in conjunction with FIG. 1. Only the second backup ring 12B is axially force balanced in the same manner as described in conjunction with FIG. 1.

The first dynamic seal 10A and second dynamic seal 10B of FIG. 5 are illustrated as being identical to the dynamic seal 10 of FIG. 1. The first backup ring 12A and second backup ring 12B of FIG. 5 are identical to the backup ring 12 of FIG. 1. The first retainer 14A and second retainer 14B of FIG. 5 are identical to the retainer 14 of FIG. 1. The first bulkhead housing 16A of FIG. 5 is identical to the bulkhead housing 16 of FIG. 3, and lacks the inner seal groove 94, outer seal groove 92, and pressure passage 88 that are included in the bulkhead housing 16 of FIG. 1. The second bulkhead housing 16B of FIG. 5 is identical to the bulkhead housing 16 of FIG. 1.

If desired for pressure staging purposes, the pressure of the second fluid 34 can be less than the pressure of the first fluid 32, so that the differential pressure acting across the first dynamic seal 10A is less than the pressure of the first fluid 32. If desired for pressure staging purposes, the pressure of the third fluid 35 can be less than the pressure of the second fluid 34, so that the differential pressure acting across the second dynamic seal 10B is less than the pressure of the second fluid 34. If desired for pressure staging purposes, the pressure of the fourth fluid 37 can be less than the pressure of the third fluid 35, so that the differential pressure acting across the outboard seal 126 is less than the pressure of the third fluid 35.

If desired, the first fluid 32 may be supplied and/or pressurized via one or more fluid ports 46A of the machine housing 6, and if desired may be circulated in one fluid port 46A and out through another fluid port 46A. If desired, the second fluid 34 may be supplied and/or pressurized via one or more fluid ports 46B of the machine housing 6, and if desired may be circulated in one fluid port 46B and out through another fluid port 46B. If desired, the third fluid 35 may be supplied and/or pressurized via one or more outboard ports 128 of the machine housing 6, and if desired may be circulated in one outboard port 128 and out through another outboard port 128.

The backup ring 12A is free to align itself on the shaft 4 in conditions of low or no differential pressure acting across dynamic seal 10A. When the pressure of the first fluid 32 is significantly greater than the pressure of the second fluid 34 causing significant differential pressure across dynamic seal 10A, significant friction occurs between the second ring end 38A of the backup ring 12A and the mating locating shoulder 80A of the bulkhead housing 16A. This significant friction helps to hold the backup ring 12A in place, allowing the ring inner surface 40A of the backup ring 12A to serve as a radial bearing that provides radial guidance to a portion of the shaft 4 encircled by the backup ring 12A during conditions of high differential pressure, while still retaining immunity from dimensional changes associated with radial pressure imbalance. This arrangement is particularly useful in equipment such as washpipe swivels, where the shaft 4 is an axially force-balanced, floating washpipe and one end of the shaft 4 is controlled by a separate bearing (not shown).

Figure 6:
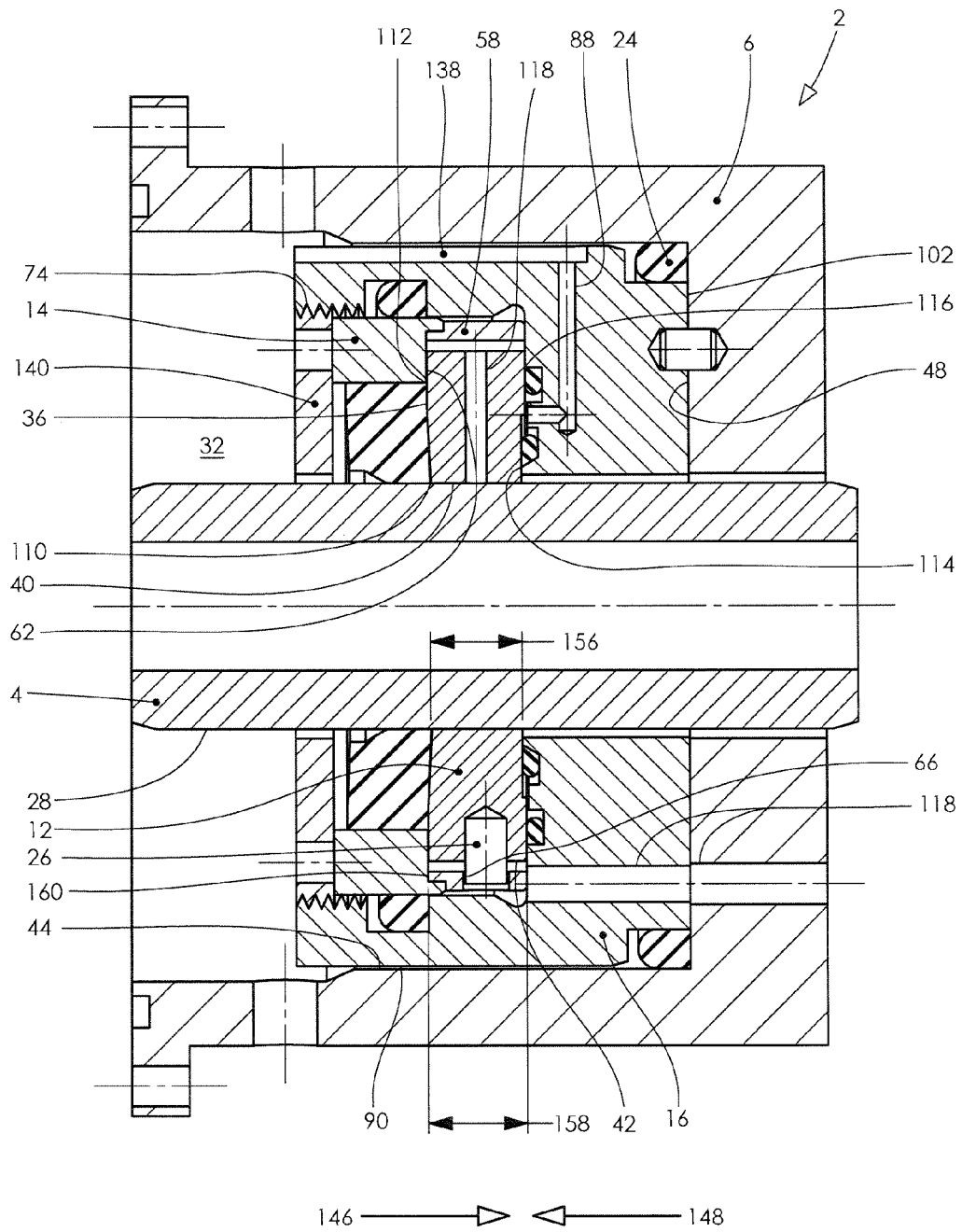

In FIG. 6, a longitudinal cross-sectional view of a sealed machine assembly is shown generally at 2. FIG. 6 is an alternate embodiment of the present invention. The housing seal 24 is installed in an open-ended groove, so that initial sealing is accomplished by radial compression against the housing bore 44 of the machine housing 6. This arrangement eliminates the extrusion gap of the housing seal 24 by virtue of the contact between bulkhead end surface 102 of the bulkhead housing 16 and the support shoulder 48 of the machine housing 6.

The exterior surface 90 of the bulkhead housing 16 is in relatively close proximity to the housing bore 44 of the machine housing 6, and rapid communication of the pressure of the first fluid 32 to the pressure passage 88 is ensured by an axial slot 138 along the exterior surface 90 of the bulkhead housing 16. The spacer section 58 is a separate component from the retainer 14, and the retainer 14 is secured in place by a locking ring 140 which incorporates the external threads 74. In other words, the locking ring 140 is threadedly engaged to the bulkhead housing 16, securing the retainer 14 in place relative to the bulkhead housing 16 and the spacer section 58. The spacer section 58 is a ring located at least partially within the bulkhead housing 16, having an indexing end 160 in contacting relation with the retaining shoulder 62 of the retainer 14. The pressure port 118 for communicating the pressure of the second fluid 34 to the space surrounding the ring outer surface 42 of the backup ring 12 is present in the bulkhead housing 16, and if preferred, may also be included in the backup ring 12. As with FIG. 1, in FIG. 6 the pressure port 118 that is incorporated into the backup ring 12 passes from the ring inner surface 40 to the ring outer surface 42, and the pressure port 118 communicates the pressure of the second fluid 34 to the ring outer surface 42, and the pressure port 118 that is incorporated into the bulkhead housing 16 also communicates the pressure of the second fluid 34 to the ring outer surface 42. As with FIG. 1, in FIG. 6 the bulkhead housing 16 incorporates a pressure passage 88 communicating the pressure of the first fluid 32 to the second hydraulic area that is located between and defined by the second inner sealing site 114 and the second outer sealing site 116, and the pressure passage 88 is a combination of intersecting holes, which are sometimes referred to as "cross-drilled holes." As with FIG. 1, in FIG. 6 a first hydraulic area is located between and defined by the first inner sealing site 110 and the first outer sealing site 112, and is preferably substantially equal in area to the second hydraulic area.

In the embodiment shown in FIG. 6, the higher pressure of the first fluid 32 is used to create a radially outwardly acting hydraulic force to counteract the radial force imbalance resulting from the pressure of the second fluid 34 acting on the differential surface area of the ring outer surface 42 and ring inner surface 40. The axial distance 156 between first inner sealing site 110 and second inner sealing site 114 is less than the axial distance 158 between first outer sealing site 112 and second outer sealing site 116, to address the potential radial force imbalance resulting from the larger area of the ring outer surface 42 being exposed to the same pressure as the smaller area of the ring inner surface 40. This axial length difference is illustrated as being accomplished by incorporating a bevel on the first ring end 36 of the backup ring 12, and by incorporating a step on the second ring end 38 of the backup ring 12. If desired, the length difference between the axial distance 156 and the axial distance 158 can be accomplished by any suitable means. For example, both the first ring end 36 and the second ring end 38 of the backup ring 12 could incorporate a step. For another example, the first ring end 36 could be substantially planar, the length difference being accomplished by a step incorporated only at the second ring end 38 of the backup ring 12. For another example, the second ring end 38 could be substantially planar, the length difference being accomplished by a step incorporated only at the first ring end 36 of the backup ring 12. For another example, the second ring end 38 could be substantially planar, the length difference being accomplished by a bevel incorporated only at the first ring end 36 of the backup ring 12. Referring to FIG. 6, the pressure of the first fluid 32 provides a radially outwardly acting hydraulic force acting on the backup ring 12 to compensate for the radial force imbalance imposed by the pressure of the second fluid acting on the backup ring 12. Whether or not this slight radially outwardly acting pressure imbalance is created to offset the described radial force imbalance, the design falls within the intended meaning of the backup ring 12 being substantially radially pressure balanced.

As a simplification, the outboard seal 126 and outboard port 128 of FIG. 1 have been eliminated.

In FIG. 1, the anti-rotation pocket 66 is illustrated as an axial slot. In FIG. 6, the anti-rotation pocket 66 is illustrated as a radial hole. The use of a hole rather than a slot allows the anti-rotation tang 26 to secure the backup ring 12 within the retainer 14 as the retainer 14 and backup ring 12 are inserted into the bulkhead housing 16, adding to the convenience of assembly.

In FIG. 7, a longitudinal cross-sectional view of a sealed machine assembly is shown generally at 2. FIG. 7 is an alternate embodiment of the invention which also includes several simplifications.

The features of the machine housing 6 of FIG. 1 have been included in the bulkhead housing 16 of FIG. 7, such that the bulkhead housing 16 of FIG. 7 serves the functions of both of the FIG. 1 components. This simplification allows the housing seal 24 and anti-rotation dog 104 of FIG. 1 to be eliminated, along with various surfaces of the machine housing 6 and bulkhead housing 16 that are illustrated in FIG. 1. The pressure port 118 may pass through both the backup ring 12 and the bulkhead housing 16 as shown, if desired. The first inner sealing site 110 is bridged by the sealing material of the dynamic seal 10, and the first outer sealing site 112 is bridged by the sealing material of a face seal 142 mounted in an annular groove 144 that is shown to be cut into the retainer 14, but could just as easily be cut into the backup ring 12. The principal point is that the face seal 142 is in sealing contact with the retainer 14 and with the backup ring 12, and provides the sealing material establishing the first outer sealing site 112. This configuration allows the pressure passage 88 and the gland bore 68 to be incorporated as part of the backup ring 12. Having the pressure passage 88 in the backup ring 12 results in less complicated machining, compared to the cross-drilled pressure passage 88 of FIG. 1. The pressure passage 88 penetrates through the backup ring 12 from the first ring end 36 to the second ring end 38 communicating the pressure of the first fluid 32 to the second hydraulic area 152 that is located between and defined by the second inner sealing site 114 and the second outer sealing site 116.

The pressure passage 88 can be one of a pattern of pressure passages configured to serve as weakening holes if desired, providing the backup ring 12 with variations in stiffness around its circumference. The pin recess 108 can be one of a pattern of radial holes serving as weakening holes, if desired, providing the backup ring 12 with variations in stiffness around its circumference. The radial thickness of the backup ring 12 between the ring inner surface 40 and the ring outer surface 42 can vary around the circumference of the backup ring 12 if desired, providing the backup ring 12 with variations in stiffness around its circumference. Such variations in stiffness around the circumference of the backup ring 12 cause hydrodynamic undulations to appear in the ring inner surface 40 as a result of backup ring stress caused by factors such as radial force imbalance causing the ring inner surface 40 to shrink, and such as thermal expansion of the shaft 4 causing the backup ring 12 to stretch, and such as pressure expansion of the shaft 4 causing the backup ring 12 to stretch.

The dynamic seal 10 has a dynamic sealing surface 50 in sealing contact with the sealing surface 28 of the shaft 4 and provides the sealing material establishing the first inner sealing site 110. The backup ring 12 provides the gland bore 68 having sealing contact with and surrounding at least part of the dynamic seal 10. The gland bore 68 is an internal surface of an annular projection 166 that projects from the first ring end 36, and this annular projection 166 may also include a gland wall 70 if desired. Incorporating the gland bore 68 as part of the backup ring 12 isolates the dynamic seal 10 from the radial compression changes that occur when lateral shaft motion occurs in the arrangement of FIG. 1. This makes the FIG. 7 arrangement more suitable for equipment with very large amounts of lateral shaft motion (such as rotating control devices), compared to the arrangement of FIG. 1.

The pressure of the first fluid 32 acts on an annular first hydraulic area established between the first inner sealing site 110 and the first outer sealing site 112, producing a first hydraulic force acting in a first hydraulic force direction 146. The pressure of the first fluid 32 also acts on an annular second hydraulic area established between the second inner sealing site 114 and the second outer sealing site 116, producing a second hydraulic force acting in a second hydraulic force direction 148. Preferably, the first and second hydraulic forces are substantially equal; i.e., substantially balanced.

As with FIG. 1, in FIG. 7 the spacer section 58 is an axially projecting feature of the retainer 14, and has a spacer nose 60 contacting the locating shoulder 80 of the bulkhead housing 16.

Figure 8:
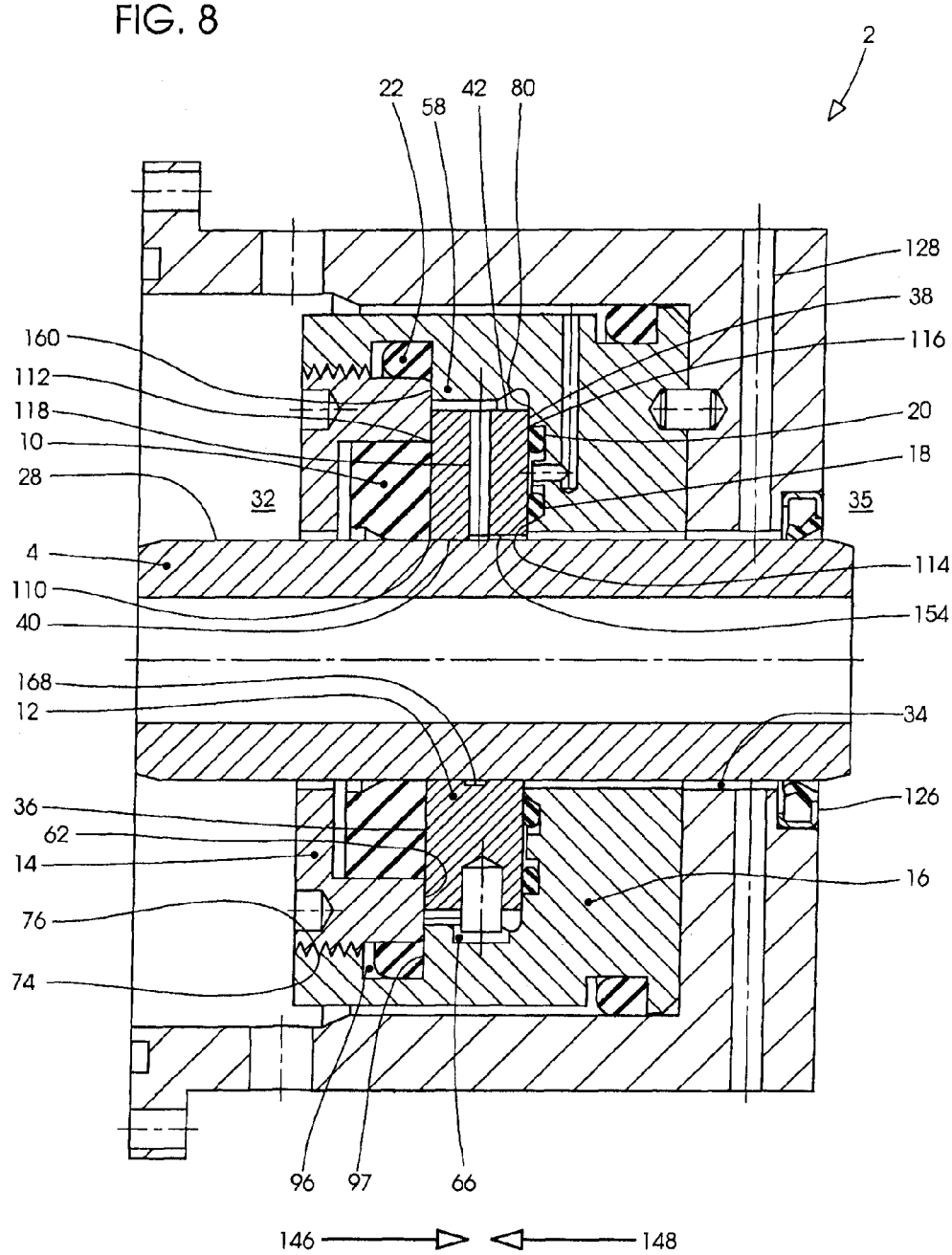

In FIG. 8, a longitudinal cross-sectional view of a sealed machine assembly is shown generally at 2. FIG. 8 is an alternate embodiment of the present invention, wherein the backup ring 12, retainer 14, and bulkhead housing 16 have a different configuration, compared to FIG. 1. In FIG. 8 the spacer section 58 is an integral feature of the bulkhead housing 16, whereas in FIG. 1 the spacer section 58 is integral with the retainer 14. The spacer section 58 has an indexing end 160 in contacting relation with the retaining shoulder 62 of the retainer 14. The axial length of the spacer section 58 is slightly greater than the captured axial length of the backup ring 12, so that the axial distance between the retaining shoulder 62 of the retainer 14 and the locating shoulder 80 of the bulkhead housing 16 is greater than the mating captured axial length of the backup ring 12. The slight length difference between the spacer section 58 and the backup ring 12 ensures that the backup ring 12 is not clamped between the retaining shoulder 62 of the retainer 14 and the locating shoulder 80 of the bulkhead housing 16. The slight length difference between the spacer section 58 and the backup ring 12 ensures that the extrusion gap between the retaining shoulder 62 of the retainer 14 and the first ring end 36 of the backup ring 12 is small, to minimize pressure induced extrusion damage at the first outer sealing site 112. The slight length difference between the spacer section 58 and the backup ring 12 also ensures that the extrusion gap between the locating shoulder 80 of the bulkhead housing 16 and the second ring end 38 of the backup ring 12 is small, to minimize pressure induced extrusion damage at the second inner sealing site 114 and the second outer sealing site 116.

As with FIG. 1, in FIG. 8 a retainer seal 22 establishes sealing between and with the bulkhead housing 16 and the retainer 14, and partitions the pressure of the first fluid 32 from the pressure of the second fluid 34. The pressure of the first fluid 32 is preferably greater than the pressure of the second fluid 34. An advantage of the FIG. 8 arrangement is that the retainer seal 22 is not exposed to a radial extrusion gap between the bulkhead housing 16 and the retainer 14, because the retainer shoulder 62 is in contact with the indexing end 160. As with FIG. 1, in FIG. 8 the supporting groove wall 97 is in substantial axial alignment with the first ring end 36. This substantial axial alignment occurs by virtue of the supporting groove wall 97 being an outward continuation of the generally planar indexing end 160 which is aligned and in contact with the retaining shoulder 62 of the retainer 14. As is the case with FIG. 1, the spacer section 58 of FIG. 8 controls the axial location of the retaining shoulder 62 of the retainer 14 relative to the locating shoulder 80 of the bulkhead housing 16.

As is the case with FIG. 1, the backup ring 12 of FIG. 8 incorporates a pressure port 118 that penetrates from the ring inner surface 40 of the backup ring 12 to the ring outer surface 42. If desired, the pressure port 118 may be generally radially oriented, as shown. Unlike FIG. 1, the ring inner surface 40 of the backup ring 12 of FIG. 8 incorporates a pressure communication slot 154 for speedily communicating the pressure of the second fluid 34 to the pressure port 118. This pressure communication slot 154 is applicable to the backup rings shown in other figures herein, at the designer's discretion. For example, if the pressure communication slot 154 were to be incorporated on the backup ring 12 of FIG. 1, there would be little or no reason for the bulkhead housing 16 of FIG. 1 to incorporate a pressure port 118. Indeed, the bulkhead housing 16 of FIG. 8 does not incorporate the pressure port 118 that is shown in the bulkhead housing 16 of FIG. 1.

Unlike FIG. 1, in FIG. 8 the ring inner surface 40 includes an annular pressure distribution groove 168, and both the pressure port 118 and the pressure communication slot 154 open into the annular pressure distribution groove 168. This arrangement provides for the rapid distribution of the pressure of the second fluid 34 into the regions of tight clearance between the backup ring 12 and the shaft 4. Both the pressure communication slot 154 and the annular pressure distribution groove 168 are applicable to the backup ring 12 of FIG. 1, but were not included in FIG. 1 simply because of the extremely crowded nature of the annotations of FIG. 1. The pressure communication slot 154 and the annular pressure distribution groove 168 are also applicable to the backup rings shown in the other figures herein.

In FIG. 8, the anti-rotation pocket 66 is incorporated into the spacer section 58 of the bulkhead housing 16, whereas in FIG. 1 the anti-rotation pocket 66 is incorporated into the spacer section 58 of the retainer 14.

As with FIG. 1, in FIG. 8 sealing material establishes a first inner sealing site 110 sealing the extrusion gap 33 clearance between the ring inner surface 40 and the sealing surface 28 of the shaft 4, and establishes a first outer sealing site 112 at the first ring end 36 sealing between the first ring end 36 and the retainer 14, and establishes a second inner sealing site 114 at the second ring end 38 sealing between the second ring end 38 and the bulkhead housing 16, and establishes a second outer sealing site 116 at the second ring end 38 sealing between the second ring end 38 and the bulkhead housing 16. As with FIG. 1, in FIG. 8 the first outer sealing site 112 is located generally radially outward from the first inner sealing site 110 and the second outer sealing site 116 is located generally radially outward from the second inner sealing site 114. As with FIG. 1, in FIG. 8 first inner sealing site 110 and the first outer sealing site 112 define a first hydraulic area exposed to the pressure of the first fluid 32, the pressure of the first fluid 32 acting over the first hydraulic area and producing a first axially oriented hydraulic force acting on the backup ring 12 in a first hydraulic force direction 146. As with FIG. 1, in FIG. 8 the second inner sealing site 114 and the second outer sealing site 116 define a second hydraulic area exposed to the pressure of the first fluid 32. As with FIG. 1, in FIG. 8 the pressure of the first fluid 32 acts over the second hydraulic area and produces a second axially oriented hydraulic force acting on the backup ring 12 in a second hydraulic force direction 148 that is opposite the first hydraulic force direction 146, and oriented toward the retaining shoulder 62 of the retainer 14. The first hydraulic force direction 146 and the second hydraulic force direction 148 are oppositely oriented with respect to one another, and act in opposed generally axial directions. As with FIG. 1, in FIG. 8 the first hydraulic area is the area between the first inner sealing site 110 and the first outer sealing site 112, and the second hydraulic area is the area between the second inner sealing site 114 and the second outer sealing site 116.

As with FIG. 1, in FIG. 8 an inner balancing seal 18 is in face sealing contact with the second ring end 38 of the backup ring 12 and the bulkhead housing, and provides the sealing material establishing the second inner sealing site 114. As with FIG. 1, in FIG. 8 an outer balancing seal 20 is in face sealing contact with the second ring end 38 of the backup ring 12 and the bulkhead housing 16, and provides the sealing material establishing the second outer sealing site 116.

It is preferred that the first and second hydraulic areas be substantially equal, so that the first and second axially-acting hydraulic forces are substantially equal, and substantially cancel one another out, so that the net axially-acting hydraulic force acting on the backup ring 12 is negligible, leaving the backup ring 12 free to translate laterally with any relative lateral movement between the shaft 4 and the bulkhead housing 16.

A dynamic seal 10 is held in sealing engagement with the sealing surface 28 of the shaft 4. Sealing material of the dynamic seal 10 bridges the extrusion gap 33 (FIG. 1B) between the ring inner surface 40 of the backup ring 12 and the sealing surface 28 of the shaft 4. Sealing material of the dynamic seal 10 also bridges the extrusion gap between the retaining shoulder 62 of the retainer 14 and the first ring end 36 of the backup ring 12, establishing the first outer sealing site 112.

If desired, the second fluid 34 can be retained by an outboard seal 126, which partitions the second fluid 34 from a third fluid 35. If desired, an outboard port 128 can be incorporated for introducing the second fluid 34 into the sealed region between the dynamic seal 10 and the outboard seal 126. If desired, more than one outboard port 128 can be incorporated for circulating the second fluid 34 for cooling or other purposes. If desired, the outboard seal 126 could be incorporated into a laterally translating seal carrier (not shown) of a type known to the prior art, such that the outboard seal 126 could translate laterally in concert with any lateral motion of the shaft 4. If desired, the outboard seal 126 could also be supported by a laterally translatable backup ring of the general type disclosed by this specification. As a simplification, the outboard seal 126 and outboard port 128 may be omitted.

In FIG. 8 and in many other figures herein, the first ring end 36 and the second ring end 38 of the backup ring 12 are substantially planar surfaces that are substantially parallel to one another.

Figure 9:
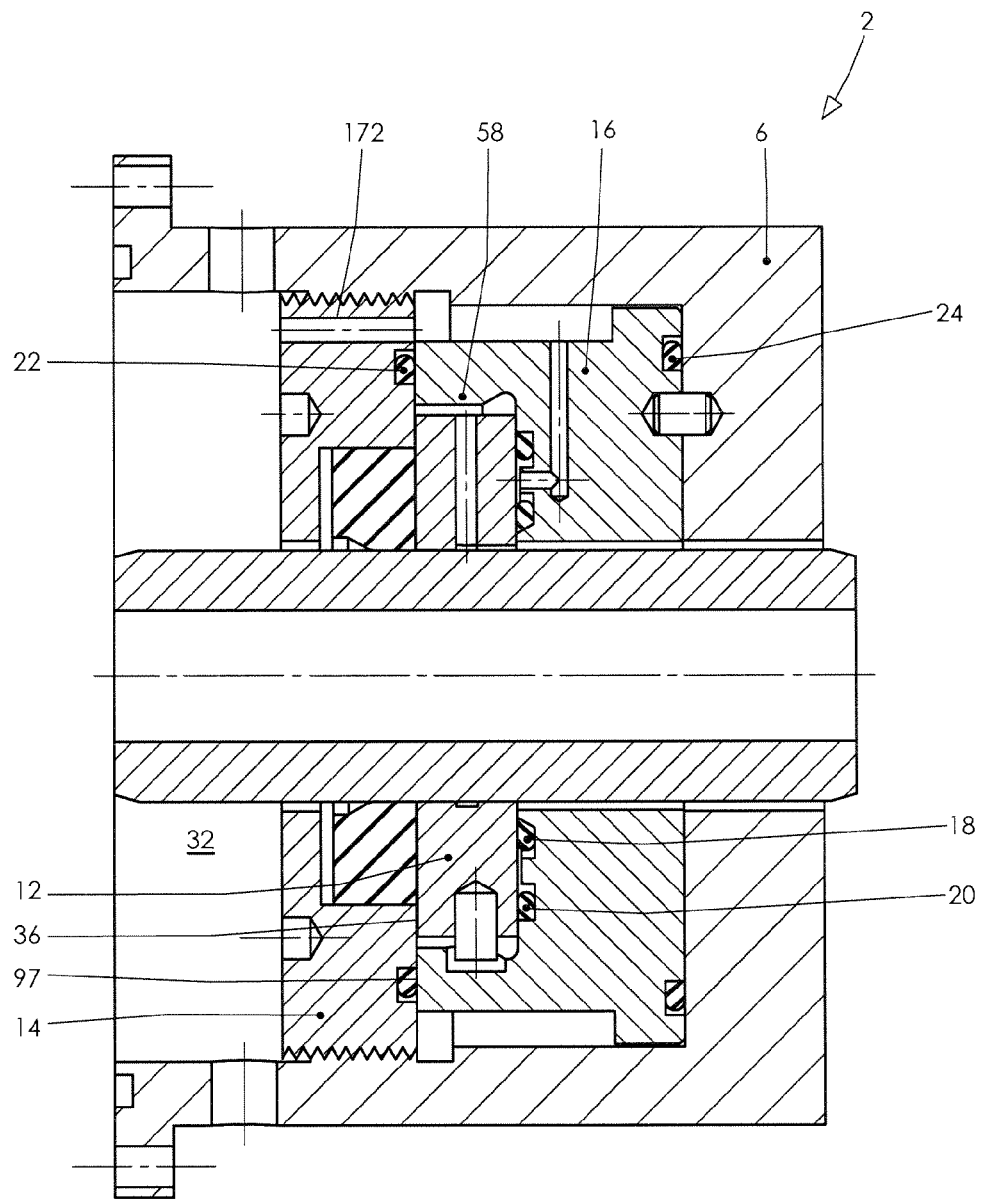

In FIG. 9, a longitudinal cross-sectional view of a sealed machine assembly is shown generally at 2. FIG. 9 is an alternate embodiment of the present invention, showing that the retainer 14 can be threadedly (or otherwise) retained to the machine housing 6, rather than to the bulkhead housing 16, while still causing the retainer 14 to be secured in a sealed relationship with the bulkhead housing 16. FIG. 9 also shows that the retainer seal 22 can be mounted in a groove in the retainer 14, rather than a groove in the bulkhead housing 16, while still allowing the supporting wall 97 to be substantially aligned with the first ring end 36 of the backup ring 12. Although FIG. 9 shows the groove for the retainer seal 22 to be formed in the retainer 14, the groove could easily be formed in the bulkhead housing 16 if desired. FIG. 9 also shows that the housing seal 24 can be a face seal. Although FIG. 9 shows the groove for the housing seal 24 to be formed in the bulkhead housing 16, the groove could easily be formed in the machine housing 6 if desired. The spacer section 58 is formed as part of the bulkhead housing 16. As with many of the other figures herein, the backup ring 12 is pressure-balanced in the radial direction and force-balanced in the axial direction. The retainer 14 is not sealed with respect to the machine housing 6, and a fluid communication hole 172 is provided in the retainer 14 for ensuring rapid transmission of the pressure of the first fluid 32 to the sealed region between the inner balancing seal 18 and the outer balancing seal 20.

Figure 10:
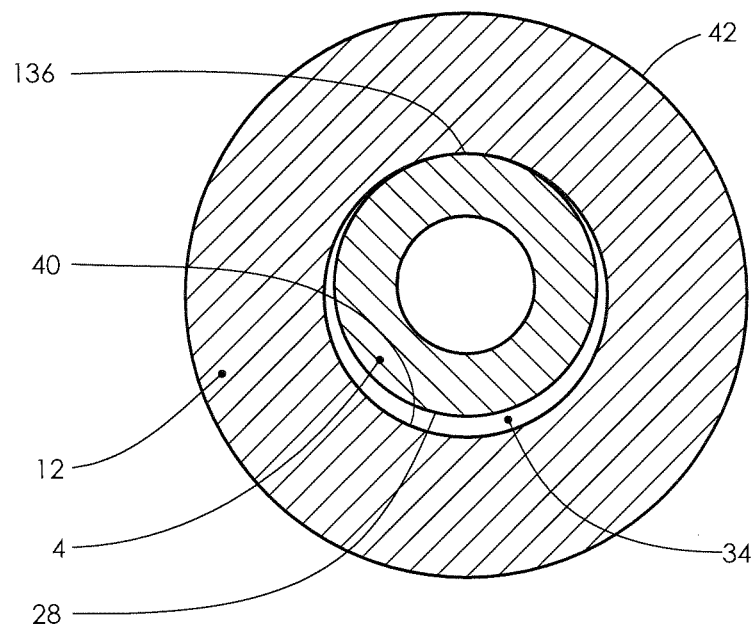
FIGS. 10 and 11 are schematic cross-sectional representations of a shaft and the backup ring according to various embodiments of the present invention.

FIG. 10 is a schematic representation of the shaft 4 and the backup ring 12 of an embodiment of the present invention, showing the gradual circumferential convergence to a tangency location 136 between the ring inner surface 40 and the sealing surface 28 in a situation where the shaft 4 has moved laterally into contact with the backup ring 12. Clearance between the shaft 4 and the backup ring 12 is exaggerated for the sake of clarity. The gradual circumferential convergence provides hydrodynamic lubrication at the tangency location 136 when the second fluid 34 has lubricating qualities and relative rotation is present between the shaft 4 and the backup ring 12. If desired as a simplification, the ring outer surface 42 may have generally circular shape, as shown.

Figure 11:
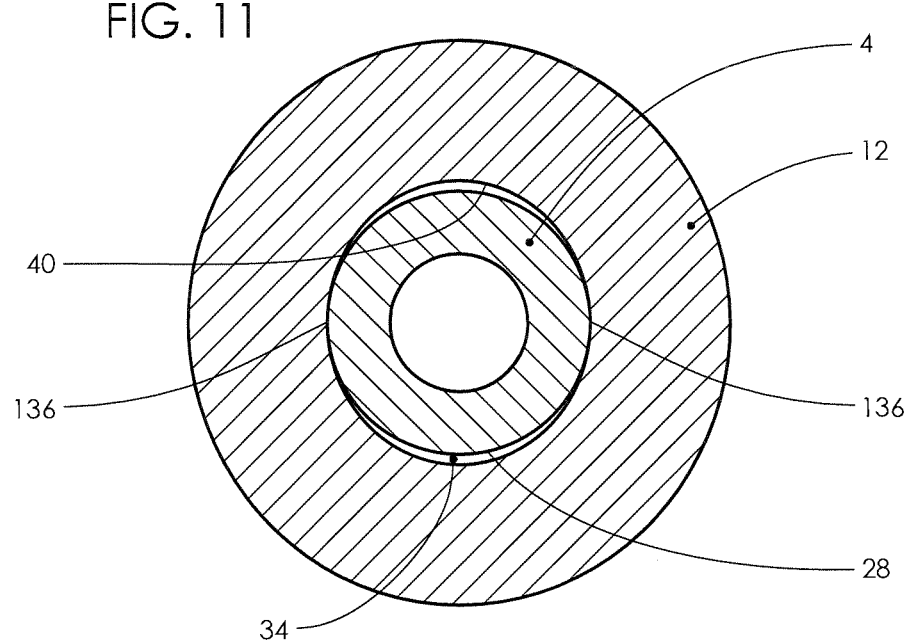

FIG. 11 is a schematic representation of the shaft 4 and the backup ring 12 of an embodiment of the present invention, showing the gradual circumferential convergence to two tangency locations 136 between the ring inner surface 40 and the sealing surface 28 in a situation where the backup ring 12 is large, and as a result somewhat elliptical. Clearance is exaggerated for the sake of clarity. The gradual circumferential convergence provides hydrodynamic lubrication at the tangency locations 136 when the second fluid 34 has lubricating qualities and relative rotation is present between the shaft 4 and the backup ring 12.

Figure 12:
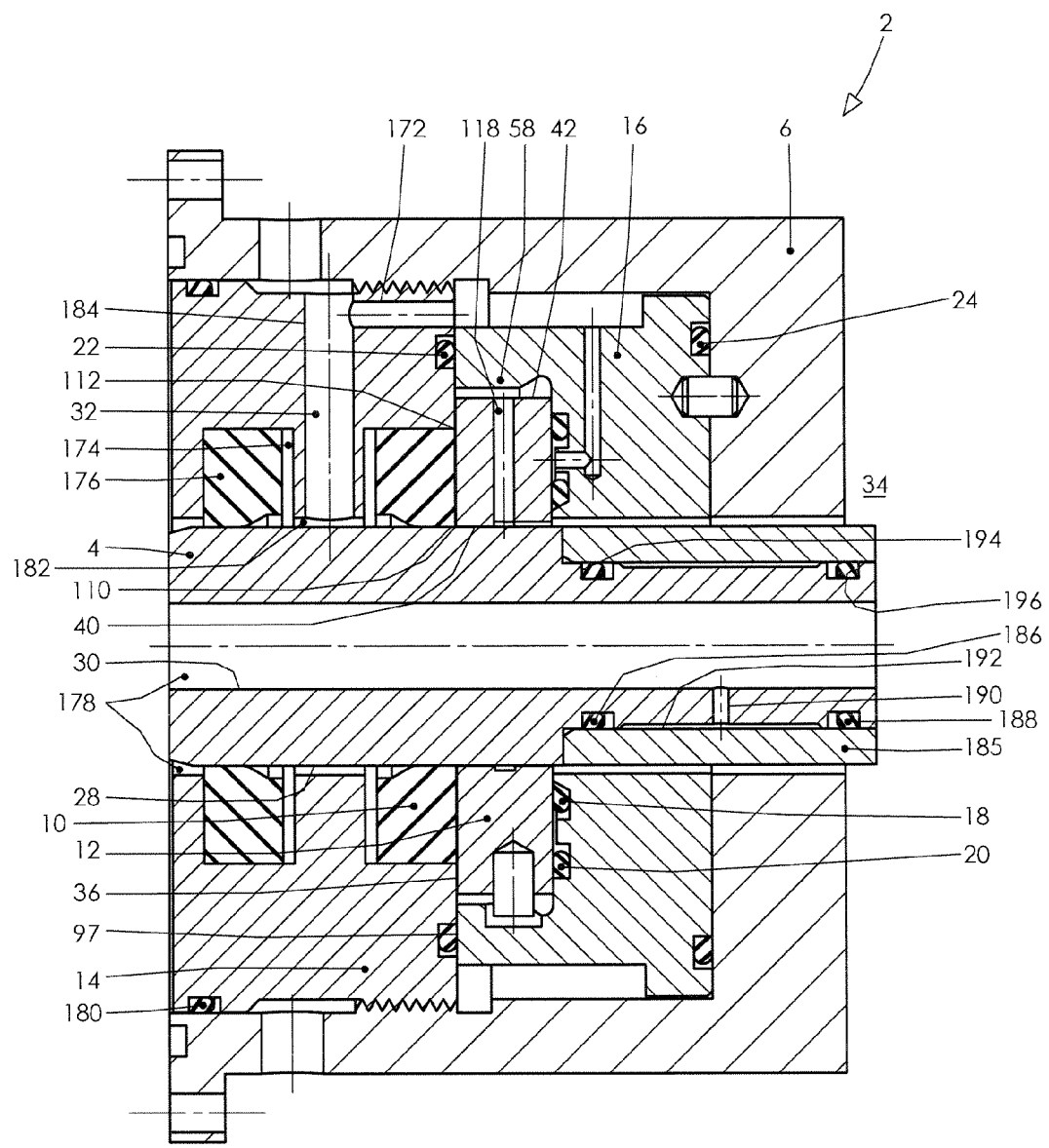

In FIG. 12, a longitudinal cross-sectional view of a sealed machine assembly is shown generally at 2, representing a device such as a swivel that retains a first fluid 32 which is preferably a pressurized seal lubricant and separates the first fluid 32 from a second fluid 34, and conducts a pressurized process fluid 178 through the internal passage 30 of the shaft 4, and prevents the passage of the process fluid 178 into the first fluid 32 and the second fluid 34. FIG. 12 is an alternate embodiment of the present invention, showing that the retainer 14 can be threadedly (or otherwise) retained to the machine housing 6 and can incorporate a groove 174 locating a dynamic partitioning seal 176 for partitioning the first fluid 32 from the process fluid 178 (such as oilfield drilling fluid) that may flow through the internal passage 30 of the shaft 4. The dynamic partitioning seal 176 is preferably in sealed relationship with the sealing surface 28 of the shaft 4, and with the groove 174 of the retainer 14. The dynamic seal 10 is sealed with respect to the shaft 4 and the retainer 14, and as with many other figures herein, establishes first inner sealing site 110 and a first outer sealing site 112. As with FIG. 9, in FIG. 12 the retainer seal 22 can be mounted in a groove in the retainer 14, rather than a groove in the bulkhead housing 16, while still allowing the supporting wall 97 to be substantially aligned with the first ring end 36 of the backup ring 12. A static partitioning seal 180 is preferably mounted in a seal groove in either the retainer 14 or the machine housing 6, and establishes a sealed relationship between the retainer 14 and the machine housing 6, partitioning the first fluid 32 from the process fluid 178. The pressure of the first fluid 32 is preferably somewhat greater than the pressure of the process fluid 178, to properly orient the partitioning seal 176 within the groove 174. The first fluid 32 is conducted radially inward to the annular clearance region 182 between the dynamic seal 10 and the partitioning seal 176 by a fluid passage 184, which may be radially oriented as shown, if desired. Although FIG. 12 shows the groove for the retainer seal 22 to be formed in the retainer 14, the groove could easily be formed in the bulkhead housing 16 if desired. The bulkhead housing 16 of FIG. 12 is the same as the bulkhead housing 16 of FIG. 9, and therefore shows that the housing seal 24 can be a face seal. Although FIG. 12 shows the groove for the housing seal 24 to be formed in the bulkhead housing 16, the groove could easily be formed in the machine housing 6 if desired. The spacer section 58 may, if desired, be formed as part of the bulkhead housing 16, as shown. As with many of the other figures herein, the backup ring 12 is pressure balanced in the radial direction and force balanced in the axial direction. The threads of the retainer 14 are not sealed with respect to the machine housing 6, and a fluid communication hole 172 may be used in the retainer 14 for ensuring rapid transmission of the pressure of the first fluid 32 to the sealed region between the inner balancing seal 18 and the outer balancing seal 20.

In FIG. 12, the shaft 4 is recessed to receive a pressure sleeve 185, and first and second sleeve seals 186 and 188 establish a static sealed relationship between the shaft 4 and the pressure sleeve 185. A process fluid port 190 conducts the pressure of the process fluid 178 through the wall of the shaft 4, and into the sealed region between the first and second sleeve seals 186 and 188, allowing the pressure of the process fluid 178 to act on the inner sleeve surface 192 of the pressure sleeve 185 that is located between opposed groove walls 194 and 196, and allowing the pressure of the process fluid 178 to act on the outwardly-oriented surfaces of the shaft 4 that are located between opposed groove walls 194 and 196. Between opposed groove walls 194 and 196, the shaft 4 is radially pressure balanced, and therefore largely immune to pressure induced deformation. This radial pressure balancing helps to minimize the pressure-induced deformation of the portion of the sealing surface 28 of the shaft 4 that is located directly inside the backup ring 12. This dimensional stability of the sealing surface 28 enables the initial clearance between the ring inner surface 40 of the backup ring 12 and the sealing surface 28 of the shaft 4 to be minimal. As in other figures, the backup ring 12 is radially pressure balanced by allowing the pressure of the second fluid 34 to act on both the ring inner surface 40 and the ring outer surface 42. In FIG. 12, the pressure of the second fluid 34 is conducted to the ring outer surface 42 by a pressure port 118.

Figure 13:
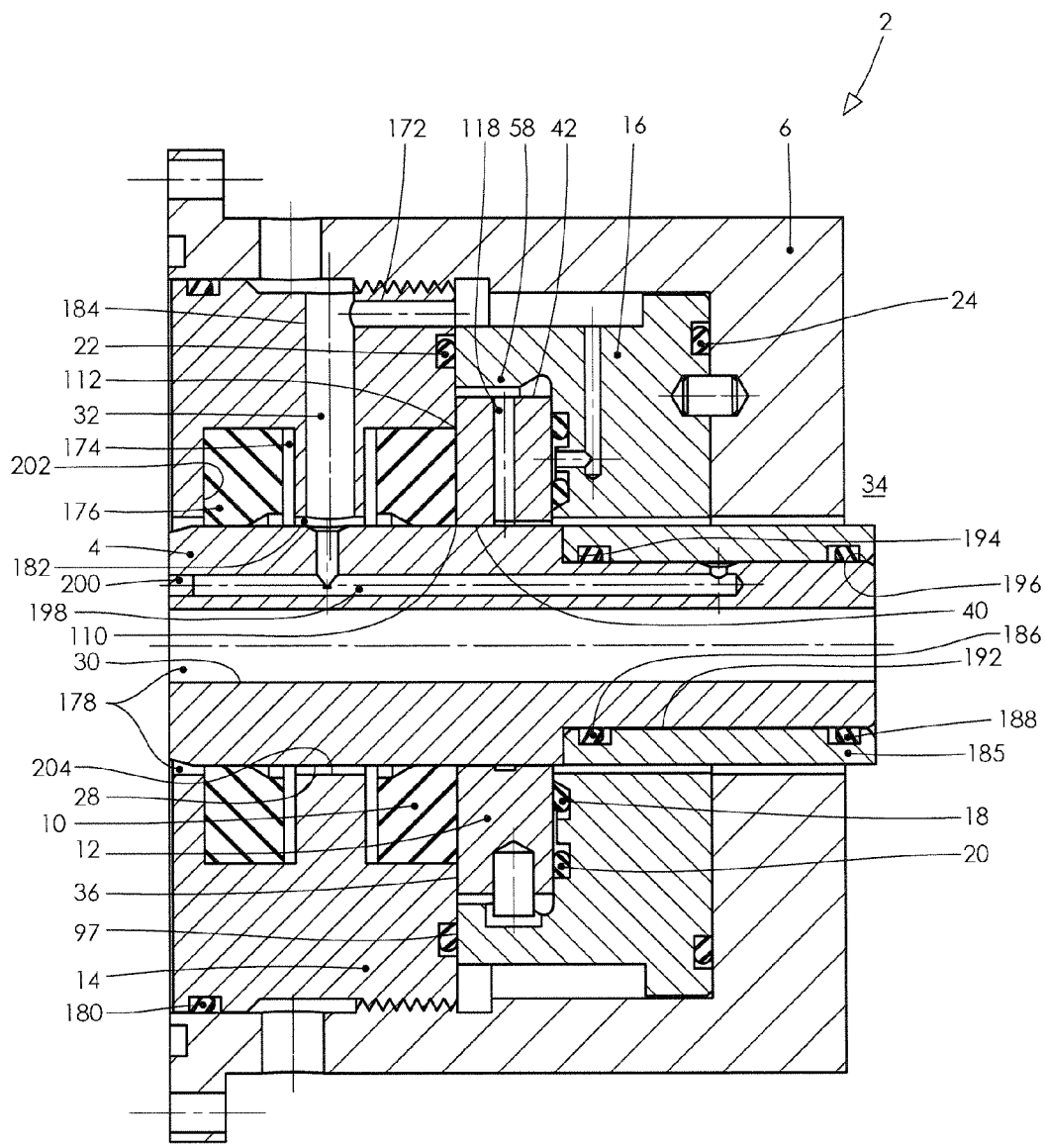

In FIG. 13, a longitudinal cross-sectional view of a sealed machine assembly is shown generally at 2, representing a device such as a swivel that retains a first fluid 32 which is preferably a pressurized seal lubricant, and separates the first fluid 32 from a second fluid 34, and conducts a pressurized process fluid 178 through the internal passage 30 of the shaft 4, and prevents the passage of the process fluid 178 into the first fluid 32 and the second fluid 34. The retainer 14 is threadedly (or otherwise) retained to the machine housing 6 and can incorporate a groove 174 locating a dynamic partitioning seal 176 for partitioning the first fluid 32 from the process fluid 178 (such as oilfield drilling fluid) that may flow through the internal passage 30 of the shaft 4. The dynamic partitioning seal 176 is preferably in sealed relationship with the sealing surface 28 of the shaft 4, and with the groove 174 of the retainer 14. The dynamic seal 10 is sealed with respect to the shaft 4 and the retainer 14, and as with many other figures herein, establishes first inner sealing site 110 and a first outer sealing site 112. As with FIG. 9, in FIG. 13 the retainer seal 22 can be mounted in a groove in the retainer 14, rather than a groove in the bulkhead housing 16, while still allowing the supporting wall 97 to be substantially aligned with the first ring end 36 of the backup ring 12. A static partitioning seal 180 is preferably mounted in a seal groove in either the retainer 14 or the machine housing 6, and establishes a sealed relationship between the retainer 14 and the machine housing 6, partitioning the first fluid 32 from the process fluid 178. The pressure of the first fluid 32 is preferably modestly greater than the pressure of the process fluid 178, to properly orient the partitioning seal 176 within the groove 174. For example, if the pressure of the process fluid 178 was 5,000 psi, the pressure of the first fluid 32 could be several hundred psi greater than 5,000 psi, to orient the partitioning seal 176 against the support wall 202 of the groove 174 for abrasion resistance purposes. The first fluid 32 is conducted radially inward to the annular clearance region 182 between the dynamic seal 10 and the partitioning seal 176 by a fluid passage 184, which may be radially oriented as shown, if desired. Although FIG. 13 shows the groove for the retainer seal 22 to be formed in the retainer 14, the groove could easily be formed in the bulkhead housing 16 if desired. The bulkhead housing 16 of FIG. 13 is the same as the bulkhead housing 16 of FIG. 9, and therefore shows that the housing seal 24 can be a face seal. Although FIG. 13 shows the groove for the housing seal 24 to be formed in the bulkhead housing 16, the groove could easily be formed in the machine housing 6 if desired. The spacer section 58 may, if desired, be formed as part of the bulkhead housing 16, as shown. As with many of the other figures herein, the backup ring 12 is preferably pressure balanced in the radial direction and preferably force balanced in the axial direction. Simplifications are possible. For example, if desired, the backup ring 12 could be radially pressure balanced but not axially force balanced. The threads of the retainer 14 are not sealed with respect to the machine housing 6, and a fluid communication hole 172 may be used in the retainer 14 for ensuring rapid transmission of the pressure of the first fluid 32 to the sealed region between the inner balancing seal 18 and the outer balancing seal 20.

In FIG. 13, the shaft 4 is recessed to receive a pressure sleeve 185, and first and second sleeve seals 186 and 188 establish a static sealed relationship between the shaft 4 and the pressure sleeve 185. A cross-drilled hole 198 conducts the pressure of the first fluid 32 into the sealed region between the first and second sleeve seals 186 and 188, allowing the pressure of the first fluid 32 to act on the interior surfaces of the pressure sleeve 185 that are located between opposed groove walls 194 and 196, and allowing the pressure of the first fluid 32 to act on the outwardly oriented surfaces of the shaft 4 that are located between opposed groove walls 194 and 196. Because the pressure of the first fluid 32 is only modestly greater than the pressure of the process fluid 178, in the region between opposed groove walls 194 and 196, the shaft 4 is nearly pressure balanced in the radial direction, and therefore largely immune to pressure differential induced deformation. Indeed, because the pressure of the first fluid 32 is only modestly greater than the pressure of the process fluid 178, it can be said that the shaft 4 is substantially radially pressure balanced in the region located between opposed groove walls 194 and 196. This achievement of nominal radial pressure balancing helps to minimize the pressure induced deformation of the portion of the sealing surface 28 of the shaft 4 that is located directly inside the backup ring 12. This dimensional stability of the sealing surface 28 enables the initial clearance between the ring inner surface 40 of the backup ring 12 and the sealing surface 28 of the shaft 4 to be minimal. As in other figures, the backup ring 12 is preferably radially pressure balanced by allowing the pressure of the second fluid 34 to act on both the ring inner surface 40 and the ring outer surface 42. In FIG. 13, the pressure of the second fluid 34 is conducted to the ring outer surface 42 by a pressure port 118, but if desired the pressure of the second fluid 34 could be conducted via a hole in the bulkhead housing 16.

As with many cross-drilled holes of the prior art, the cross-drilled hole 198 is sealed by a plug 200 of any suitable type, such as a weld plug, or a threaded plug, or a press fit plug, etc. If desired, the bore 204 of the retainer 14 can be sized to serve as a journal bearing that provides radial guidance to the shaft 4.

CONCLUSION

In view of the foregoing it is evident that the embodiments of the present invention are adapted to attain some or all of the aspects and features hereinabove set forth, together with other aspects and features which are inherent in the apparatus disclosed herein.

Even though several specific geometries are disclosed in detail herein, many other geometrical variations employing the basic principles and teachings of this invention are possible. The foregoing disclosure and description of the invention are illustrative and explanatory thereof, and various changes in the size, shape and materials, as well as in the details of the illustrated construction, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A sealing assembly comprising:
a bulkhead housing having a portion thereof exposed to a first fluid having a first fluid pressure and having a portion thereof exposed to a second fluid having a second fluid pressure, and having a locating shoulder facing in a generally axial direction;
a shaft having a portion thereof exposed to said first fluid and a portion thereof exposed to said second fluid, said shaft defining an externally-oriented sealing surface of generally cylindrical form, at least part of said sealing surface being located at least partially within said bulkhead housing and being relatively movable with respect to said bulkhead housing;
a retainer located radially outward of at least a portion of said shaft and surrounding at least a portion of said shaft, said retainer defining a retaining shoulder facing generally toward said locating shoulder of said bulkhead housing, and said locating shoulder facing generally toward said retaining shoulder;
a backup ring of generally circular form located between said retaining shoulder and said locating shoulder, and having a first ring end with a first portion thereof facing and adjoining said retaining shoulder and a second ring end having at least a portion thereof facing and adjoining said locating shoulder, said first and second ring ends facing in generally opposite directions, said backup ring having a ring inner surface facing generally inward toward said shaft sealing surface and establishing a region of clearance therewith, and having a ring outer surface facing generally radially outward, said backup ring having radial thickness between said ring inner surface and said ring outer surface, at least a portion of said ring inner surface and at least a portion of said ring outer surface being exposed to said second fluid pressure;

said region of clearance forming an extrusion gap between said ring inner surface and said shaft sealing surface at said first ring end;

means for sealing establishing (a) a first inner sealing site at said first ring end sealing said extrusion gap between said ring inner surface and said shaft sealing surface, (b) a first outer sealing site at said first ring end sealing between said first ring end and said retainer, (c) a second inner sealing site at said second ring end sealing between said second ring end and said bulkhead housing, and (d) a second outer sealing site at said second ring end sealing between said second ring end and said bulkhead housing, said second inner sealing site and said second outer sealing site encircling said shaft, said second inner sealing site separated from said shaft by a radial distance and said second outer sealing site separated from said shaft by a radial distance, said radial distance separating said second outer sealing site from said shaft being greater than said radial distance separating said second inner sealing site from said shaft;

said first inner and outer sealing sites sealing said first fluid pressure from said second fluid pressure and said second inner and outer sealing sites sealing said first fluid pressure from said second fluid pressure, wherein:

said first outer sealing site being located generally radially outward from said first inner sealing site and said second outer sealing site being located generally radially outward from said second inner sealing site, said first inner sealing site and said first outer sealing site defining a first hydraulic area exposed to said first fluid pressure, said first fluid pressure acting over said first hydraulic area and producing a first axially-oriented hydraulic force acting on said backup ring in a first hydraulic force direction toward said locating shoulder, said first hydraulic area being an annular area located between said first inner and outer sealing sites, and said second inner sealing site and said second outer sealing site defining a second hydraulic area exposed to said first fluid pressure, said first fluid pressure acting on said second ring end over said second hydraulic area and producing a second axially-oriented hydraulic force acting on said backup ring in a second hydraulic force direction that is opposite to said first hydraulic force direction and toward said retaining shoulder.

2. The sealing assembly of claim 1, wherein:

said means for sealing establishing said first outer sealing site being a face seal contacting and establishing sealing between said backup ring and said retainer and partitioning said first fluid pressure from said second fluid pressure, at least a portion of said retainer contacted b said first fluid and at least a portion of said retainer contacted by said second fluid, said face seal located radially outward of and encircling said sealing surface, and said sealing surface locating said backup ring laterally.

3. The sealing assembly of claim 2, further comprising:

an annular seal groove formed in one of said backup ring and said retainer, wherein said face seal is located at least partially within said annular seal groove, and said annular seal groove encircling said sealing surface, a dynamic seal contacting said sealing surface and said first ring end of said backup ring establishing said first inner sealing site, and said annular seal groove located radially outward of said dynamic seal.

4. The sealing assembly of claim 3, wherein said ring inner surface of said backup ring establishes a bearing relationship with said shaft, and locates said backup ring radially with respect to said shaft, said ring inner surface located in intermediate relation to said dynamic seal and said locating shoulder of said bulkhead housing, and located in intermediate relationship to said dynamic sea and said second inner sealing site, and located in intermediate relationship to said dynamic seal and said second outer sealing site, no portion of said ring inner surface being exposed to said first fluid pressure.

5. The sealing assembly of claim 1, wherein said first fluid pressure is greater than said second fluid pressure, at least a portion of said retainer being exposed to said first fluid and said first fluid pressure, at least a portion of said retaining shoulder being exposed to said second fluid and said second fluid pressure, and a portion of said bulkhead housing located radially inward of said second inner sealing site being exposed to said second fluid and said second fluid pressure.

6. The sealing assembly of claim 1, wherein said retaining shoulder of said retainer is separated from said locating shoulder of said bulkhead housing by an axial dimension, and a spacer section controls said axial dimension, at least a portion of said retainer being exposed to said first fluid and at least a portion of said retainer being exposed to said second fluid.

7. The sealing assembly of claim 6, wherein said spacer section is an axially-projecting feature of said retainer, and has a spacer nose contacting said locating shoulder, at least a portion of said retainer being contacted by said first fluid and at least a portion of said retainer being contacted by said second fluid.

8. The sealing assembly of claim 1, wherein said shaft and said bulkhead housing have relative radial motion with respect to each other, and said backup ring is positioned laterally by said sealing surface and follows said relative radial motion and has relative radial motion with respect to said bulkhead housing and said retainer, said sealing surface passing completely through said backup ring from said first ring end to said second ring end, at least part of said sealing surface being located within and surrounded by at least a portion of said retaining shoulder.

9. The sealing assembly of claim 1, wherein a dynamic seal establishing said first inner sealing site, said backup ring has a bearing relationship with said shaft, said bearing relationship located in intermediate relation to said dynamic seal and said second ring end, and located in intermediate relationship to said dynamic seal and said second inner sealing site, and located in intermediate relationship to said dynamic seal and said second outer sealing site.

10. The sealing assembly of claim 1, wherein said retainer and said bulkhead housing are threadedly retained together, said bulkhead housing includes inner and outer seal grooves encircling said shaft and opening toward said second ring end of said backup ring, said outer seal groove located farther from said shaft than said inner seal groove and separated from said shaft by a radial distance, an outer balancing seal located by said outer seal groove and contacting said outer seal groove and said second ring end, an inner balancing seal located by said inner seal groove and contacting said inner seal groove and said second ring end, said second ring end having an outer peripheral edge separated from said shaft by a radial distance, said radial distance separating said outer peripheral edge from said shaft being greater than said radial distance separating said outer seal groove from said shaft.

11. The sealing assembly of claim 1, wherein said retainer includes a radially inward facing surface forming a gland bore of generally cylindrical form located in spaced relation to and encircling said shaft sealing surface; and said means for sealing establishing said first outer sealing site at said first ring end sealing between said first ring end and said retainer comprises a dynamic seal located at least partially within said gland bore, said dynamic seal has first and second seal ends, with at least part of said first seal end contacting said first fluid and at least part of said second seal end contacting said first ring end of said backup ring, said dynamic seal has a static sealing surface held in sealing contact with said gland bore of said retainer and has a dynamic sealing surface in sealing contact with said shaft sealing surface;

said sealing surface locating said backup ring laterally.

12. The sealing assembly of claim 11, wherein said backup ring has an axial length between said first and second ring ends, and all of said axial length is located between said dynamic seal and said locating shoulder, no spring being located between said backup ring and said locating shoulder;

said first seal end facing away from said second seal end and facing away from said first ring end of said backup ring, a portion of said second ring end of said backup ring exposed to said first fluid and said first fluid pressure and a portion of said second ring end of said backup ring exposed to said second fluid and said second fluid pressure.

13. The sealing assembly of claim 1, wherein said means for sealing comprises a dynamic seal in contacting engagement with a second portion of said first ring end of said backup ring establishing said first inner sealing site, and said dynamic seal including a dynamic sealing surface in sealing engagement with said shaft sealing surface.

14. The sealing assembly of claim 13, wherein no portion of said backup ring encircles said dynamic seal, inner and outer balancing seals in face sealing contact with said second ring end of said backup ring, said inner and outer balancing seals contacting said bulkhead housing and encircling said shaft, at least a portion of said ring outer surface located farther from said shaft than said inner and outer balancing seals, a portion of said second ring end radially inward of said inner balancing seal exposed to said second fluid and said second fluid pressure, a portion of said second ring end radially outward of said inner balancing seal and radially inward of said outer balancing seal exposed to said first fluid and said first fluid pressure, and a portion of said second ring end located radially outward of said outer balancing seal exposed to said second fluid and said second fluid pressure.

15. The sealing assembly of claim 13, wherein no portion of said dynamic seal is located between said first and second ring ends, inner and outer balancing seals in face sealing contact with said second ring end of said backup ring, said inner and outer balancing seals contacting said bulkhead housing and encircling said shaft, at least a portion of said ring outer surface located farther from said shaft than said inner and outer balancing seals, at least a portion of said second ring end exposed to said first fluid pressure and at least a portion of said second ring end being exposed to said second fluid pressure.

16. The sealing assembly of claim 1, wherein said means for sealing comprises a dynamic seal having a dynamic sealing surface in sealing contact with said shaft sealing surface, and having a first seal end exposed to said first fluid and a second seal end facing and in contact with a second portion of said first ring end of said backup ring establishing said first outer sealing site.

17. The sealing assembly of claim 16, wherein no portion of said backup ring is located between said dynamic seal and said retaining shoulder of said retainer, inner and outer balancing seals in face sealing contact with said second ring end of said backup ring, said inner and outer balancing seals contacting said bulkhead housing and encircling said shaft, at least a portion of said ring outer surface located farther from said shaft than said inner and outer balancing seals, at least a portion of said second ring end exposed to said first fluid pressure and at least a portion of said second ring end exposed to said second fluid pressure.

18. The sealing assembly of claim 16, wherein a retainer seal contacting and establishing sealing between said bulkhead housing and said retainer, at least part of said retainer seal being exposed to said second fluid, said retainer seal located directly radially outward from and encircling said dynamic seal and located directly radially outward from and encircling said sealing surface of said shaft, said sealing surface locating said backup ring laterally.

19. The sealing assembly of claim 1, wherein said means for sealing comprises:

an inner balancing seal in sealing contact with said bulkhead housing and said second ring end of said backup ring establishing said second inner sealing site separated from said first inner sealing site by an axial distance;

an outer balancing seal in sealing contact with said bulkhead housing and said second ring end of said backup ring establishing said second outer sealing site separated from said first outer sealing site by an axial distance, said inner and outer balancing seals encircling said shaft sealing surface; and said inner balancing seal located between and exposed to said first fluid and said second fluid and sealing said first fluid from said second fluid, and said outer balancing seal located between and exposed to said first fluid and said second fluid and sealing said first fluid from said second fluid, at least some of said first fluid located between said inner and outer balancing seals; a portion of said bulkhead housing radially inward of said inner balancing seal exposed to said second fluid and said second fluid pressure, a portion of said bulkhead housing radially outward of said inner balancing seal and radially inward of said outer balancing seal exposed to said first fluid and said first fluid pressure.

20. The sealing assembly of claim 19, wherein said outer balancing seal is located radially outward of and encircles said inner balancing seal.

21. The sealing assembly of claim 19, wherein said bulkhead housing includes a pressure passage exposed to said first fluid and having an opening located between said inner and outer balancing seals, said pressure passage being a cross-drilled hole located radially outward of said sealing surface of said shaft.

22. The sealing assembly of claim 1, wherein said backup ring includes a pressure port passing through said backup ring in a generally radial direction from said region of clearance to said ring outer surface, said pressure port being located between and axially spaced from said first and second outer sealing sites and between and axially spaced from said first and second inner sealing sites, and located between and axially spaced from said first and second ring ends, and located between and axially spaced from said retaining shoulder and said locating shoulder, said pressure port having first and second open ends and providing communication in a generally radially outward direction from said region of clearance to an open area located radially outward of said ring outer surface, said first open end facing radially inward toward said sealing surface of said shaft and said second open end located radially outward of said first open end and facing radially outward and facing away from said sealing surface of said shaft, said pressure port communicating said second fluid and said second fluid pressure to said open area and to said ring outer surface, causing said backup ring to be radially pressure balanced.

23. The sealing assembly of claim 1, wherein said bulkhead housing includes a pressure port communicating said second fluid pressure to said ring outer surface, said second fluid pressure being atmospheric pressure and said second fluid being atmosphere.

24. The sealing assembly of claim 1, wherein said bulkhead housing includes a pressure passage communicating said first fluid pressure to said second hydraulic area, said pressure passage being a cross-drilled hole located radially outward of said sealing surface of said shaft, at least part of said cross-drilled hole being a generally axially oriented hole located radially outward of said second inner sealing site and located radially inward of said second outer sealing site, said generally axially oriented hole having an opening facing generally toward said second ring end of said backup ring, and at least part of said cross-drilled hole being a hole that intersects said generally axially oriented hole.

25. The sealing assembly of claim 24, wherein said retainer has a generally axially oriented fluid communication hole located radially outward of said first outer sealing site, and said fluid communication hole being exposed to said first fluid and communicating said first fluid to said cross-drilled hole.

26. The sealing assembly of claim 1, wherein said first hydraulic area is substantially equal to said second hydraulic area.

27. The sealing assembly of claim 1, wherein said first ring end and said second ring end are substantially flat surfaces and said first ring end is substantially parallel to said second ring end, said shaft having an axis, said first ring end separated from said axis by a radial distance, said second ring end separated from said axis by a radial distance, and said sealing surface separated from said axis by a radial distance and locating said backup ring laterally, said radial distance separating said first ring end from said axis being no less than said radial distance separating said sealing surface from said axis and said radial distance separating said second ring end from said axis being no less than said radial distance separating said sealing surface from said axis.

28. The sealing assembly of claim 1, wherein
said first inner sealing site is separated from said second inner sealing site by an axial distance,
said first outer sealing site is separated from said second outer sealing site by an axial distance,
said axial distance separating said first and second inner sealing sites is substantially equal to said axial distance separating said first and second outer sealing sites,
a portion of said second ring end located radially inward of said second inner sealing site exposed to said second fluid and said second fluid pressure, a portion of said second ring end located radially outward of said second inner sealing site and radially inward of said second outer sealing site exposed to said first fluid and said first fluid pressure, and a portion of said second ring end located radially outward of said second outer sealing site exposed to said second fluid and said second fluid pressure, and
a portion of said bulkhead housing located radially inward of said second inner sealing site exposed to said second fluid and said second fluid pressure, a portion of said bulkhead housing located radially outward of said second inner sealing site and radially inward of said second outer sealing site exposed to said first fluid and said first fluid pressure, and a portion of said bulkhead housing located radially outward of said second outer sealing site exposed to said second fluid and said second fluid pressure.

29. The sealing assembly of claim 1, wherein said backup ring has a circumference and a pattern of weakening holes in said backup ring provide said backup ring with variable stiffness about said circumference, inner and outer balancing seals contacting and sealing between said bulkhead housing and said second ring end of said backup ring, a portion of said second ring end radially inward of said inner balancing seal exposed to said second fluid and said second fluid pressure, a portion of said second ring end radially outward of said inner balancing seal and radially inward of said outer balancing seal exposed to said first fluid and said first fluid pressure, and a portion of said second ring end located radially outward of said outer balancing seal exposed to said second fluid and said second fluid pressure, and said pattern of weakening holes located between said first ring end and said inner and outer balancing seals, said weakening holes selected from a group consisting of generally radially oriented weakening holes and generally axially oriented weakening holes.

30. The sealing assembly of claim 1, wherein said backup ring has a circumference and said radial thickness of said backup ring varies about said circumference, providing said backup ring with variable stiffness about said circumference, said inner and outer ring surfaces separated by a radial distance, said radial thickness being said radial distance separating said ring inner surface and said ring outer surface.

31. The sealing assembly of claim 1, wherein said retainer has an internal retainer cavity formed at least in part by said retaining shoulder, and formed at least in part by a radially inwardly facing retainer cavity surface, said radially inwardly facing retainer cavity surface encircles at least part of said backup ring.

32. The sealing assembly of claim 1, wherein said retainer has an internal retainer cavity formed at least in part by said retaining shoulder, and formed at least in part by a radially inwardly facing retainer cavity surface, at least part of said radially inwardly facing retainer cavity surface exposed to said second fluid and encircling at least part of said backup ring, and at least part of said retainer exposed to said first fluid.

33. The sealing assembly of claim 1, wherein an innermost surface of said bulkhead housing facing generally toward said shaft and exposed to said second fluid, said ring outer surface located radially outward of said ring inner surface and radially outward of said innermost surface of said bulkhead housing, wherein a pressure port passes through at least a portion of said backup ring in a generally radial direction, communicating from said region of clearance between said ring inner surface and said sealing surface of said shaft, said pressure port located between said first and second ring ends of said backup ring and spaced away from said second ring end and located between said first ring end and said second inner sealing site and between said first ring end and said second outer sealing site, and having an inwardly facing open end and an outwardly facing open end, said pressure port extending between said inwardly facing open end and said outwardly facing open end, and said outwardly facing open end located radially outward from said inwardly facing open end.

34. The sealing assembly of claim 1, wherein all of said backup ring is larger than, located directly radially outward from, and encircles said sealing surface of said shaft and said sealing surface of said shaft locates said backup ring laterally.

35. The sealing assembly of claim 1, wherein all of said retainer is larger than said sealing surface of said shaft, said sealing surface of said shaft locates said backup ring laterally, at least a portion of said retainer contacted by said first fluid and at least a portion of said retainer contacted by said second fluid.

36. The sealing assembly of claim 1, wherein said sealing surface of said shaft locating said backup ring laterally and extending completely through said bulkhead housing.

37. The sealing assembly of claim 1, wherein said sealing surface of said shaft locating said backup ring laterally and extending completely through said retainer.

38. The sealing assembly of claim 1, wherein said sealing surface of said shaft locating said backup ring laterally and extending completely through said backup ring.

39. The sealing assembly of claim 1, wherein said first and second ring ends being located radially outward of and encircling said sealing surface of said shaft, said sealing surface of said shaft locating said backup ring laterally.

40. The sealing assembly of claim 1, wherein no portion of said ring outer surface of said backup ring is exposed to said first fluid, at least a portion of said retainer is exposed to said first fluid at least a portion of said retainer is exposed to said second fluid.

41. The sealing assembly of claim 1, wherein no portion of said ring inner surface of said backup ring is exposed to said first fluid pressure and at least some portion of said retainer is exposed to said first fluid pressure.

42. The sealing assembly of claim 1, wherein at least some of said first fluid is located between said second inner sealing site and said second outer sealing site, and at least some of said second hydraulic area is exposed to said first fluid, said first and second inner and outer sealing sites each being located between said first and second fluids and each sealing said first fluid from said second fluid, a portion of said second ring end located radially inward of said second inner sealing site exposed to said second fluid and said second fluid pressure, a portion of said second ring end located radially outward of said second inner sealing site and radially inward of said second outer sealing site exposed to said first fluid and said first fluid pressure, and a portion of said second ring end located radially outward of said second outer sealing site exposed to said second fluid and said second fluid pressure, and a portion of said bulkhead housing located radially inward of said second inner sealing site exposed to said second fluid and said second fluid pressure, a portion of said bulkhead housing located radially outward of said second inner sealing site and radially inward of said second outer sealing site exposed to said first fluid and said first fluid pressure, and a portion of said bulkhead housing located radially outward of said second outer sealing site exposed to said second fluid and said second fluid pressure.

43. The sealing assembly of claim 1, wherein said backup ring positioned laterally by said sealing surface of said shaft, said bulkhead housing having an innermost surface of annular form having a diameter, and said ring inner surface of said backup ring having at least one diameter, and said sealing surface having a diameter, said diameter of said sealing surface being smaller than said diameter of said innermost surface of said bulkhead housing, and no diameter of said ring inner surface being smaller than said diameter of said sealing surface.

44. The sealing assembly of claim 1, wherein said retainer includes a radially inward facing surface forming a gland bore of generally cylindrical form located in radially spaced relation to and encircling said shaft sealing surface and exposed to said first fluid and includes a gland wall facing generally toward said first ring end and exposed to said first fluid;

said sealing surface locating said backup ring laterally;
at least part of said retainer contacted by said second fluid;
said means for sealing establishing said first outer sealing site at said first ring end sealing between said first ring end and said retainer comprises a dynamic seal located at least partially within said gland bore and at least partially between said gland wall and said first ring end, said dynamic seal has a static sealing surface held in sealing contact with said gland bore of said retainer and has a dynamic sealing surface in sealing contact with said shaft sealing surface, and said dynamic seal has a first seal end facing generally toward said gland wall and exposed to said first fluid, and has a second seal end facing and in contact with a second portion of said first ring end, said first ring end encircling said sealing surface; and
said second portion of said first ring end facing toward said second seal end and facing toward said gland wall.

45. The sealing assembly of claim 1, wherein said retainer having an inner peripheral surface facing generally radially inward toward and surrounding at least part of said sealing surface, said inner peripheral surface contacting said first fluid, at least part of said retainer exposed to said second fluid pressure, and said sealing surface positioning said backup ring laterally.

46. The sealing assembly of claim 45, wherein said sealing surface passes completely through said inner peripheral surface of said retainer.

47. The sealing assembly of claim 1, wherein said means for sealing establishing said first outer sealing site at said first ring end sealing between said first ring end and said retainer comprises a dynamic seal, and at least part of said dynamic seal is inside said retainer, said dynamic seal in sealing contact with said sealing surface and said sealing surface locating said backup ring laterally.

48. The sealing assembly of claim 1, wherein said backup ring is inside said retainer, at least a portion of said retainer contacted by said first fluid and at least a portion of said retainer contacted by said second fluid.

49. The sealing assembly of claim 1, wherein said locating shoulder of said bulkhead housing has inner and outer seal grooves of annular form opening toward said second ring end of said backup ring and located directly radially outward from and encircling said sealing surface, said outer seal groove located directly radially outward from and encircling said inner seal groove, an inner balancing seal being located in and contacting said inner seal groove, an outer balancing seal being located in and contacting said outer seal groove, said inner and outer balancing seals contacting said second ring end of said backup ring, a pressure passage passing through at least part of said bulkhead housing and having an opening between said inner and outer balancing seals, said pressure passage communicating said first fluid pressure and said sealing surface locating said backup ring laterally.

50. The sealing assembly of claim 1, wherein said means for sealing establishing said first outer sealing site at said first ring end sealing between said first ring end and said retainer comprises a dynamic seal, said dynamic seal contacting said first ring end, said retainer, and said shaft, said backup ring located laterally by said shaft, no part of said backup ring located between said dynamic seal and said retaining shoulder of said retainer, and no part of said dynamic seal is inside any part of said backup ring.

51. The sealing assembly of claim 1, wherein said retaining shoulder encircling at least part of said sealing surface and said sealing surface locating said backup ring laterally, and said retaining shoulder facing generally toward said first portion of said first ring end.

52. The sealing assembly of claim 1, wherein said shaft sealing surface passing completely through said ring inner surface, said sealing surface locating said backup ring laterally.

53. The sealing assembly of claim 1, wherein said shaft sealing surface passing completely through said ring inner surface and passing through said backup ring from said first ring end to said second ring end, said sealing surface locating said backup ring laterally.

54. The sealing assembly of claim 1, wherein said sealing surface passes completely through said bulkhead housing and completely through said backup ring, at least part of said sealing surface encircled by said retaining shoulder, said sealing surface locating said backup ring laterally.

55. The sealing assembly of claim 1, wherein:
said means for sealing establishing said first inner sealing site being a dynamic seal contacting said sealing surface and said first ring end, said means for sealing establishing said first outer sealing site being a face seal contacting and establishing sealing between said backup ring and said retainer, said face seal located radially outward from and encircling said sealing surface and located radially outward from and encircling said dynamic seal,
an annular seal groove formed in said retainer and opening toward said backup ring,
said face seal being located at least partially within said annular seal groove, and said annular seal groove located radially outward from encircling said sealing surface and located radially outward from and encircling said dynamic seal.

56. The sealing assembly of claim 1, wherein said shaft has an axially facing surface, and no portion of said backup ring surrounds said axially facing surface.

57. The sealing assembly of claim 1, wherein said shaft has an axially facing surface extending radially outward to and terminating at an outer peripheral edge of said axially facing surface, and no portion of said backup ring is smaller than said outer peripheral edge of said axially facing surface.

58. A sealing assembly comprising:
a bulkhead housing defining a locating shoulder facing in a generally axial direction, said bulkhead housing having a portion thereof exposed to a first fluid having a first fluid pressure and having a portion thereof exposed to a second fluid having a second fluid pressure;
a shaft defining an externally-oriented sealing surface of generally cylindrical form, at least part of said sealing surface being located at least partially within said bulkhead housing, and being relatively movable with respect to said bulkhead housing, said shaft having a portion thereof exposed to said first fluid and a portion thereof exposed to said second fluid;
a retainer located radially outward of at least a portion of said shaft and surrounding at least part of said shaft sealing surface, and defining a retaining shoulder facing generally toward said locating shoulder of said bulkhead housing, said locating shoulder of said bulkhead housing facing in a generally axial direction toward said retaining shoulder, said retainer having a radially inward facing surface defining a gland bore of generally cylindrical form located in radially spaced relation to said shaft sealing surface and encircling said shaft sealing surface;
a backup ring of generally circular form located between said retaining shoulder of said retainer and said locating shoulder of said bulkhead housing, said backup ring having a first ring end with at least a portion thereof facing said retaining shoulder and a second ring end with at least a portion thereof facing said locating shoulder, said first and second ring ends facing in generally opposite directions, said backup ring having a ring inner surface facing generally inward toward said shaft sealing surface and establishing a region of clearance therewith forming an extrusion gap between said ring inner surface and said sealing surface at said first ring end, and having a ring outer surface facing generally radially outward, said backup ring having radial thickness between said ring inner and outer surfaces, said ring inner and outer surfaces being exposed to said second fluid pressure; and
a dynamic seal located at least partially within said gland bore of said retainer, said dynamic seal having a static sealing surface held in direct sealing contact with said gland bore and having a dynamic sealing surface in sealing contact with said shaft sealing surface, said dynamic seal having a first seal end exposed to said first fluid and a second seal end facing and in contact with said first ring end of said backup ring, said region of clearance located between said dynamic seal and said second ring end;
said dynamic seal establishing first inner and outer sealing sites at said first ring end, said first outer sealing site located generally radially outward from said first inner sealing site, said first inner and outer sealing sites defining a first hydraulic area exposed to said first fluid pressure, said first fluid pressure acting over said first hydraulic area and producing a first axially oriented hydraulic force acting on said backup ring in a first hydraulic force direction acting generally toward said locating shoulder of said bulkhead housing.

59. The sealing assembly of claim 58, wherein said backup ring incorporates a pressure port passing from said region of clearance and through said radial thickness of said backup ring to said ring outer surface, said pressure port located between and axially spaced from said first and second ring ends, and located between and axially spaced apart from said dynamic seal and said locating shoulder, and located between and axially spaced apart from said retaining shoulder and said locating shoulder, and located between and axially spaced apart from said first outer sealing site and said second ring end, and located between and axially spaced apart from said first inner sealing site and said second ring end, said pressure port having first and second open ends, said first open end facing radially inward toward said shaft sealing surface and said second open end facing radially outward away from said shaft sealing surface, said pressure port communicating said second fluid and said second fluid pressure of to said ring outer surface, causing said backup ring to be radially pressure balanced, none of said ring outer surface being exposed to said first fluid pressure.

60. The sealing assembly of claim 58, wherein said bulkhead housing incorporates a pressure port communicating said second fluid pressure to said ring outer surface, said second fluid being atmosphere.

61. The sealing assembly of claim 58, wherein said first and second ring ends are substantially flat surfaces.

62. The sealing assembly of claim 58, wherein said first ring end is substantially parallel to said second ring end, said shaft having an axis, said first ring end separated from said axis by a radial distance, said second ring end separated from said axis by a radial distance, and said sealing surface separated from said axis by a radial distance and locating said backup ring laterally, said radial distance separating said first ring end from said axis being no less than said radial distance separating said sealing surface from said axis and said radial distance separating said second ring end from said axis being no less than said radial distance separating said sealing surface from said axis.

63. The sealing assembly of claim 58, further comprising a retainer seal contacting and establishing sealing between said bulkhead housing and said retainer and encircling said shaft sealing surface, partitioning said first fluid from said second fluid and said first fluid pressure from said second fluid pressure, said sealing surface locating said backup ring laterally.

64. The sealing assembly of claim 63, further comprising:
a retainer seal groove with a supporting wall formed in one of said bulkhead housing and said retainer,
wherein said retainer seal is located at least partially within said retainer seal groove, and said supporting wall and said first ring end of said backup ring are substantially axially aligned, at least a portion of said retainer and said retainer seal contacted by said first fluid, and at least a portion of said retainer and said retainer seal contacted by said second fluid.

65. The sealing assembly of claim 63, wherein said retainer seal is a face seal.

66. The sealing assembly of claim 58, wherein said backup ring has a circumference, and a pattern of weakening holes in said backup ring provide said backup ring with variable stiffness about said circumference, said weakening holes being selected from a group consisting of generally radially oriented holes and generally axially oriented holes, inner and outer balancing seals contacting and establishing sealing between said bulkhead housing and said second ring end of said backup ring, said outer balancing seal being farther from said shaft than said inner balancing seal and said first fluid pressure acting radially outward on said outer balancing seal and acting radially inward on said inward balancing seal, said weakening holes being located in intermediate relation to said dynamic seal and said inner balancing seal and located in intermediate relation to said dynamic seal and said inner balancing seal.

67. The sealing assembly of claim 58, wherein said backup ring has a circumference, a radial distance separating said ring inner and outer surfaces, said radial thickness of said backup ring and said radial distance varying about said circumference, providing said backup ring with variable stiffness about said circumference.

68. The sealing assembly of claim 58, wherein
said dynamic seal establishing said first inner sealing site sealing said extrusion gap between said ring inner surface and said shaft sealing surface, and establishing said first outer sealing site sealing between said first ring end and said retainer, said extrusion gap exposed to said second fluid pressure and a portion of said dynamic seal exposed to said second fluid pressure at said extrusion gap.

69. The sealing assembly of claim 68, further comprising a retainer seal contacting and establishing sealing between said bulkhead housing and a retainer sealing surface of said retainer, said retainer seal contacting said first and second fluids, partitioning said first fluid from said second fluid and partitioning said first fluid pressure from said second fluid pressure, said retainer sealing surface being larger than said first outer sealing site, producing a retainer hydraulic area between said retainer sealing surface and said first outer sealing site, said first fluid pressure acting on said retainer hydraulic area creating a hydraulic force acting on said retainer in said first hydraulic force direction.

70. The sealing assembly of claim 68, further comprising a retainer seal contacting and establishing sealing between said bulkhead housing and said retainer and being exposed to and separating said first fluid from said second fluid, said retainer seal being a face seal.

71. The sealing assembly of claim 58, wherein said retaining shoulder of said retainer is separated from said locating shoulder of said bulkhead housing by an axial dimension, and at least a portion of said backup ring being located directly between said retaining shoulder and said locating shoulder, said at least a portion of said backup ring having an axial length between said first and second ring ends, said axial dimension separating said locating shoulder from said retaining shoulder is greater than said axial length of said at least a portion of said backup ring to allow said backup ring to move radially in response to any radial motion of said shaft, no portion of said bulkhead housing located between said backup ring and said locating shoulder and no portion of said bulkhead housing located between said backup ring and said retaining shoulder, said first fluid contacting at least part of said gland bore of said retainer, said first ring end of said backup ring adjoining said retaining shoulder and said second ring end of said backup ring adjoining said locating shoulder.

72. The sealing assembly of claim 58, wherein further comprising:
inner and outer balancing seals contacting and sealing between said bulkhead housing and said second ring end of said backup ring, said outer balancing seal being farther from said shaft than said inner balancing seal,
said bulkhead housing has at least one pressure passage, and said first fluid pressure is supplied to said second ring end of said backup ring through said at least one pressure passage, said pressure passage comprising a cross-drilled hole consisting of at least two intersecting holes, at least one of said intersecting holes being a generally axially oriented hole having an opening facing toward said second ring end of said backup ring and located in intermediate relation to said inner and outer balancing seals, said opening being radially outward of said inner balancing seal and being radially inward of said outer balancing seal.

73. The sealing assembly of claim 58, wherein said ring inner surface of said backup ring is located between said dynamic seal and said locating shoulder and establishes a bearing relationship with said sealing surface of said shaft, said sealing surface locating said backup ring laterally, all of said backup ring located directly radially outward of and encircling said sealing surface, and no portion of said backup ring extending axially beyond said sealing surface.

74. The sealing assembly of claim 58, wherein said retainer and said bulkhead housing are threadedly retained together, said first fluid contacting at least a portion of said retainer, and said second ring end of said backup ring facing away from said retainer.

75. The sealing assembly of claim 58, wherein said dynamic seal includes a dynamic lip having a lubricant side flank that is exposed to said first fluid and is sloped relative to said shaft sealing surface, providing gradual convergence with said shaft sealing surface, thus forming a hydrodynamic inlet that introduces a lubricating film of said first fluid between said dynamic sealing surface and said shaft sealing surface in response to relative motion between said dynamic seal and said shaft sealing surface, said dynamic lip contacting and supported by said first ring end of said backup ring and said dynamic sealing surface located in intermediate relation to said lubricant side flank and said first ring end of said backup ring, and said dynamic sealing surface located in intermediate relation to said lubricant side flank and said second ring end of said backup ring.

76. The sealing assembly of claim 58, further comprising:
an inner balancing seal in sealing contact with said bulkhead housing and said second ring end of said backup ring establishing a second inner sealing site separated from said first inner sealing site by an axial distance; and
an outer balancing seal in sealing contact with said bulkhead housing and said second ring end of said backup ring establishing a second outer sealing site located generally radially outward from said second inner sealing site and separated from said first outer sealing site by an axial distance,
wherein said second inner and outer sealing sites define a second hydraulic area exposed to said first fluid pressure, said first fluid pressure acting over said second hydraulic area and producing a second axially-oriented hydraulic force acting on said second ring end of said backup ring in a second hydraulic force direction that is opposite said first hydraulic force direction and toward said retaining shoulder.

77. The sealing assembly of claim 76, wherein said backup ring is penetrated by a pressure port located between and axially spaced from said first and second ring ends of said backup ring, and located between said first and second outer sealing sites, and located between said retaining shoulder and said locating shoulder, and located between said dynamic seal and said inner balancing seal and between said dynamic seal and said outer balancing seal, and passing from said region of clearance to said ring outer surface, said pressure port having first and second open ends, said first open end facing radially inward toward said sealing surface of said shaft and said second open end located radially outward of said first open end and facing radially outward and facing away from said sealing surface of said shaft, said pressure port communicating said second fluid and said second fluid pressure to said ring outer surface.

78. The sealing assembly of claim 76, wherein said bulkhead housing incorporates a pressure port communicating said second fluid pressure said ring outer surface, said second fluid being atmosphere.

79. The sealing assembly of claim 76, wherein said bulkhead housing incorporates a pressure passage communicating said first fluid pressure to said second hydraulic area, said pressure passage comprising at least one hole in said bulkhead housing having an open end facing toward said second ring end of said backup ring, said open end of said pressure passage separated from said shaft by a radial distance, said inner balancing seal separated from said shaft by a radial distance, said outer balancing seal separated from said shaft by a radial distance, said radial distance separating said open end of said pressure passage from said shaft being greater than said radial distance separating said inner balancing seal from said shaft and being less than said radial distance separating said outer balancing seal from said shaft.

80. The sealing assembly of claim 76, wherein said first hydraulic area is substantially equal to said second hydraulic area.

81. The sealing assembly of claim 76, wherein said axial distance separating said first inner sealing site from said second inner sealing site is substantially equal to said axial distance separating said first outer sealing site from said second outer sealing site,
a portion of said second ring end located radially inward of said second inner sealing site exposed to said second fluid and said second fluid pressure, a portion of said second ring end located radially outward of said second inner sealing site and radially inward of said second outer sealing site exposed to said first fluid and said first fluid pressure, and a portion of said second ring end located radially outward of said second outer sealing site exposed to said second fluid and said second fluid pressure, and
a portion of said bulkhead housing located radially inward of said second inner sealing site exposed to said second fluid and said second fluid pressure, a portion of said bulkhead housing located radially outward of said second inner sealing site and radially inward of said second outer sealing site exposed to said first fluid and said first fluid pressure, and a portion of said bulkhead housing located radially outward of said second outer sealing site exposed to said second fluid and said second fluid pressure.

82. The sealing assembly of claim 76, wherein said shaft sealing surface passing through said backup ring from said first ring end to said second ring end and passing completely through said ring inner surface, said sealing surface locating said backup ring laterally, and at least part of said second ring end of said backup ring located farther from said shaft than said outer balancing seal.

83. The sealing assembly of claim 76, wherein all of said retainer is larger than said sealing surface of said shaft;
a radial distance separating said ring outer surface from said shaft, a radial distance separating said outer balancing seal from said shaft, and a radial distance separating said inner balancing seal from said shaft, said radial distance separating said ring outer surface from said shaft being greater than said radial distance separating said outer balancing seal from said shaft and being greater than said radial distance separating said inner balancing seal from said shaft, said radial distance separating said outer balancing seal from said shaft being greater than said radial distance separating said inner balancing seal from said shaft, said sealing surface of said shaft locating said backup ring laterally.

84. The sealing assembly of claim 76, wherein said sealing surface of said shaft extending through said bulkhead housing, said sealing surface locating said backup ring laterally.

85. The sealing assembly of claim 76, wherein no portion of said backup ring encircles said dynamic seal, said second ring end of said backup ring having an outer peripheral edge spaced from said shaft by a radial distance, said outer balancing seal spaced from said shaft by a radial distance, said radial distance spacing said outer peripheral edge from said shaft being greater than said radial distance spacing said outer balancing seal from said shaft.

86. The sealing assembly of claim 76, wherein said outer balancing seal is located radially outward of and encircles said inner balancing seal, a portion of said second ring end radially inward of said inner balancing seal exposed to said second fluid and said second fluid pressure, a portion of said second ring end radially outward of said inner balancing seal and radially inward of said outer balancing seal exposed to said first fluid and said first fluid pressure, and a portion of said second ring end located radially outward of said outer balancing seal exposed to said second fluid and said second fluid pressure.

87. The sealing assembly of claim 86, wherein said inner and outer balancing seals are located radially outward of and encircle said sealing surface of said shaft.

88. The sealing assembly of claim 76, wherein said bulkhead housing includes a pressure passage exposed to said first fluid and having an opening located between said inner and outer balancing seals, said pressure passage being a cross-drilled hole, a portion of said bulkhead housing radially inward of said inner balancing seal exposed to said second fluid and said second fluid pressure, a portion of said bulkhead housing radially outward of said inner balancing seal and radially inward of said outer balancing seal exposed to said first fluid and said first fluid pressure, and a portion of said bulkhead housing located radially outward of said outer balancing seal exposed to said second fluid and said second fluid pressure.

89. The sealing assembly of claim 76, wherein at least some of said first fluid is located between said inner and outer balancing seals, said inner and outer balancing seals each being located between and exposed to said first and second fluids and each sealing said first fluid from said second fluid.

90. The sealing assembly of claim 76, wherein said bulkhead housing having an innermost surface of annular form having a diameter, and said ring inner surface of said backup ring having a diameter, said diameter of said ring inner surface of said backup ring being smaller than said diameter of said innermost surface of said bulkhead housing, and at least part of said innermost surface of said bulkhead housing exposed to said second fluid and said second fluid pressure, at least a part of said locating shoulder located radially outward of said inner balancing seal exposed to said first fluid pressure, and at least a part of said locating shoulder located radially outward of said outer balancing seal exposed to said second fluid pressure.

91. The sealing assembly of claim 76, wherein said retainer includes a gland wall located adjacent to said gland bore and facing generally toward said first ring end and said locating shoulder, said first ring end facing generally axially toward said retainer, said dynamic seal located between said first ring end and said gland wall of said retainer.

92. The sealing assembly of claim 76, wherein said retainer having an inner peripheral surface facing generally radially inward toward and surrounding at least part of said sealing surface, said first fluid contacting said inner peripheral surface, said sealing surface locating said backup ring laterally.

93. The sealing assembly of claim 92, wherein said sealing surface passes completely through said inner peripheral surface of said retainer.

94. The sealing assembly of claim 76, wherein said backup ring is inside said retainer.

95. The sealing assembly of claim 76, wherein said locating shoulder of said bulkhead housing has inner and outer seal grooves of annular form opening toward said second ring end of said backup ring and encircling said sealing surface, said outer seal groove encircling said inner seal groove, said inner balancing seal contacting and being located at least partially in said inner seal groove, said outer balancing seal contacting and being located at least partially in said outer seal groove, a pressure passage passing through at least part of said bulkhead housing and having an opening between said inner and outer balancing seals, said second ring end facing toward said inner and outer seal grooves.

96. The sealing assembly of claim 95, where said opening between said inner and outer balancing seals is an axially oriented hole.

97. The sealing assembly of claim 76, wherein said retaining shoulder of said retainer encircling at least part of said sealing surface, said sealing surface locating said backup ring laterally.

98. The sealing assembly of claim 76, wherein said inner balancing seal separated from said shaft by a radial distance and said outer balancing seal separated from said shaft by a radial distance,
said bulkhead housing including a pressure passage having an open end facing toward said second ring end of said backup ring and separated from said shaft by a radial distance, said radial distance separating said open end from said shaft being greater than said radial distance separating said inner balancing seal from said shaft and being less than said radial distance separating said outer balancing seal from said shaft, and
said first fluid pressure conducted to said second hydraulic area by said pressure passage.

99. The sealing assembly of claim 76, wherein none of said ring inner surface being exposed to said first fluid pressure and all of said ring inner surface being exposed to said second fluid pressure.

100. The sealing assembly of claim 76, wherein said ring inner surface has at least one diametric dimension and said sealing surface of said shaft has a diameter, and no diametric dimension of said backup ring bore is smaller than said diameter of said sealing surface of said shaft.

101. The sealing assembly of claim 58, wherein said shaft sealing surface passing through said ring inner surface from said first ring end to said second ring end, said sealing surface locating said backup ring laterally.

102. The sealing assembly of claim 58, wherein said bulkhead housing having an internal bulkhead cavity formed at least in part by said locating shoulder, and formed at least in part by a radially inwardly facing bulkhead cavity surface, said radially inwardly facing bulkhead cavity surface encircling at least part of said backup ring and exposed to said second fluid and said second fluid pressure,
inner and outer balancing seals in face sealing contact with said second ring end of said backup ring, said inner and outer balancing seals contacting said bulkhead housing and encircling said shaft, at least a portion of said ring outer surface located farther from said shaft than said inner and outer balancing seals, a portion of said second ring end between said inner and outer balancing seals exposed to said first fluid pressure, a portion of said second ring end radially inward of said inner balancing seal exposed to said second fluid and said second fluid pressure, and a portion of said second ring end located radially outward of said outer balancing seal exposed to said second fluid and said second fluid pressure.

103. The sealing assembly of claim 102, wherein said radially inwardly facing bulkhead cavity surface encircling at least part of said retainer and at least a portion of said retainer overhanging and encircling at least a portion of said backup ring, at least a portion of said retainer contacted by said first fluid, and at least a portion of said retainer contacted by said second fluid.

104. The sealing assembly of claim 58, wherein said retainer having an internal retainer cavity formed at least in part by said retaining shoulder, and formed at least in part by a radially inwardly facing retainer cavity surface, said radially inwardly facing retainer cavity surface encircling at least part of said backup ring.

105. The sealing assembly of claim 58, wherein said bulkhead housing having an innermost surface of annular form, and said innermost surface is larger than said sealing surface of said shaft and encircles at least part of said sealing surface, at least part of said innermost surface of said bulkhead housing exposed to said second fluid and said second fluid pressure.

106. The sealing assembly of claim 105, wherein said bulkhead housing includes a pressure port located radially outward of said innermost surface of said bulkhead housing, said pressure port communicating said second fluid to said ring outer surface.

107. The sealing assembly of claim 58, wherein all of said backup ring is larger than and located radially outward of said sealing surface of said shaft, said sealing surface locating said backup ring laterally.

108. The sealing assembly of claim 58, wherein said sealing surface of said shaft extending completely through said retainer, said sealing surface locating said backup ring laterally.

109. The sealing assembly of claim 58, wherein said sealing surface of said shaft extending completely through said backup ring, said sealing surface locating said backup ring laterally.

110. The sealing assembly of claim 58, wherein said first and second ring ends being located radially outward of and encircling said sealing surface of said shaft, said sealing surface locating said backup ring laterally.

111. The sealing assembly of claim 58, wherein said backup ring has an overall axial length between said first and second ring ends, and all of said axial length is located between said dynamic seal and said locating shoulder,
inner and outer balancing seals in face sealing contact with said second ring end of said backup ring, said inner and outer balancing seals also contacting said bulkhead housing and encircling said shaft, at least a portion of said ring outer surface located farther from said shaft than said inner and outer balancing seals, a portion of said second ring end radially inward of said inner balancing seal exposed to said second fluid and said second fluid pressure, a portion of said second ring end radially outward of said inner balancing seal and radially inward of said outer balancing seal exposed to said first fluid and said first fluid pressure, and a portion of said second ring end located radially outward of said outer balancing seal exposed to said second fluid and said second fluid pressure.

112. The sealing assembly of claim 58, wherein no portion of said dynamic seal is located between said first and second ring ends,
inner and outer balancing seals in face sealing contact with said second ring end of said backup ring, said inner and outer balancing seals also contacting said bulkhead housing and encircling said shaft, at least a portion of said ring outer surface located farther from said shaft than said inner and outer balancing seals, at least a portion of said second ring end exposed to said first fluid pressure and at least a portion of said second ring end exposed to said second fluid pressure.

113. The sealing assembly of claim 58, wherein no portion of said backup ring is located between said dynamic seal and said retainer,
inner and outer balancing seals in face sealing contact with said second ring end of said backup ring, said inner and outer balancing seals also contacting said bulkhead housing and encircling said shaft, at least a portion of said ring outer surface located farther from said shaft than said inner and outer balancing seals, at least a portion of said second ring end exposed to said first fluid pressure and at least a portion of said second ring end exposed to said second fluid pressure.

114. The sealing assembly of claim 58, wherein no portion of said ring outer surface of said backup ring is exposed to said first fluid and no portion of said ring inner surface is exposed to said first fluid pressure, and a portion of said gland bore of said retainer is exposed to said first fluid and to said first fluid pressure, and no portion of said first ring end of said backup ring is exposed to said first fluid.

115. The sealing assembly of claim 58, wherein a retainer seal contacting and establishing sealing between said bulkhead housing and said retainer, at least part of said retainer seal being exposed to said second fluid, said retainer seal located radially outward of and encircles said dynamic seal and said sealing surface of said shaft, and said sealing surface locating said backup ring laterally.

116. The sealing assembly of claim 58, wherein no part of said dynamic seal is inside any part of said backup ring,
inner and outer balancing seals in face sealing contact with said second ring end of said backup ring, said inner and outer balancing seals also contacting said bulkhead housing and encircling said shaft, at least a portion of said ring outer surface located farther from said shaft than said inner and outer balancing seals, at least a portion of said second ring end exposed to said first fluid pressure and at least a portion of said second ring end exposed to said second fluid pressure.

117. A sealing assembly comprising:
a bulkhead housing of annular form having a portion thereof exposed to a first fluid having a first fluid pressure and having a portion thereof exposed to a second fluid having a second fluid pressure that is less than said first fluid pressure, and having a locating shoulder facing in a generally axial direction;
a shaft having a portion thereof exposed to said first fluid and a portion thereof exposed to said second fluid, said shaft defining a sealing surface of generally cylindrical form, at least part of said sealing surface being located at least partially within said bulkhead housing and being relatively movable with respect to said bulkhead housing;

a retainer of annular form located radially outward of at least a portion of said shaft and encircling said shaft, said retainer defining a retaining shoulder facing generally toward said locating shoulder of said bulkhead housing and separated from said locating shoulder by an axial dimension, said retainer having a radially inward facing surface defining a gland bore of generally cylindrical form located in radially spaced relation to said shaft sealing surface and encircling at least part of said shaft sealing surface, said locating shoulder of said bulkhead housing facing generally toward said retaining shoulder;

a dynamic seal of annular form located at least partially within said gland bore, said dynamic seal having a static sealing surface held in direct sealing contact with said gland bore of said retainer and having a dynamic sealing surface in sealing contact with said sealing surface of said shaft;

a backup ring of generally circular form located between said retaining shoulder and said locating shoulder, and having a first ring end with at least a portion thereof facing and adjoining said retaining shoulder and a second ring end having at least a portion thereof facing and adjoining said locating shoulder, said first and second ring ends facing in generally opposite directions, said backup ring having a ring inner surface that is larger than, and facing generally radially inward toward, said shaft sealing surface and establishing an extrusion gap clearance and a bearing relationship therewith locating said backup ring radially, said backup ring having a ring outer surface facing generally radially outward, at least a portion of said ring outer surface located between said retaining shoulder and said locating shoulder, said backup ring having radial thickness between said ring inner surface and said ring outer surface, said first ring end located radially outward of and encircling said shaft sealing surface, at least part of said sealing surface located within said ring inner surface, no portion of said backup ring located between said dynamic seal and said retaining shoulder of said retainer;

said dynamic seal having a first seal end exposed to said first fluid and a second seal end facing and in contact with said first ring end of said backup ring, said second seal end of said dynamic seal facing toward said locating shoulder, said second seal end of said dynamic seal being nearer to said locating shoulder than said first seal end of said dynamic seal;

said dynamic seal establishing a first inner sealing site at said first ring end sealing said extrusion gap clearance between said ring inner surface and said shaft sealing surface, said dynamic seal exposed to said second fluid pressure at said extrusion gap clearance, and said dynamic seal establishing a first outer sealing site providing sealing between said first ring end and said retainer;

an inner balancing seal in face sealing contact with said bulkhead housing and said second ring end of said backup ring establishing a second inner sealing site separated from said first inner sealing site by an axial distance;

an outer balancing seal in face sealing contact with said bulkhead housing and said second ring end of said backup ring establishing a second outer sealing site separated from said first outer sealing site by an axial distance, said outer balancing seal encircling said shaft and located radially outward of and encircling said inner balancing seal;

said first inner and outer sealing sites and said second inner and outer sealing sites each sealing said first fluid pressure from said second fluid pressure, said first outer sealing site located generally radially outward from said first inner sealing site and said second outer sealing site located generally radially outward from said second inner sealing site, said first inner sealing site and said first outer sealing site defining a first hydraulic area exposed to said first fluid pressure, said first fluid pressure acting over said first hydraulic area and producing a first axially-oriented hydraulic force acting on said backup ring in a first hydraulic force direction, and said second inner sealing site and said second outer sealing site defining a second hydraulic area exposed to said first fluid pressure, said first fluid pressure acting over said second hydraulic area and producing a second axially-oriented hydraulic force acting on said backup ring in a second hydraulic force direction that is opposite to said first hydraulic force direction, said bulkhead housing having a pressure passage passing through at least part of said bulkhead housing and having an open end located between said inner and outer balancing seals, said pressure passage communicating said first fluid pressure to said second hydraulic area.

118. The sealing assembly of claim 117, wherein said ring inner surface and said ring outer surface being exposed to said second fluid pressure causing said backup ring to be radially pressure balanced.

119. The sealing assembly of claim 117, wherein said bulkhead housing and said retainer are threadedly retained together, and said first fluid contacting at least a portion of said retainer, and said second ring end of said backup ring facing away from said retainer.

120. The sealing assembly of claim 117, wherein said backup ring is penetrated by at least one pressure port located between and axially spaced from said first ring end and said second ring end, and located between and axially spaced from said dynamic seal and said locating shoulder of said bulkhead housing, and located between and axially spaced from said dynamic seal and said inner balancing seal, and located between and axially spaced from said dynamic seal and said outer balancing seal, said pressure port having generally oppositely facing first and second open ends, said first open end facing radially inward toward said sealing surface of said shaft and said second open end located radially outward of said first open end and facing radially outward away from said sealing surface of said shaft, said pressure port passing in a generally radial direction through at least a portion of said backup ring and communicating said second fluid pressure to said ring outer surface.

121. The sealing assembly of claim 117, wherein said first ring end and said second ring end are substantially flat surfaces, and said first ring end is substantially parallel to said second ring end, said inner balancing seal separated from said dynamic seal by a first axial distance and said outer balancing seal separated from said dynamic seal by a second axial distance, said first and second axial distances being equal, said shaft having an axis, said first ring end separated from said axis by a radial distance, said second ring end separated from said axis by a radial distance, and said sealing surface separated from said axis by a radial distance, said radial distance separating said first ring end from said axis being no less than said radial distance separating said sealing surface from said axis and said radial distance separating said second ring end from said axis being no less than said radial distance separating said sealing surface from said axis.

122. The sealing assembly of claim 117, wherein a component selected from a group consisting of said bulkhead housing and said retainer has an axial portion thereof located radially outward of and encircling at least part of said backup ring and establishing a region of radial clearance between said axial portion and said ring outer surface, said axial portion thereof incorporating an anti-rotation pocket, and an anti-rotation tang projecting from said backup ring engages said anti-rotation pocket, said bulkhead housing including a pressure port extending to and communicating with said region of radial clearance and communicating said second fluid pressure to said ring outer surface, said sealing surface passing completely through said backup ring and said retainer.

123. The sealing assembly of claim 117, wherein said first hydraulic area is substantially equal to said second hydraulic area.

124. The sealing assembly of claim 117, further comprising a retainer seal encircling said shaft sealing surface, contacting and establishing sealing between said bulkhead housing and said retainer, said retainer seal being a face seal.

125. The sealing assembly of claim 117, wherein said backup ring has an overall axial length between said first and second ring ends, and all of said overall axial length is located between said dynamic seal and said locating shoulder, and no portion of said backup ring encircles said dynamic seal, and no portion of said dynamic seal is located between said first and second ring ends, said second ring end of said backup ring having an outer peripheral edge spaced from said shaft by a radial distance, said outer balancing seal spaced from said shaft by a radial distance, said radial distance spacing said outer peripheral edge from said shaft being greater than said radial distance spacing said outer balancing seal from said shaft, said outer peripheral edge exposed to said second fluid pressure, and an annular portion of said second ring end between said inner and outer balancing seals exposed to said first fluid pressure.

126. The sealing assembly of claim 117, wherein said sealing surface of said shaft passing entirely through said ring inner surface, and passing completely through said backup ring from said first ring end to said second ring end, said second ring end being located radially outward of and encircling said sealing surface of said shaft, all of said backup ring being larger than and located radially outward of said sealing surface of said shaft.

127. The sealing assembly of claim 117, wherein said bulkhead housing having an innermost surface facing generally radially inward toward said shaft sealing surface, said innermost surface of said bulkhead housing being larger than said shaft sealing surface and located radially outward of and encircling at least part of said sealing surface, all of said bulkhead housing being larger than said sealing surface of said shaft, said ring inner surface of said backup ring being closer to said sealing surface, compared to said innermost surface of said bulkhead housing, said inner and outer balancing seals being located radially outward of and encircling said shaft sealing surface, said ring inner surface of said backup ring being smaller than said innermost surface of said bulkhead housing, and at least part of said innermost surface of said bulkhead housing exposed to said second fluid and said second fluid pressure and being the surface of said bulkhead located nearest to said shaft.

128. The sealing assembly of claim 127, wherein said sealing surface passes completely through said bulkhead housing.

129. The sealing assembly of claim 117, further comprising a retainer seal contacting and establishing sealing between said bulkhead housing and said retainer, said retainer seal located radially outward of and encircling said dynamic seal and said sealing surface of said shaft.

130. The sealing assembly of claim 117, wherein all of said retainer is larger than said sealing surface of said shaft and said sealing surface passes completely through said retainer.

131. The sealing assembly of claim 117, wherein said retainer includes a gland wall exposed to said first fluid and located adjacent to said dynamic seal and facing generally toward said first seal end of said dynamic seal, and facing generally toward said first ring end and said locating shoulder, said dynamic seal being located between said gland wall and said first ring end, all of said backup ring located between said dynamic seal and said locating shoulder, no part of said backup ring located between said retaining shoulder of said retainer and said dynamic seal, and said first seal end of said dynamic seal facing generally toward said gland wall.

132. The sealing assembly of claim 117, wherein said locating shoulder of said bulkhead housing has inner and outer seal grooves of annular form opening toward said second ring end of said backup ring and encircling said sealing surface, said outer seal groove encircling said inner seal groove, said inner balancing seal contacting and being located at least partially in said inner seal groove, said outer balancing seal contacting and being located at least partially in said outer seal groove, at least part of said open end of said pressure passage being located between said inner and outer seal grooves and between said inner and outer balancing seals, said second ring end of said backup ring having an outer peripheral edge spaced from said shaft by a radial distance, said outer seal groove being spaced from said shaft by a radial distance, said radial distance spacing said outer peripheral edge from said shaft being greater than said radial distance spacing said outer seal groove from said shaft.

133. The sealing assembly of claim 117, wherein said axial distance separating said locating shoulder from said retaining shoulder is controlled by a spacer section defined by a component selected from a group consisting of said retainer and said bulkhead housing, and at least a portion of said retainer is exposed to said first fluid and at least a portion of said retainer is exposed to said second fluid.

134. The sealing assembly of claim 117, wherein said ring inner surface of said backup ring is in tangential contact with said sealing surface of said shaft, forming a hydrodynamic inlet, said hydrodynamic inlet located in intermediate relation to said dynamic seal and said locating shoulder of said bulkhead housing and located in intermediate relation to said dynamic seal and said inner balancing seal and located in intermediate relation to said dynamic seal and said outer balancing seal.

135. The sealing assembly of claim 117, wherein said bulkhead housing has at least one inwardly projecting annular structure having axial thickness, and no inwardly projecting annular structure of said bulkhead housing is interposed between said first ring end of said backup ring and said retaining shoulder, and no inwardly projecting annular structure of said bulkhead housing is interposed between said second ring end of said backup ring and said locating shoulder of said bulkhead housing.

136. A sealing assembly comprising:
a bulkhead housing of annular form having an axial bore, said axial bore having first and second bore portions, said first bore portion defining an enlarged cavity bore having a locating shoulder facing in a generally axial direction and said second bore portion being the smallest portion of said axial bore, said smallest portion defining the innermost surface of said bulkhead housing;
a shaft having an externally-oriented sealing surface of generally cylindrical form, at least part of said sealing surface located within said enlarged cavity bore of said bulkhead housing and being relatively movable with respect to said bulkhead housing;
a retainer of annular form located radially outward of and around a portion of said shaft, said retainer defining a retaining shoulder facing said locating shoulder of said bulkhead housing, said retainer including a radially inward facing gland bore located around and in radially spaced relation to said shaft sealing surface, at least a part of said sealing surface being located inside said gland bore and at least a portion of said locating shoulder facing generally toward said retaining shoulder;
a backup ring of generally cylindrical form received at least partially within said enlarged cavity bore and located between said retaining shoulder and said locating shoulder, said backup ring having first and second ring ends facing in opposite directions, at least a portion of said first ring end located radially outward of and encircling said shaft sealing surface and facing and adjoining said retaining shoulder and at least a portion of said second ring end facing said locating shoulder, said backup ring having a ring inner surface that is larger than, and facing generally radially inward toward, said shaft sealing surface and establishing an extrusion gap clearance and a bearing relationship therewith locating said backup ring radially, and said backup ring having a ring outer surface facing generally radially outward;
a dynamic seal of annular form located at least partially within said gland bore of said retainer, said dynamic seal having a static sealing surface held in direct sealing contact with said gland bore of said retainer and having a dynamic sealing surface in sealing contact with said shaft sealing surface, said dynamic seal having first and second seal ends, said first seal end exposed to a first fluid having a first fluid pressure and said second seal end facing and in sealing contact with said first ring end of said backup ring, said second seal end of said dynamic seal facing toward said locating shoulder, said second seal end of said dynamic seal being nearer to said locating shoulder than said first seal end of said dynamic seal, no portion of said backup ring located between said dynamic seal and said retaining shoulder of said retainer; and
at least part of said innermost surface of said bulkhead housing exposed to said second fluid and said second fluid pressure.

137. The sealing assembly of claim 136, further comprising a retainer seal located radially outward of and encircling said sealing surface of said shaft and contacting and establishing sealing between said bulkhead housing and said retainer, at least a portion of said retainer and at least a portion of said retainer seal exposed to said first fluid.

138. The sealing assembly of claim 136, wherein said retaining shoulder of said retainer is separated from said locating shoulder of said bulkhead housing by an axial dimension that is greater than an axial length between said first and second ring ends of said backup ring to allow said backup ring to move radially in response to any radial motion of said shaft, at least a portion of said second ring end adjoining said locating shoulder, at least a portion of said retainer contacted by said first fluid and at least a portion of said retainer contacted by a second fluid having a second fluid pressure that is less than said first fluid pressure.

139. The sealing assembly of claim 136, further comprising:
an inner balancing seal encircling said shaft and in face sealing contact with said bulkhead housing and said second ring end of said backup ring;
an outer balancing seal located radially outward of and encircling said shaft and said inner balancing seal and in face sealing contact with said bulkhead housing and said second ring end of said backup ring;
said ring outer surface located radially outward from said shaft, at least part of said ring outer surface located more radially outward of said shaft than said outer balancing seal; and
said bulkhead housing having a pressure passage passing through at least part of said bulkhead housing and having an open end located between said inner and outer balancing seals, said pressure passage communicating said first fluid pressure between said inner and outer balancing seals, said inner balancing seal partitioning said first fluid pressure from a second fluid pressure of a second fluid that is less than said first fluid pressure, and said outer balancing seal partitioning said first fluid pressure from said second fluid pressure.

140. The sealing assembly of claim 139, wherein
said dynamic seal establishing a first inner sealing site at said first ring end sealing said extrusion gap clearance between said ring inner surface and said shaft sealing surface, said extrusion gap clearance exposed to said second fluid pressure, said dynamic seal exposed to said second fluid pressure at said extrusion gap clearance, and said dynamic seal establishing a first outer sealing site between said first ring end and said retainer,
said inner balancing seal establishing a second inner sealing site, and
said outer balancing seal establishing a second outer sealing site, and
wherein said first inner sealing site and said first outer sealing site defining a first hydraulic area exposed to said first fluid pressure, said first fluid pressure acting over said first hydraulic area and producing a first axially-oriented hydraulic force acting on said backup ring in a first hydraulic force direction, and
said second inner sealing site and said second outer sealing site defining a second hydraulic area exposed to said first fluid pressure, said first fluid pressure acting over said second hydraulic area and producing a second axially-oriented hydraulic force acting on said backup ring in a second hydraulic force direction that is opposite to said first hydraulic force direction, said bulkhead housing having a pressure passage communicating said first fluid pressure to said second hydraulic area.

141. The sealing assembly of claim 140, wherein said first hydraulic area is substantially equal to said second hydraulic area.

142. The sealing assembly of claim 139, wherein said at least a portion of said ring inner surface and at least a portion of said ring outer surface being exposed to said second fluid pressure causing said backup ring to be substantially radially pressure balanced.

143. The sealing assembly of claim 139, wherein said backup ring is penetrated by at least one pressure port located between and axially spaced from said first ring end and said second ring end, and located between and axially spaced from said dynamic seal and said locating shoulder of said bulkhead housing, and located between and axially s aced from said dynamic seal and said inner balancing seal, and located between and axially spaced from said dynamic seal and said outer balancing seal, said pressure port having generally oppositely facing first and second open ends, said first open end facing radially inward toward said sealing surface of said shaft and said second open end located radially outward of said first open end and facing radially outward away from said sealing surface of said shaft, said pressure port passing in a generally radial direction through at least a portion of said backup ring and communicating said second fluid pressure to said ring outer surface.

144. The sealing assembly of claim 139, wherein a region of radial clearance being located between said enlarged cavity bore and said ring outer surface, said bulkhead housing including a pressure port extending to and communicating with said region of radial clearance and communicating said second fluid pressure to said ring outer surface, and
    said backup ring having an overall axial length, all of said overall axial length located between said dynamic seal and said second ring end.

145. The sealing assembly of claim 139, wherein said axial bore of said bulkhead housing being larger than said shaft sealing surface and located radially outward of and encircling at least part of said sealing surface, all of said bulkhead housing being larger than said sealing surface, said ring inner surface of said backup ring being closer to said sealing surface, compared to said innermost surface of said bulkhead housing, said inner and outer balancing seals being located radially outward of and encircling said shaft sealing surface, said ring inner surface of said backup ring being smaller than said second bore portion of said bulkhead housing.

146. The sealing assembly of claim 145, wherein said sealing surface passes completely through said bulkhead housing.

147. The sealing assembly of claim 139, wherein all of said retainer is larger than said sealing surface of said shaft and said sealing surface passes completely through said retainer.

148. The sealing assembly of claim 139, wherein said locating shoulder of said bulkhead housing has inner and outer seal grooves of annular form opening in a generally axial direction toward said second ring end of said backup ring and encircling said sealing surface, said outer seal groove encircling said inner seal groove, said inner balancing seal contacting and being located at least partially in said inner seal groove, said outer balancing seal contacting and being located at least partially in said outer seal groove, at least part of said open end of said pressure passage being located between said inner and outer seal grooves.

149. The sealing assembly of claim 136, wherein said backup ring has an overall axial length between said first and second ring ends, and all of said overall axial length is located between said dynamic seal and said locating shoulder, and no portion of said backup ring encircles said dynamic seal, and no portion of said dynamic seal is located between said first and second ring ends.

150. The sealing assembly of claim 136, wherein said sealing surface of said shaft passing entirely through said ring inner surface, and passing completely through said backup ring from said first ring end to said second ring end, said second ring end being located radially outward of and encircling said sealing surface of said shaft, all of said backup ring being larger than and located radially outward of said sealing surface of said shaft.

151. The sealing assembly of claim 136, wherein said retainer includes a gland wall located adjacent to said dynamic seal and facing generally toward said first seal end of said dynamic seal, and facing generally toward said first ring end and said locating shoulder,
    said dynamic seal located between said gland wall and said first ring end, and all of said backup ring located between said dynamic seal and said locating shoulder, said first seal end of said dynamic seal facing toward said gland wall and facing away from said locating shoulder and facing away from said first ring end of said backup ring, said retainer located radially outward of, and surrounding all of said dynamic seal.

152. The sealing assembly of claim 136, wherein said ring inner surface of said backup ring is in tangential contact with said sealing surface of said shaft, forming a hydrodynamic inlet, said hydrodynamic inlet located in intermediate relation to said dynamic seal and said locating shoulder of said bulkhead housing,
    inner and outer balancing seals in face sealing contact with said second ring end of said backup ring, said inner and outer balancing seals contacting said bulkhead housing and encircling said shaft, said tangential contact located in intermediate relation to said dynamic seal and said inner balancing seal and located in intermediate relation to said dynamic seal and said outer balancing seal, at least a portion of said ring outer surface located farther from said shaft than said inner and outer balancing seals.

153. A sealing assembly comprising:
    a bulkhead housing of annular form having a locating shoulder facing in a generally axial direction and having an innermost surface of annular form and facing generally radially inward;
    a retainer of annular form having a retaining shoulder facing generally toward said locating shoulder of said bulkhead housing, said retainer having a radially inwardly facing annular surface defining a gland bore;
    a backup ring of generally circular form, at least a portion of said backup ring located between said retaining shoulder of said retainer and said locating shoulder of said bulkhead housing, said backup ring having a first ring end with at least a portion thereof facing said retaining shoulder and a second ring end with at least a portion thereof facing said locating shoulder, said first and second ring ends facing in generally opposite directions, said backup ring having a ring inner surface facing generally inward, and having a ring outer surface facing generally radially outward, said backup ring having radial thickness between said ring inner and outer surfaces;
    a shaft having a sealing surface of generally cylindrical form that is smaller than said ring inner surface, at least part of said sealing surface being located within said gland bore of said retainer, at least part of said sealing surface being located within said ring inner surface of said backup ring and establishing a region of clearance therewith, at least part of said sealing surface being located radially inward of and encircled by said first ring end of said backup ring, at least part of said shaft being located within said innermost surface of said bulkhead housing;

a dynamic seal having an annular static sealing surface facing generally radially outward, an annular dynamic sealing surface facing generally radially inward, and first and second seal ends, said dynamic seal located at least partially within said gland bore of said retainer, said annular static sealing surface contacting said gland bore, said annular dynamic sealing surface contacting said sealing surface of said shaft, and said second seal end facing and contacting said first ring end of said backup ring;

inner and outer balancing seals encircling said shaft and contacting said bulkhead housing and said second ring end of said backup ring, said outer balancing seal located radially outward of and encircling said inner balancing seal; and a pressure passage passing through at least part of said bulkhead housing and having an open end located between said inner and outer balancing seals.

154. The sealing assembly of claim 153, wherein said first and second ring ends are substantially flat surfaces and said first ring end is substantially parallel to said second ring end, said inner balancing seal separated from said dynamic seal by a first axial distance and said outer balancing seal separated from said dynamic seal by a second axial distance, said first and second axial distances being substantially equal, at least a portion of said first seal end exposed to a first fluid and a first fluid pressure, at least a portion of said locating shoulder located radially inward of said inner balancing seal exposed to a second fluid and a second fluid pressure and at least a portion of said locating shoulder located radially outward of said inner balancing seal exposed to said first fluid pressure, and no portion of said backup ring is located between said dynamic seal and said retaining shoulder of said retainer.

155. The sealing assembly of claim 153, wherein said backup ring has an overall axial length between said first and second ring ends, and all of said overall axial length is located between said dynamic seal and said locating shoulder, and no portion of said backup ring encircles said dynamic seal, and no portion of said dynamic seal is located between said first and second ring ends, said second ring end of said backup ring having an outer peripheral edge spaced from said shaft by a radial distance, said outer balancing seal spaced from said shaft by a radial distance, said radial distance spacing said outer peripheral edge from said shaft being greater than said radial distance spacing said outer balancing seal from said shaft, said first seal end exposed to a first fluid and said outer peripheral edge exposed to a second fluid, and at least part of said second ring end exposed to said first fluid.

156. The sealing assembly of claim 153, wherein said sealing surface of said shaft passing entirely through said ring inner surface, and passing completely through said backup ring from said first ring end to said second ring end, said first and second ring ends located radially outward of and encircling said sealing surface of said shaft, all of said backup ring being larger than and located radially outward of said sealing surface of said shaft, and said sealing surface locating said backup ring laterally.

157. The sealing assembly of claim 153, wherein a component selected from a group consisting of said bulkhead housing and said retainer has an axial portion thereof located radially outward of and encircling at least part of said backup ring and establishing a region of radial clearance between said axial portion and said ring outer surface, said axial portion thereof incorporating an anti-rotation pocket, and an anti-rotation tang projecting from said backup ring engages said anti-rotation pocket, at least a portion of said retainer exposed to a first fluid having a first fluid pressure and at least a portion of said retainer exposed to a second fluid having a second fluid pressure, said first fluid pressure being greater than said second fluid pressure, said dynamic seal partitioning said first fluid pressure from said second fluid pressure.

158. The sealing assembly of claim 157, wherein said bulkhead housing includes a pressure port located radially outward of said innermost surface of said bulkhead housing, said pressure port extending to and communicating with said region of radial clearance, at least part of said innermost surface of said bulkhead housing exposed to said second fluid and said second fluid pressure.

159. The sealing assembly of claim 153, wherein said backup ring is penetrated by at least one pressure port located between and axially spaced from said first and second ring ends of said backup ring and located between and axially spaced from said dynamic seal and said locating shoulder of said bulkhead housing, and located between said dynamic seal and said inner balancing seal and between said dynamic seal and said outer balancing seal, said pressure port having generally oppositely facing first and second open ends and providing communication in a generally radial direction between said region of clearance and said ring outer surface, said first open end facing radially inward toward said sealing surface of said shaft and said second open end located radially outward of said first open end and facing radially outward away from said sealing surface of said shaft, said pressure port passing in a generally radial direction through at least a portion of said backup ring.

160. The sealing assembly of claim 153, wherein said innermost surface of said bulkhead housing is larger than said sealing surface of said shaft and is located radially outward of and encircles at least part of said sealing surface, at least part of said innermost surface exposed to said second fluid and said second fluid pressure, all of said bulkhead housing being larger than said sealing surface of said shaft, said ring inner surface of said backup ring being closer to said sealing surface, compared to said innermost surface of said bulkhead housing, said sealing surface passing completely through said bulkhead housing and locating said backup ring laterally.

161. The sealing assembly of claim 153, further comprising a retainer seal contacting said retainer and said bulkhead housing, said retainer seal located radially outward of and encircling said dynamic seal and said sealing surface of said shaft, and said sealing surface locating said backup ring laterally.

162. The sealing assembly of claim 153, wherein said inner and outer balancing seals are located radially outward of and encircle said sealing surface of said shaft.

163. The sealing assembly of claim 153, wherein all of said retainer is larger than said sealing surface of said shaft and said sealing surface locating said backup ring laterally and extending completely through said retainer.

164. The sealing assembly of claim 153, wherein said pressure passage is a cross-drilled hole, said open end being defined by a generally axially oriented portion of said cross-drilled hole.

165. The sealing assembly of claim 153, wherein said retainer includes a gland wall located adjacent to said gland bore and facing generally toward said first seal end of said dynamic seal, and facing generally toward said first ring end and said locating shoulder, said dynamic seal being located between said gland wall and said first ring end and said first seal end of said dynamic seal facing toward said gland wall and facing away from said inner and outer balancing seals, and all of said backup ring located between said dynamic seal and said locating shoulder.

166. The sealing assembly of claim 153, wherein said backup ring is located inside a component selected from a group consisting of said retainer and said bulkhead housing, said sealing surface of said shaft positioning said backup ring laterally, said retainer having an innermost inwardly facing peripheral surface having an innermost retainer diameter, said innermost inwardly facing peripheral surface and said retaining shoulder encircling said sealing surface of said shaft, said ring inner surface having a diameter, and said diameter of said ring inner surface being smaller than said innermost retainer diameter.

167. The sealing assembly of claim 153, wherein said locating shoulder of said bulkhead housing has inner and outer seal grooves of annular form opening toward said second ring end of said backup ring and encircling said sealing surface, said outer seal groove encircling said inner seal groove, said inner balancing seal contacting and being located at least partially in said inner seal groove, said outer balancing seal contacting and being located at least partially in said outer seal groove, at least part of said open end of said pressure passage being located between said inner and outer seal grooves and between said inner and outer balancing seals and encircled by said outer seal groove, and said sealing surface locating said backup ring laterally.

168. The sealing assembly of claim 153, wherein said retaining shoulder of said retainer is separated from said locating shoulder of said bulkhead housing by an axial distance and said portion of said backup ring that is located between said retaining shoulder and said locating shoulder has an axial length, said axial length being less than said axial distance separating said retaining shoulder from said locating shoulder, no portion of said bulkhead housing located directly between said second ring end and said locating shoulder, and no portion of said bulkhead housing located directly between said first ring end and said retaining shoulder, at least a portion of said retainer contacted by a first fluid having a first fluid pressure and at least a portion of said retainer contacted b a second fluid having a second fluid pressure, said first fluid pressure being greater than said second fluid pressure.

169. The sealing assembly of claim 168, wherein said axial distance separating said locating shoulder from said retaining shoulder is controlled by a spacer section defined by a component selected from a group consisting of said retainer and said bulkhead housing, at least a portion of said retainer contacted b said first fluid and at least a portion of said retainer contacted by said second fluid.

170. The sealing assembly of claim 153, wherein said ring inner surface of said backup ring is in tangential contact with said sealing surface of said shaft, forming a hydrodynamic inlet, said hydrodynamic inlet located in intermediate relation to said dynamic seal and said locating shoulder of said bulkhead housing, and located in intermediate relation to said dynamic seal and said inner balancing seal, and located in intermediate relation to said dynamic seal and said outer balancing seal.

171. The sealing assembly of claim 153, wherein said dynamic seal contacts said retainer and said shaft at said first ring end.

172. The sealing assembly of claim 153, wherein said dynamic seal contacts said retainer, said shaft and said backup ring.

173. The sealing assembly of claim 153, wherein a planar interface is present between said retaining shoulder and said backup ring, said planar interface being sealed by said dynamic seal.

174. The sealing assembly of claim 173, wherein said planar interface is axially aligned with, and located radially outward of, said second seal end.

175. The sealing assembly of claim 153, wherein said retaining shoulder adjoins said first ring end and said locating shoulder adjoins said backup ring at said second ring end, at least a portion of said retainer exposed to a first fluid having a first fluid pressure and at least a portion of said retainer exposed to a second fluid having a second fluid pressure, said first fluid pressure being greater than said second fluid pressure, a portion of said bulkhead housing radially inward from said inner balancing seal exposed to said second fluid and said second fluid pressure, a portion of said bulkhead housing radially between said inner and outer balancing seals exposed to said first fluid and said first fluid pressure, and a portion of said bulkhead housing radially outward of said outer balancing seal exposed to said second fluid and said second fluid pressure.

176. The sealing assembly of claim 153, wherein a first fluid contacts said dynamic seal, and a generally axially oriented fluid communication hole passing through at least part of said retainer is exposed to said first fluid and communicates said first fluid to said pressure passage of said bulkhead.

177. The sealing assembly of claim 153, wherein a retainer seal contacts and seals between said retainer and said bulkhead housing, and said retainer seal is radially more distant from said sealing surface compared to said outer balancing seal, and compared to said dynamic seal, and encircles part of said sealing surface, and said sealing surface locating said backup ring laterally.

178. A sealing assembly comprising:
  a bulkhead housing having a portion thereof exposed to a first fluid having a first fluid pressure and having a portion thereof exposed to a second fluid having a second fluid pressure, and having a locating shoulder facing in a generally axial direction;
  a shaft having a portion thereof exposed to said first fluid and a portion thereof exposed to said second fluid, said shaft defining a sealing surface of generally cylindrical form, at least part of said sealing surface located at least partially within said bulkhead housing and being relatively movable with respect to said bulkhead housing;
  a retainer of annular form located radially outward of at least a portion of said shaft and surrounding at least a portion of said shaft, said retainer defining a retaining shoulder facing generally toward said locating shoulder of said bulkhead housing;
  a backup ring of annular form having a first ring end with at least a portion thereof facing said retaining shoulder and a second ring end having at least a portion thereof facing said locating shoulder, said first and second ring ends facing in generally opposite directions, said backup ring having a ring inner surface facing generally inward toward said sealing surface and establishing a region of clearance therewith and a region of tangential contact therewith, and having a ring outer surface located radially outward of said ring inner surface and between said retaining shoulder and said locating shoulder and facing generally radially outward, said backup ring having radial thickness between said ring inner surface and said ring outer surface, said ring inner and outer surfaces exposed to said second fluid and said second fluid pressure, said region of tangential contact between said sealing surface of said shaft and said ring inner surface locating said backup ring laterally, said region of clearance forming an extrusion gap between said ring inner surface and said sealing surface of said shaft at said first ring end;

said first ring end of said backup ring located directly radially outward of and surrounding said sealing surface;

a dynamic seal contacting said sealing surface of said shaft and said first ring end of said backup ring and establishing a first inner sealing site sealing said extrusion gap between said ring inner surface and said sealing surface of said shaft, said dynamic seal or a face seal in sealing contact with said retainer and said backup ring establishing a first outer sealing site;

an inner balancing seal in face sealing contact with said bulkhead housing and said second ring end of said backup ring establishing a second inner sealing site, said inner balancing seal spaced from said shaft by a radial distance, said inner balancing seal exposed to said first fluid pressure and said second fluid pressure;

an outer balancing seal in face sealing contact with said bulkhead housing and said second ring end of said backup ring establishing a second outer sealing site, said outer balancing seal exposed to said first fluid pressure and said second fluid pressure, said outer balancing seal spaced from said shaft by a radial distance, said radial distance separating said outer balancing seal from said shaft being greater than said radial distance separating said inner balancing seal from said shaft;

said first inner sealing site separated from said second inner sealing site by an axial distance, said first outer sealing site separated from said second outer sealing site by an axial distance, said second inner and outer sealing sites located radially outward of and encircling said shaft, said first inner and outer sealing sites and said second inner and outer sealing sites each sealing said first fluid from said second fluid, and sealing said first fluid pressure from said second fluid pressure, wherein:

said first fluid pressure is greater than said second fluid pressure, said first outer sealing site located generally radially outward from said first inner sealing site and said second outer sealing site located generally radially outward from said second inner sealing site, said first inner sealing site and said first outer sealing site defining a first hydraulic area of annular form exposed to said first fluid pressure, said first fluid pressure acting over said first hydraulic area and producing a first axially-oriented hydraulic force acting on said backup ring in a first hydraulic force direction, and said second inner sealing site and said second outer sealing site defining a second hydraulic area of annular form exposed to said first fluid pressure, said first fluid pressure acting over said second hydraulic area and producing a second axially oriented hydraulic force acting on said backup ring in a second hydraulic force direction that is opposite to said first hydraulic force direction.

179. The sealing assembly of claim 178, wherein said bulkhead housing has an innermost surface of annular form and other surfaces of annular form, said innermost surface being closer to said shaft than said other surfaces, and being exposed to said second fluid and said second fluid pressure.

180. A sealing assembly comprising:

a bulkhead housing having a portion thereof exposed to a first fluid having a first fluid pressure and having a portion thereof exposed to a second fluid having a second fluid pressure, and having a locating shoulder facing in a generally axial direction;

a shaft having a portion thereof exposed to said first fluid and a portion thereof exposed to said second fluid, said shaft defining a sealing surface of generally cylindrical form, at least part of said sealing surface located at least partially within said bulkhead housing and relatively movable with respect to said bulkhead housing;

a retainer of annular form located radially outward from at least a portion of said shaft and surrounding at least a portion of said shaft, said retainer defining a retaining shoulder facing generally toward said locating shoulder of said bulkhead housing and encircling a portion of said shaft;

said locating shoulder facing generally toward said retaining shoulder and encircling a portion of said shaft;

a backup ring of annular form having a first ring end with a portion thereof facing and adjoining said retaining shoulder and a second ring end having at least a portion thereof facing and adjoining said locating shoulder, said second ring end having an outer peripheral edge, said first and second ring ends facing in generally opposite directions, said backup ring having a ring inner surface and a ring outer surface located between said first and second ring ends, said ring inner surface facing generally inward toward said sealing surface of said shaft and establishing a region of clearance therewith and a region of tangential contact therewith, and said ring outer surface located radially outward of said ring inner surface and between said retaining shoulder and said locating shoulder, and facing generally radially outward, said backup ring having radial thickness between said ring inner surface and said ring outer surface, said ring inner and outer surfaces exposed to said second fluid and said second fluid pressure, none of said ring outer surface exposed to said first fluid pressure and none of said ring inner surface exposed to said first fluid pressure, said retainer capturing said backup ring axially relative to said bulkhead housing;

said region of tangential contact between said sealing surface of said shaft and said ring inner surface locating said backup ring laterally;

said region of clearance forming an extrusion gap between said ring inner surface and said sealing surface of said shaft at said first ring end;

a dynamic seal establishing a first inner sealing site at said first ring end sealing said extrusion gap between said ring inner surface and said sealing surface of said shaft, a sealing element selected from a group consisting of said dynamic seal and a face seal establishing a first outer sealing site at said first ring end sealing between said first ring end and said retainer;

an inner balancing seal in face sealing contact with said bulkhead housing and said second ring end of said backup ring establishing a second inner sealing site at said second ring end sealing between said second ring end and said bulkhead housing, and an outer balancing seal in face sealing contact with said bulkhead housing and said second ring end of said backup ring establishing a second outer sealing site at said second ring end sealing between said second ring end and said bulkhead housing;

said outer balancing seal separated from said shaft by a radial distance and said inner balancing seal separated from said shaft by a radial distance, said radial distance separating said outer balancing seal from said shaft being greater than said radial distance separating said inner balancing seal from said shaft;

said outer peripheral edge of said second ring end separated from said shaft by a radial distance, said radial distance separating said outer peripheral edge from said shaft being greater than said radial distance separating said outer balancing seal from said shaft;

said first inner sealing site separated from said second inner sealing site by an axial distance, said first outer sealing site separated from said second outer sealing site by an axial distance, said second inner and outer sealing sites located radially outward of and encircling said shaft, said first inner and outer sealing sites and said second inner and outer sealing sites each sealing said first fluid from said second fluid, and sealing said first fluid pressure from said second fluid pressure;

said first fluid pressure being greater than said second fluid pressure;

said first outer sealing site located generally radially outward from said first inner sealing site and said second outer sealing site located generally radially outward from said second inner sealing site, said first inner sealing site and said first outer sealing site defining a first hydraulic area exposed to said first fluid pressure, said first fluid pressure acting over said first hydraulic area and producing a first axially-oriented hydraulic force acting on said backup ring in a first hydraulic force direction toward said locating shoulder, and said second inner sealing site and said second outer sealing site defining a second hydraulic area exposed to said first fluid pressure, said first fluid pressure acting over said second hydraulic area and producing a second axially-oriented hydraulic force acting on said backup ring in a second hydraulic force direction that is opposite to said first hydraulic force direction and toward said retaining shoulder.

181. The sealing assembly of claim 180, wherein a pressure port passing through said backup ring in a generally radial direction, communicating from said region of clearance between said ring inner surface and said sealing surface of said shaft, said pressure port located between said first and second ring ends of said backup ring and spaced from said second ring end, said pressure port located between said dynamic seal and said locating shoulder of said bulkhead housing, said pressure port located between said dynamic seal and said inner balancing seal and located between said dynamic seal and said outer balancing seal, said pressure port having an inwardly facing open end and an outwardly facing open end, said pressure port extending between said inwardly facing open end and said outwardly facing open end, and said outwardly facing open end located radially outward from said inwardly facing open end, said pressure port communicating said second fluid and said second fluid pressure to said ring outer surface.

182. The sealing assembly of claim 180, wherein said bulkhead housing includes a pressure passage communicating said first fluid and said first fluid pressure to said second hydraulic area, at least some of said first fluid located between said second inner and outer sealing sites and between said inner and outer balancing seals, at least some of said second hydraulic area exposed to said first fluid, said inner and outer balancing seals each located between and exposed to said first and second fluids and each sealing said first fluid from said second fluid.

183. The sealing assembly of claim 180, wherein said first hydraulic area is substantially equal to said second hydraulic area.

184. The sealing assembly of claim 180, wherein said backup ring includes a pressure passage from said first ring end to said second ring end, said pressure passage containing and communicating said first fluid and said first fluid pressure to said second hydraulic area, at least some of said first fluid located between said second inner and outer sealing sites and between said inner and outer balancing seals, at least some of said second hydraulic area exposed to said first fluid, said inner and outer balancing seals each located between and exposed to said first and second fluids and each sealing said first fluid from said second fluid.

185. The sealing assembly of claim 180, wherein said backup ring has an axial length between said first and second ring ends, and all of said axial length is located between said dynamic seal and said locating shoulder, all of said axial length is located between said dynamic seal and said inner balancing seal, no portion of said dynamic seal located between said first and second ring ends, no portion of said backup ring encircling said dynamic seal, and no portion of said backup ring located between said dynamic seal and said retainer, and at least a portion of said dynamic seal located inside said retainer.

186. The sealing assembly of claim 180, wherein said bulkhead housing includes a pressure passage containing said first fluid and said first fluid pressure and having an opening located between said inner and outer balancing seals and facing toward said backup ring, said opening separated from said shaft by a radial distance, said radial distance separating said opening from said shaft being greater than said radial distance separating said inner balancing seal from said shaft and being less than said radial distance separating said outer balancing seal from said shaft.

187. The sealing assembly of claim 180, wherein said retainer has a generally axially oriented fluid communication hole located radially outward of said first outer sealing site, and said fluid communication hole communicating said first fluid to a cross-drilled hole having an opening located between said inner and outer balancing seals and facing toward said backup ring, said retainer contacted by said first and second fluids.

188. The sealing assembly of claim 180, wherein said shaft has an axially facing surface, and no portion of said backup ring surrounds said axially facing surface.

189. The sealing assembly of claim 180, wherein said shaft has an axially facing surface exposed to said second fluid and terminating at an outer peripheral edge of said axially facing surface, and no portion of said backup ring is smaller than said outer peripheral edge of said axially facing surface.

190. The sealing assembly of claim 180, wherein said shaft has an axis, said retainer is separated from said axis by a radial distance, said backup ring is separated from said axis by a radial distance, and said radial distance separating said retainer from said axis is greater than said radial distance separating said backup ring from said axis, a surface of said retainer exposed to said first fluid, and said second ring end of said backup ring facing in a generally axial direction away from said retainer.

191. The sealing assembly of claim 190, wherein said sealing surface is separated from said axis by a radial distance, said radial distance separating said retainer from said axis is greater than said radial distance separating said sealing surface from said axis, and said radial distance separating said backup ring from said axis is no less than said radial distance separating said sealing surface from said axis.

192. The sealing assembly of claim 180, wherein said bulkhead housing has an innermost surface of annular form and other surfaces of annular form, said innermost surface being closer to said shaft than said other surfaces, and being exposed to said second fluid and said second fluid pressure.

193. A sealing assembly comprising:
- a bulkhead housing having a portion thereof exposed to a first fluid having a first fluid pressure and having a portion thereof exposed to a second fluid having a second fluid pressure, and having a locating shoulder facing in a generally axial direction;
- a shaft having a portion thereof exposed to said first fluid and a portion thereof exposed to said second fluid, said shaft defining a sealing surface of generally cylindrical form, at least part of said sealing surface located at least partially within said bulkhead housing and relatively movable with respect to said bulkhead housing;
- a retainer of annular form located radially outward from at least a portion of said shaft and surrounding at least a portion of said shaft, said retainer defining a retaining shoulder facing generally toward said locating shoulder of said bulkhead housing and encircling a portion of said shaft;
- said locating shoulder facing generally toward said retaining shoulder and encircling a portion of said shaft;
- a backup ring of annular form having a first ring end with a portion thereof facing and adjoining said retaining shoulder and a second ring end having at least a portion thereof facing and adjoining said locating shoulder, said second ring end having an outer peripheral edge, said first and second ring ends facing in generally opposite directions, said backup ring having a ring inner surface and a ring outer surface located between said first and second ring ends, said ring inner surface facing generally inward toward said sealing surface of said shaft and establishing a region of clearance therewith and a region of tangential contact therewith, and said ring outer surface located radially outward of said ring inner surface and between said retaining shoulder and said locating shoulder, and facing generally radially outward, said backup ring having radial thickness between said ring inner surface and said ring outer surface, said ring inner and outer surfaces exposed to said second fluid and said second fluid pressure, none of said ring outer surface exposed to said first fluid pressure and none of said ring inner surface exposed to said first fluid pressure, said retainer capturing said backup ring axially relative to said bulkhead housing;
- said region of tangential contact between said sealing surface of said shaft and said ring inner surface locating said backup ring laterally;
- said region of clearance forming an extrusion gap between said ring inner surface and said sealing surface of said shaft at said first ring end;
- a dynamic seal having a first seal end exposed to said first fluid and a second seal end facing toward said first ring end of said backup ring, said dynamic seal establishing sealing between said backup ring and said sealing surface of said shaft, thereby preventing said first fluid from escaping through said region of clearance between said ring inner surface and said sealing surface of said shaft;
- a sealing element selected from a group consisting of said dynamic seal and a face seal contacting said retainer and said backup ring and establishing sealing between said first ring end and said retainer and preventing said first fluid from escaping between said first ring end and said retainer;
- an inner balancing seal in face sealing contact with said bulkhead housing and said second ring end of said backup ring establishing sealing between said second ring end and said bulkhead housing, and an outer balancing seal in face sealing contact with said bulkhead housing and said second ring end of said backup ring establishing sealing between said second ring end and said bulkhead housing, said inner balancing seal exposed to said first and second fluids and said outer balancing seal exposed to said first and second fluids, some of said first fluid located within an annular sealed region located between said inner and outer balancing seals and located between said locating shoulder and said second ring end, said first fluid within said annular sealed region contacting an annular portion of said second ring end;
- said outer balancing seal separated from said shaft by a radial distance and said inner balancing seal separated from said shaft by a radial distance, said radial distance separating said outer balancing seal from said shaft being greater than said radial distance separating said inner balancing seal from said shaft;
- said outer peripheral edge of said second ring end separated from said shaft by a radial distance, said radial distance separating said outer peripheral edge from said shaft being greater than said radial distance separating said outer balancing seal from said shaft;
- said dynamic seal separated from said inner balancing seal by an axial distance, said dynamic seal separated from said outer balancing seal by an axial distance, said inner and outer balancing seals each sealing said first fluid from said second fluid, and said inner and outer balancing seals each sealing said first fluid pressure from said second fluid pressure;
- said first fluid pressure being greater than said second fluid pressure;
- said first fluid pressure acting on said dynamic seal and producing a first axially-oriented hydraulic force acting on said backup ring in a first hydraulic force direction toward said locating shoulder, and said first fluid pressure acting on said annular portion of said second ring end of said backup ring and producing a second axially-oriented hydraulic force acting on said backup ring in a second hydraulic force direction that is opposite to said first hydraulic force direction and toward said retaining shoulder.

194. The sealing assembly of claim 193, wherein,
- a portion of said second ring end radially inward of said inner balancing seal exposed to said second fluid and said second fluid pressure, a portion of said second ring end radially outward of said inner balancing seal and radially inward of said outer balancing seal exposed to said first fluid and said first fluid pressure, and a portion of said second ring end located radially outward of said outer balancing seal exposed to said second fluid and said second fluid pressure, and
- a portion of said bulkhead housing radially inward of said inner balancing seal exposed to said second fluid and said second fluid pressure, a portion of said bulkhead housing radially outward of said inner balancing seal and radially inward of said outer balancing seal exposed to said first fluid and said first fluid pressure, and a portion of said bulkhead housing located radially outward of said outer balancing seal exposed to said second fluid and said second fluid pressure.

195. A sealing assembly comprising:

a bulkhead housing of annular form having a portion thereof exposed to a first fluid pressure and having a portion thereof exposed to a second fluid pressure, and having a locating shoulder facing in a generally axial direction, and having an innermost surface of annular form and facing generally radially inward, said first fluid pressure being greater than said second fluid pressure;

a shaft having a portion thereof exposed to said first fluid pressure and a portion thereof exposed to said second fluid pressure, said shaft being relatively movable with respect to said bulkhead housing and defining an externally oriented surface of generally cylindrical form, at least a portion of said shaft being located within and encircled by at least a portion of said bulkhead housing;

a retainer of annular form located radially outward from at least a portion of said shaft and encircling a portion of said shaft, said retainer defining a retaining shoulder facing generally toward said locating shoulder of said bulkhead housing and encircling a portion of said shaft, said retaining shoulder being axially spaced from said locating shoulder, at least a portion of said retainer being exposed to said first fluid pressure;

said locating shoulder of said bulkhead housing facing generally toward said retaining shoulder of said retainer and encircling a portion of said shaft;

an annular ring having a first ring end with at least a portion thereof facing and adjoining said retaining shoulder and a second ring end facing away from said retaining shoulder and having at least a portion thereof facing and adjoining said locating shoulder, said annular ring being captured axially relative to said bulkhead housing by said retainer, said second ring end having an outer peripheral edge, said first and second ring ends facing in generally opposite directions, said annular ring having a ring inner surface and a ring outer surface, said ring inner and outer surfaces encircling at least a portion of said externally oriented surface of said shaft, at least part of said externally oriented surface of said shaft being located within said ring inner surface, said ring inner surface being larger than and facing generally inward toward said externally oriented surface of said shaft and establishing a region of clearance therewith and a region of tangential contact therewith, at least part of said ring outer surface located radially outward of said ring inner surface and located in intermediate location to said retaining shoulder and said locating shoulder, and facing generally radially outward away from said externally oriented surface of said shaft, said annular ring having radial thickness between said ring inner surface and said ring outer surface, at least part of said annular ring being located inside a component selected from a group consisting of said retainer and said bulkhead housing, said ring inner surface of said annular ring being closer to said externally oriented surface of said shaft compared to said innermost surface of said bulkhead housing;

said retaining shoulder of said retainer is separated from said locating shoulder of said bulkhead housing by an axial dimension and said annular ring having an axial length between said first and second ring ends, said axial dimension separating said locating shoulder from said retaining shoulder being greater than said axial length between said first and second ring ends, said region of tangential contact between said externally oriented surface of said shaft and said ring inner surface locating said annular ring laterally and at least a portion of said region of tangential contact being located in intermediate relation to said first and second ring ends, and at least a portion of said ring inner surface being located in intermediate relation to said first and second ring ends, no portion of said annular ring being located directly between said first ring end and said retaining shoulder of said retainer;

a sealing element encircling a portion of said shaft and contacting said retainer and said annular ring and establishing sealing between said first ring end and said retainer, said sealing element being exposed to said first fluid pressure and preventing said first fluid pressure from escaping between said first ring end and said retainer, no portion of said annular ring being located between said sealing element and said retaining shoulder of said retainer;

an inner balancing seal encircling a portion of said shaft and contacting and sealing between said bulkhead housing and said annular ring and preventing the loss of said first fluid pressure between said second ring end and said locating shoulder, and an outer balancing seal encircling a portion of said shaft and contacting said bulkhead housing and said annular ring and preventing the loss of said first fluid pressure between said second ring end and said locating shoulder, at least a portion of said second ring end and at least a portion of said ring outer surface being located farther from said shaft than said outer balancing seal, said inner balancing seal exposed to and contacted by said first and second fluids and said outer balancing seal exposed to said first fluid pressure, some of said first fluid pressure located within an annular sealed region located between said inner and outer balancing seals and located between said locating shoulder and said second ring end, said first fluid pressure within said annular sealed region acting on an annular portion of said second ring end;

a pressure passage formed in said annular ring or said bulkhead housing containing said first fluid pressure and communicating said first fluid pressure to said annular sealed region, said pressure passage having an open end opening into said annular sealed region, at least part of said open end being located radially outward of said inner balancing seal and at least part of said open end being located radially inward of said outer balancing seal, said open end being separated from said shaft by a radial distance, said inner balancing seal being and located at least partially within and contacting an inner annular groove formed in one of said bulkhead housing and said annular ring, said outer balancing seal being located at least partially within and contacting an outer annular groove formed in one of said bulkhead housing and said annular ring, said outer annular groove being separated from shaft by a radial distance and said inner annular groove being separated from said shaft by a radial distance, said radial distance separating said outer annular groove from said shaft being greater than said radial distance separating said inner annular groove from said shaft, said outer balancing seal separated from said shaft by a radial distance and said inner balancing seal separated from said shaft by a radial distance, said radial distance separating said outer balancing seal from said shaft being greater than said radial distance separating said inner balancing seal from said shaft, said outer balancing seal being farther from said shaft than said inner balancing seal;

said radial distance separating said open end from said shaft being greater than said radial distance separating said inner balancing seal from said shaft and being less than said radial distance separating said outer balancing seal from said shaft, said outer peripheral edge of said second ring end separated from said shaft by a radial distance, said radial distance separating said outer peripheral edge from said shaft being greater than said radial distance separating said outer balancing seal from said shaft and greater than said radial distance separating said outer annular groove from said shaft, said outer peripheral edge of said second ring end being located generally radially outward of said outer annular groove and generally radially outward of said outer balancing seal and being located farther from said shaft compared to said inner and outer balancing seals;

said inner balancing seal located between and exposed to said first and second fluid pressures and partitioning said first fluid pressure from said second fluid pressure, and said outer balancing seal being exposed to and retaining said first fluid pressure;

said first fluid pressure acting on said annular ring and producing a first axially-oriented hydraulic force acting on said annular ring in a first hydraulic force direction toward said locating shoulder, and said first fluid pressure acting on said annular sealed region of said second ring end of said annular ring and producing a second axially-oriented hydraulic force acting on said annular ring in a second hydraulic force direction that is opposite to said first hydraulic force direction and toward said retaining shoulder;

said innermost surface of said bulkhead housing being the surface of said bulkhead housing located nearest to said shaft, said innermost surface of said bulkhead housing being exposed to said second fluid pressure, a portion of said second ring end radially inward of said inner balancing seal exposed to said second fluid pressure, a portion of said second ring end radially outward of said inner balancing seal and radially inward of said outer balancing seal exposed to said first fluid pressure, a portion of said bulkhead housing radially inward of said inner balancing seal exposed to said second fluid pressure, a portion of said bulkhead housing radially outward of said inner balancing seal and radially inward of said outer balancing seal exposed to said first fluid pressure, no portion of said bulkhead housing being located directly between said first ring end of said annular ring and said retaining shoulder, and no portion of said bulkhead housing being located directly between said second ring end of said annular ring and said locating shoulder of said bulkhead housing.

\* \* \* \* \*